(12) United States Patent
Lee et al.

(10) Patent No.: US 11,965,755 B2
(45) Date of Patent: Apr. 23, 2024

(54) TRIBOELECTRIC SENSOR AND CONTROL SYSTEM

(71) Applicant: NATIONAL UNIVERSITY OF SINGAPORE, Singapore (SG)

(72) Inventors: Chengkuo Lee, Singapore (SG); Qiongfeng Shi, Singapore (SG); Tao Chen, Jiangsu (CN)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 499 days.

(21) Appl. No.: 17/297,318

(22) PCT Filed: Oct. 14, 2019

(86) PCT No.: PCT/SG2019/050509
§ 371 (c)(1),
(2) Date: May 26, 2021

(87) PCT Pub. No.: WO2020/081007
PCT Pub. Date: Apr. 23, 2020

(65) Prior Publication Data
US 2021/0404844 A1  Dec. 30, 2021

(30) Foreign Application Priority Data

Oct. 15, 2018  (SG) ........................... 10201809043X
Nov. 27, 2018  (SG) ........................... 10201810619W

(51) Int. Cl.
*H02N 1/04* (2006.01)
*G01D 5/14* (2006.01)
*G06F 3/0354* (2013.01)

(52) U.S. Cl.
CPC .................. *G01D 5/14* (2013.01); *H02N 1/04* (2013.01); *G06F 3/0354* (2013.01)

(58) Field of Classification Search
CPC .......... G01D 5/14; H02N 1/04; G06F 3/0354; G06F 3/0346
See application file for complete search history.

(56) References Cited

U.S. PATENT DOCUMENTS

2014/0338458 A1* 11/2014 Wang ..................... G01H 11/06
310/309
2017/0187306 A1* 6/2017 Yeo ....................... B29C 33/424

FOREIGN PATENT DOCUMENTS

| CN | 104236591 A | 12/2014 |
|---|---|---|
| CN | 104426412 A | 3/2015 |
| EP | 3035398 A1 | 6/2016 |

OTHER PUBLICATIONS

International Search Report and Written Opinion for PCT/SG2019/050509 dated Dec. 2, 2019, 16 pages.

(Continued)

*Primary Examiner* — Xin Y Zhong
(74) *Attorney, Agent, or Firm* — Kilpatrick Townsend & Stockton LLP

(57) ABSTRACT

A triboelectric sensor comprises a substrate; at least one grid structure disposed in or on the substrate; and at least one electrode for collecting triboelectric charges that are generated by sliding of an object over a surface of the substrate; wherein the at least one grid structure is configured such that motion of the object is detectable from a signal generated by crossing of the object over at least part of the grid structure.

19 Claims, 33 Drawing Sheets

(56) References Cited

OTHER PUBLICATIONS

Chen T. el al., Investigation of Position Sensing and Energy Harvesting of a Flexible Triboelectric Touch Pad. *Nanomaterials*, Aug. 13, 2018, vol. 8, No. 8, pp. 613 [Retrieved on Dec. 2, 2019] <DOI: 10.3390/NANO8080613> Whole document.
Chen T. et al., Triboelectric Self-Powered Wearable Flexible Patch as 3D Motion Control Interface for Robotic Manipulator. *ACS Nano*, Oct. 16, 2018, vol. 12, pp. 11561-11571 [Retrieved on Dec. 2, 2019] <DOI: 10.1021/ACSNANAO.8B06747> Whole document.
Shi Q. et al., Self-Powered Bio-Inspired Spider-Net-Coding Interface Using Single-Electrode Triboelectric Nanogenerator. *Advanced Science*, May 29, 2019, vol. 6, No. 15, pp. 1900617 [Retrieved on Dec. 2, 2019] <DOI: 10.1002/ADVS.201900617> Whole document.
Shi Q. et al., Triboeletric single-electrode-output control interface using patterned grid electrode. *Nano Energy*, 30 <arcj 2019, vol. 60, pp. 545-556 [Retrieved on Dec. 2, 2019] <DOI: 10.1016/J.NANOEN.2019.03.090> Whole document.
Qui C. et al., Sensors and Control Interface Methods Based on Triboelectric Nanogenerator in IoT Applications. *IEEE Access*, Jul. 8, 2019, vol. 7, pp. 92745-92757 [Retrieved on Dec. 2, 2019] <DOI: 10.1109/ACCESS.2019.2927394> Whole document.

\* cited by examiner

Figure 5 (ctd)

(c)

TRIBOELECTRIC SENSOR AND CONTROL SYSTEM

TECHNICAL FIELD

The present disclosure relates broadly to a triboelectric sensor, and to a control system that includes one or more triboelectric sensors.

BACKGROUND

Wearable sensors have recently become of great interest for various applications, such as tactile sensing and pressure sensing in the context of healthcare and gaming control.

A limitation of many such sensors is that they require an external power source. Accordingly, recent efforts have been directed to the development of a number of self-powered sensors based on triboelectric nanogenerators (TENGs). A TENG is an energy harvesting device that converts external mechanical energy into electricity by a combination of the triboelectric effect and electrostatic induction. In a TENG, a potential is created by the triboelectric effect due to the charge transfer between two materials that exhibit opposite tribo-polarity.

TENGs can function as active sensors for detecting pressure change without the use of an external power source, and can therefore potentially be used as self-powered tactile sensors. A further advantage of TENGs is that it may be possible to avoid the use of complex electric circuits in devices that incorporate them.

Tactile sensor arrays have also been investigated for various applications. For example, it has previously been proposed by X. Wang et al. (*Adv. Mat.* 2018, 30, 1706738) to fabricate a flexible and stretchable 8×8 triboelectric sensor array using PDMS and Ag nanofiber electrodes. The triboelectric tactile sensor array demonstrated by X. Wang et al. can be used to extract and detect trajectory information from the outputs of the 64 electrodes associated with the 8×8 pixels of the array when a user draws a trace across the array. However, for tactile sensors, increased resolution and more targets for location means an increased number of sensing units and electrode terminals, which in turn means increased cost and extra difficulty in electrode signal extraction, increased signal interference, and greater difficulty in data processing.

To address this issue, a simplified tactile sensor configuration has been proposed, whereby position of a fingertip engaged on the tactile sensor surface can be determined by the output ratio from two pairs of electrodes. However, the working mechanism of this proposed tactile sensor depends on the contact-separation at a single touch point, which means that the user's fingertip has to be separated from the tactile sensor surface after each individual engagement to be able to detect the touch position. Clearly, detection of a continuous 2D trajectory of a moving object or 2D pattern drawn by a fingertip is not possible by this method.

For certain applications such as robotics or control of unmanned vehicles, motion and position control must be achievable in three dimensions. Previously proposed tactile sensors have failed to adequately address this issue.

It would be desirable to overcome or alleviate one or more of the above difficulties, or at least to provide a useful alternative.

SUMMARY

Disclosed herein is a triboelectric sensor comprising:
a substrate;
at least one grid structure disposed in or on the substrate; and
at least one electrode for collecting triboelectric charges that are generated by sliding of an object over a surface of the substrate;
wherein the at least one grid structure is configured such that motion of the object is detectable from a signal generated by crossing of the object over at least part of the grid structure.

In certain embodiments, the at least one electrode comprises at least one pair of electrodes, respective electrodes of the pair being located at opposite sides of the substrate; and wherein:
the at least one grid structure comprises a spacing structure, said spacing structure comprising a plurality of raised portions, the raised portions having a constant height, such that transport of the object along the surface of the substrate generates a separation of charges between the substrate surface and the object surface when the object encounters one of said raised portions, and such that motion parameters of the object are derivable from the ratio of electric potentials of said pair of electrodes.

In certain embodiments, the triboelectric sensor may comprise two pairs of electrodes, wherein a first pair of electrodes is arranged opposite each other along a first direction, and a second pair of electrodes is arranged opposite each other along a second direction that is orthogonal to the first direction.

Advantageously, the provision of a grid structure with a plurality of constant-height raised portions, in conjunction with one or more pairs of opposed electrodes, enables accurate measurement of continuous motion of an object sliding across the surface of the substrate. This is because the sliding motion of the object is interrupted by the raised portions at positions that are known due to the design of the grid structure. The separation of charge between the object and the substrate due to such interruptions manifests as a time-varying voltage signal that can be used to infer the motion of the object. Additionally, by using the ratio of the electric potentials to infer the motion parameters, the results are made independent of the absolute magnitudes of the output at the respective electrodes.

The spacing structure may be formed from a resin material, for example.

In certain embodiments, the at least one grid structure comprises a first electrode grid formed on the substrate and configured to function as an output electrode of a first triboelectric nanogenerator operating under sliding single electrode mode; wherein the first electrode grid comprises a plurality of different grating structures disposed along different respective directions relative to a surface of the substrate such that different characteristic triboelectric-based output signals are detectable via the first electrode grid for sliding of the object along the different respective directions.

By providing a single electrode grid for readout of the signal from the sliding motion of the object, the readout circuit design is greatly simplified.

In certain embodiments, the at least one grid structure comprises a second electrode grid formed on an opposite side of the substrate compared to the first electrode grid and configured to function as an output electrode of a second triboelectric nanogenerator operating under sliding single electrode mode; wherein the second electrode grid comprises a plurality of different grating structures disposed along different respective directions relative to a surface of the substrate such that different characteristic triboelectric-based output signals are detectable via the second electrode grid for sliding of the object along the different respective directions.

By providing a second electrode grid, it is possible to achieve not only in-plane motion control, but also control of additional degrees of freedom of a device to which the sensor is connected.

In certain embodiments, the at least one grid structure comprises a second electrode grid that comprises a plurality of different grating structures that are modulated differently than the grating structures of the first electrode grid, the second electrode grid being connected to the first electrode grid. Accordingly, the second electrode grid can be used to control different degrees of freedom than the first electrode grid, while still forming part of a single electrode such that readout of the signal is simplified. The second electrode grid may be disposed on the same side of the substrate as the first electrode grid, or on the opposite side thereof.

In certain embodiments, the grating structures of the first electrode grid differ from each other in one or more of: the number of grating elements, the widths of the grating elements, and the sequence of the grating elements; and/or wherein the grating structures of the second electrode grid differ from each other in one or more of: the number of grating elements, the widths of the grating elements, and the sequence of the grating elements.

In certain embodiments, the grating structures of the second electrode grid are modulated differently than the grating structures of the first electrode grid, and wherein the first and second electrode grids are connected to form a single electrode such that different characteristic triboelectric-based output signals are detectable via the single electrode.

The triboelectric sensor may comprise a cover layer formed over the first and/or second electrode grids.

In certain embodiments, the substrate is flexible.

The electrodes may be formed from a conductive polymer material. For example, the conductive polymer material may comprise a hydrogel PDMS elastomer.

Also disclosed herein is a triboelectric control system comprising a motion control interface, said motion control interface comprising at least one triboelectric sensor as disclosed herein.

The motion control interface may comprise at least one further triboelectric sensor configured to detect motion in a single direction, such that motion detected by the triboelectric sensor and the further triboelectric sensor is translatable into a movement control signal in three dimensions.

The further triboelectric sensor may comprise an elongate substrate having an electrode at each end. The elongate substrate may be formed from an elastic material. The elastic material may be silicone rubber, for example.

The triboelectric control system may comprise:
a signal acquisition module for acquiring detected motion data from the triboelectric sensor and if present, the further triboelectric sensor; and
a driver in communication with the signal acquisition module and being configured to transmit control signals to a machine in accordance with the detected motion data to move at least part of the machine in two or three dimensions.

BRIEF DESCRIPTION OF THE DRAWINGS

Some embodiments of a triboelectric sensor and a triboelectric control system, in accordance with present teachings will now be described, by way of non-limiting example only, with reference to the accompanying drawings in which.

DETAILED DESCRIPTION

Embodiments of the present disclosure relate to a triboelectric sensor comprising: a substrate; at least one grid structure disposed in or on the substrate; and at least one electrode for collecting triboelectric charges generated by sliding of an object over a surface of the substrate. The at least one grid structure is configured such that motion of the object is detectable from a signal generated by crossing of the object over at least part of the grid structure.

The grid structure may itself be the at least one electrode, or one of the electrodes in embodiments where there is more than one. Accordingly, as the object (such as a finger of a user) is slid over the surface of the substrate, the grid structure or an electrode that is in contact with, or in electrical communication with, the sensor may be used to measure a time-dependent signal that is produced by the sliding motion, and one or more parameters of the time-dependent signal may be used to infer the position and direction of motion of the object relative to the substrate. The parameters may include, for example, the number of peaks, their relative positions, their relative amplitudes, or other parameters derived from the shapes of the peaks.

As used herein, a "grid" means a regular or irregular set of lines that are joined to form a mesh or net extending in two dimensions along a surface. The lines may be straight or curved. Portions of the grid may be modulated according to the spacing between the lines, their thickness, and/or the angles at which they are disposed relative to lines of other portions of the grid.

Figure 1:
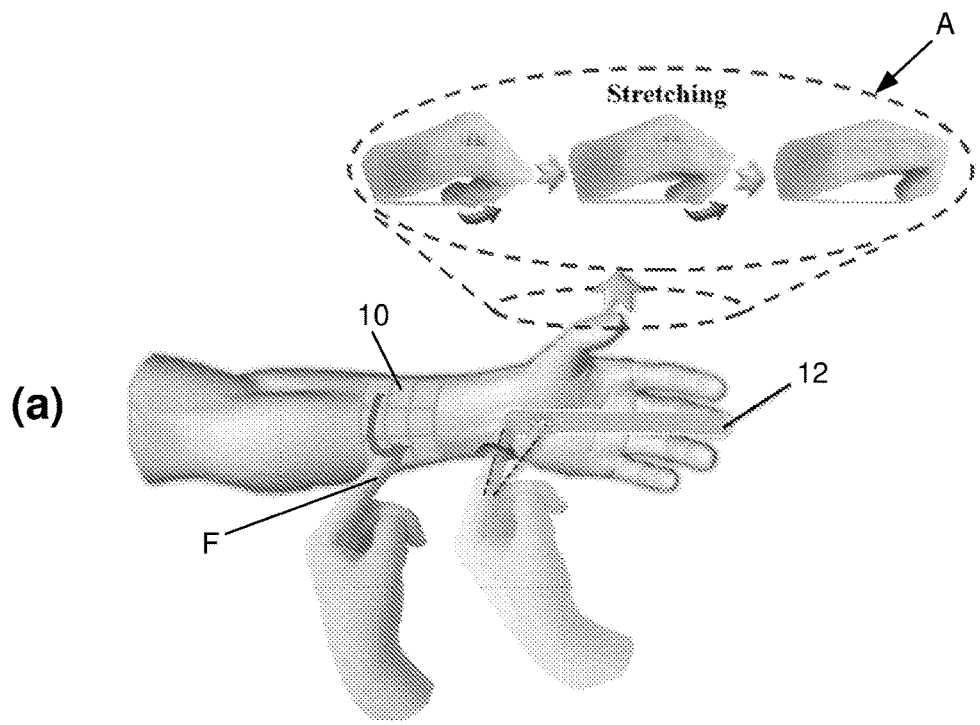
FIG. 1 shows: (a) an embodiment of a triboelectric control system including a 2D triboelectric sensor patch attached to a user's arm and a 1D triboelectric sensor patch attached to the user's wrist and fingers; (b) a top plan view of an embodiment of a 2D triboelectric sensor patch; (c) a top plan view of an embodiment of a 1D triboelectric sensor patch; (d) a schematic illustration of the working principle of an embodiment of a 2D triboelectric sensor patch; (e) electrostatic analysis of the contact process of FIG. 1(d); (f) Voltage ratio of electrode 3 (E3) and electrode 1 (E1) of the sensor patch of FIG. 1(b) with the location of charges changing, and voltage ratio of electrode 4 (E4) and electrode 2 (E2) with the location of charges changing.
Figure 1:
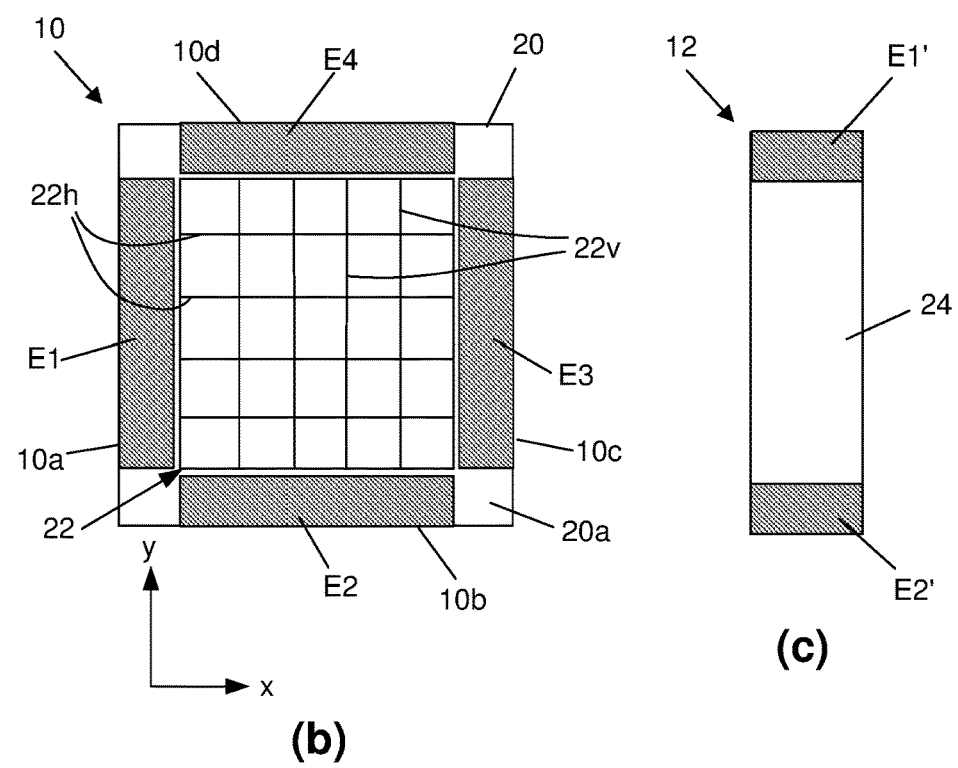
Figure 1:
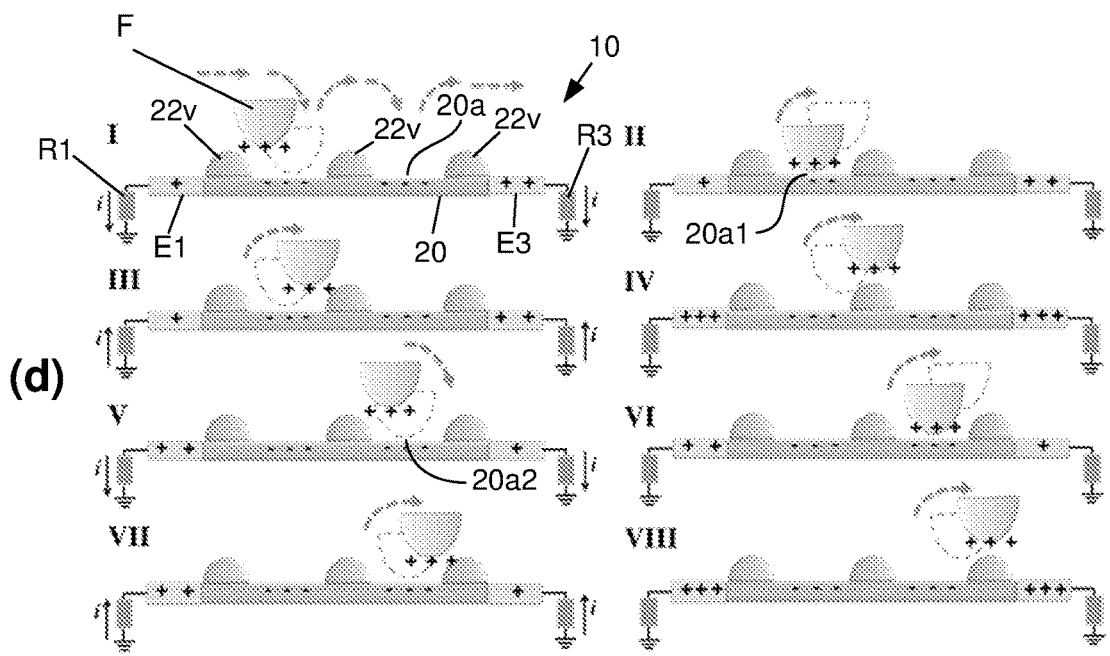
Figure 1:
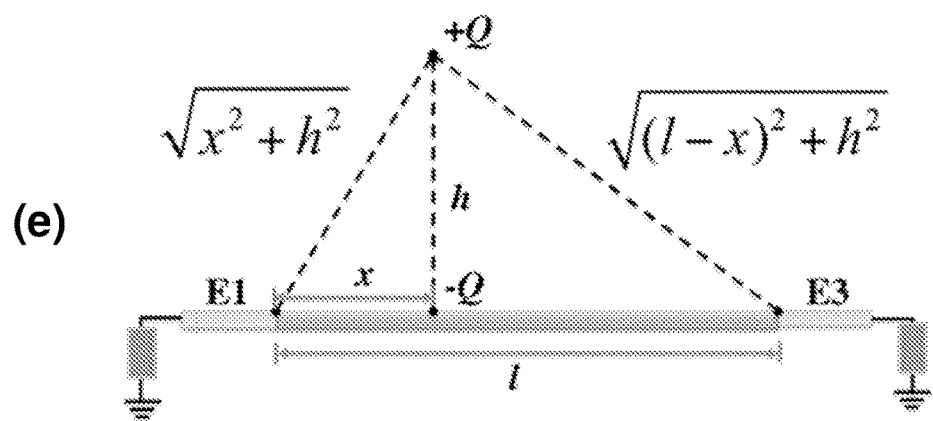
Figure 1:
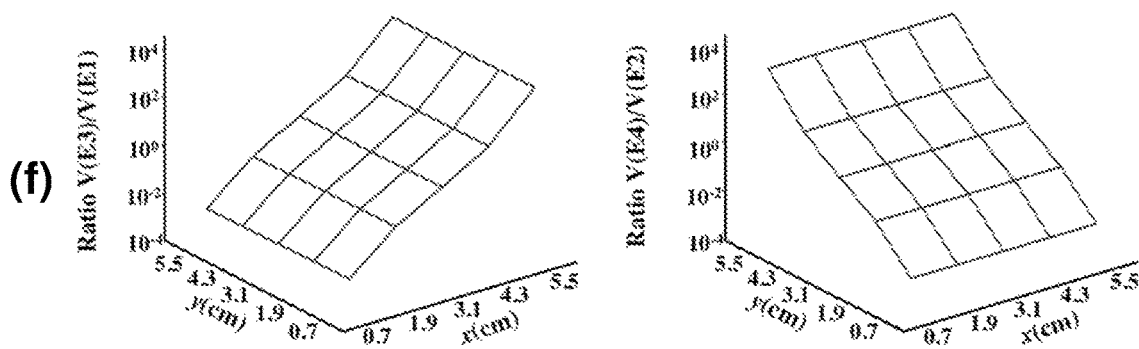
Figure 3:
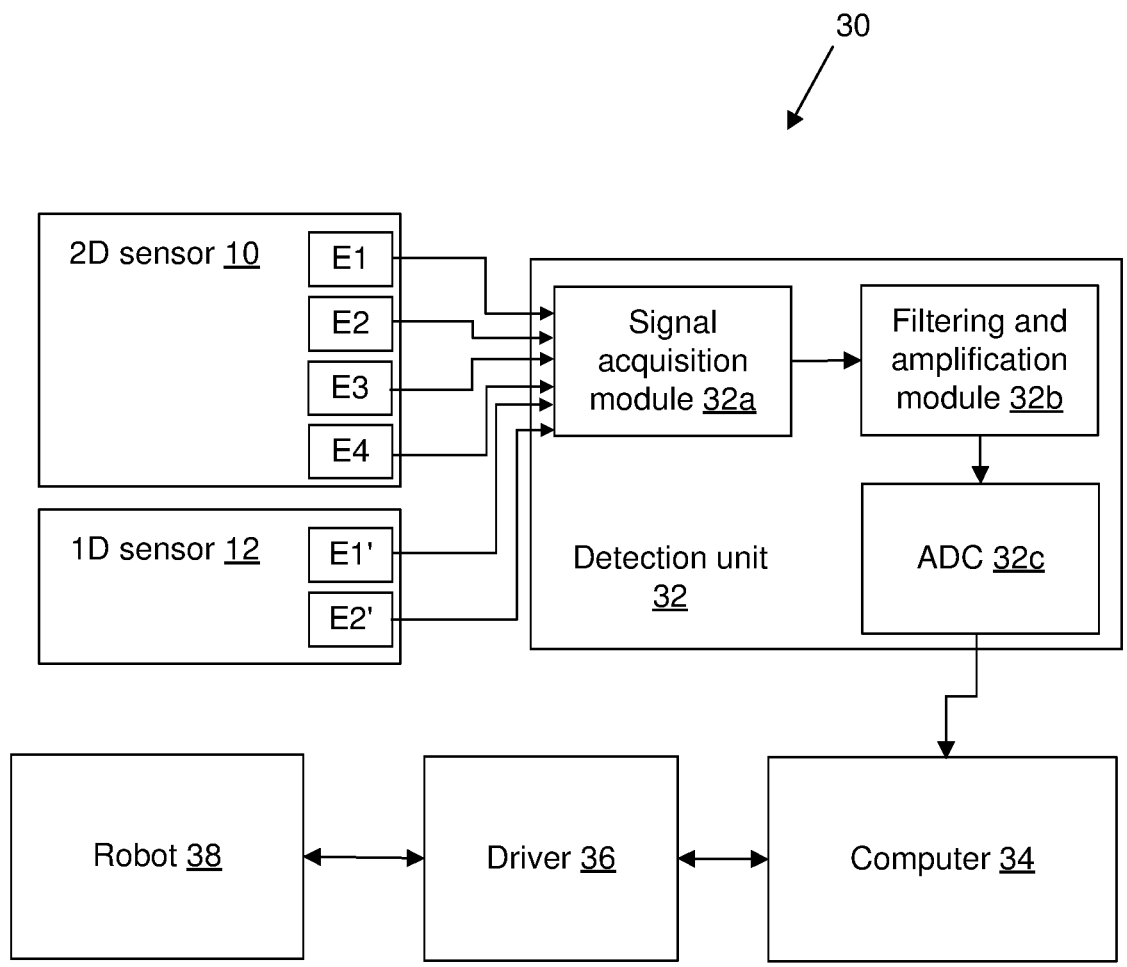
FIG. 3 shows a block architecture of an embodiment of a triboelectric control system.

FIG. 1 shows, in schematic form, a first embodiment of a triboelectric sensor 10. The triboelectric sensor 10 is adapted to detect 2D motion (also referred to herein as a 2D sensor). Sensor 10 may be in the form of a patch or pad, and may form part of a triboelectric control system as shown in FIGS. 1(a) and 3, the control system also including a further sensor 12 that is adapted to detect 1D motion (also referred to herein as a 1D sensor). The 1D sensor 12 may also be a triboelectric sensor.

As shown in FIG. 1(b), the triboelectric sensor 10 includes a substrate 20 on which are disposed two pairs of electrodes E1, E3 and E2, E4 respectively. In some embodiments, the electrodes E1-E4 may be embedded in the substrate 20.

Electrodes E1 and E3 are respectively located at opposite sides 10a and 10c of the substrate 20. Likewise, electrodes E2 and E4 are respectively located at opposite sides 10b and 10d of the substrate 20. The first pair of electrodes E1 and E3 are arranged opposite each other along a first direction indicated by x in FIG. 1(b), and the second pair of electrodes are arranged opposite each other along a second direction indicated by y, where the second direction is different, for example orthogonal, to the first direction.

Also disposed on the substrate 20 on an upper surface 20a thereof is a grid structure 22. The grid structure 22 is disposed on the substrate between the electrodes E1, E2, E3 and E4. In the example shown in FIG. 1(b), the grid structure is a rectilinear grid having a first plurality of regularly spaced grid lines 22h that are aligned along the first direction, and a second plurality of regularly spaced grid lines 22v that are aligned along the second direction.

Substrate 20 may be flexible, so that it may, for example, be suitable for attaching to a limb of a user such that a surface of the substrate 20 conforms to the contours of the user's limb as shown in FIG. 1(a). Additionally, electrodes E1-E4 and grid structure 22 may be flexible.

Electrodes E1-E4 are arranged to collect triboelectric charge that is generated at the surface 20a of the substrate 20 when an object, such as the user's finger F, is slid over the surface 20a such that the object crosses at least part of the grid 22. To this end, electrodes E1-E4 may each be connected to an external circuit, as will be described in further detail below, for measuring the signal generated by the sliding motion of the user's finger F.

The grid structure 22 is a spacing structure that comprises a plurality of raised portions of substantially equal height above the surface 20a of the substrate 20. In the embodiment shown in FIG. 1, the grid lines 22v and 22h are the raised portions. Transport of the user's finger F along the surface 20a and over the raised portions (grid lines) 22v, 22h of the spacing structure 22 generates, in a manner which will be described in more detail below, a separation of charges between the substrate surface 20a and the surface of the finger F when the finger F encounters one of the raised portions 22v or 22h. The charges are collected at the respective electrodes E1-E4 and the electric potentials of the pairs (E1, E3) and (E2, E4) of electrodes may be used to infer motion parameters of the user's finger F.

The flexible substrate 20 may be made of silicone rubber, which has good stretchability. The substrate 20 acts as a friction layer to contact with objects in a sliding or touching manner to generate triboelectric charges. The grid 22 may be a layer formed of resin, and may be deposited on the substrate 20 by 3D printing, for example. To this end, any suitable 3D printable resin, such as polyamide (PA) resin 11, may be used to apply the grid 22 to the substrate 20. The material of the grid 22 is not limited to resin, and other materials can be used so long as they do not exhibit a strong triboelectric effect with the object that is to be slid across the sensor 10 (e.g., a finger). The grid material may have a similar degree of flexibility to the substrate 20. For example, if the substrate 20 is flexible so that the sensor 10 can be worn as shown in FIG. 1(*a*), then the material of grid 22 should also be flexible.

The electrodes E1-E4 on the edges of the substrate 20 may be fabricated from starch-based hydrogel PDMS elastomer (HPE), i.e., a mixture of starch-based hydrogel and PDMS. The starch-based hydrogel may be obtained by dissolving corn-starch in an electrolyte at 60° C. and the resultant starch-based hydrogel may be maintained at a relative humidity (RH) of 60%.

Similarly to the 2D sensor 10, the 1D sensor 12 shown in FIG. 1(*c*) comprises a flexible substrate 24, and has respective electrodes E1' and E2' at opposite ends thereof. The flexible substrate 24 may be formed from silicone rubber, as for the substrate 20. The electrodes E1' and E2' may also be flexible. For example, electrodes E1' and E2' may be formed from HPE, as for electrodes E1-E4.

Turning to FIG. 1(*d*), the operating principle of the 2D sensor 10 will now be described. In FIG. 1(*d*), electrode E1 is connected to a load resistor R1 and electrode E3 is connected to a load resistor E3. The operating mode begins with a single contact between the finger F and the top of a raised portion 22*v* of the grid structure 22. When the finger F slides to the right, the finger F approaches the surface 20*a* of substrate 20 from the top of raised portion 22*v* as shown in FIG. 1(*d*)-I. Because of the work function difference between skin and the material of the substrate (e.g. silicone rubber), physical contact between the two dielectric surfaces with differing electron affinities creates opposite charges on the respective surfaces. There are positive charges on the surface of the finger and negative charges on the surface 22*a* of the substrate 20. As the finger F passes over the raised portion 22*v* and approaches surface 20*a*, the positive charges on finger F gradually balance the negative charges on surface 20*a*. Therefore, different amounts of charge are forced to flow from each electrode terminal E1 and E3 to ground via respective resistors R1 and R3, thus generating currents while the finger F approaches the first contact point 20*a*1 on surface 20*a*. When the finger F contacts the surface 20*a* of substrate 20 (FIG. 1(*d*)-II), the electrical field is confined to the space between the finger surface and substrate 20 so that the electrode (E1, E3) voltage will not be affected by the charges at the touch point 20*a*1. When the finger F separates from surface 20*a* and moves far enough away from the first contact point 20*a*1 on substrate 20 (FIG. 1(*d*)-III), the negative charges on the surface 20*a* of substrate 20 will induce opposite charges on the electrode terminals (E1, E3) again. Therefore, currents with different magnitude from ground to each electrode terminal will be formed while the finger F moves away. When the finger F reaches the top of the next raised portion 22*v* of the grid structure 22, the maximum charge on the electrodes E1 and E3 is reached (FIG. 1(*d*)-IV). When the finger F crosses over the grid 22 and approaches the second contact point 20*a*2 on surface 20*a* (FIG. 1(*d*)-V), the charges on the two electrode terminals E1, E3 will be repelled and forced to flow to ground. Therefore, a negative current will be formed, and the above process and phenomenon are repeated as the finger traverses the grid 22. Based on the different current and voltage output of the four electrodes E1-E4, the location of contact can be determined. Because of the way that the grid 22 is configured, the continuous sliding trajectory and movement of the finger F on the sensor surface 20*a* are recorded by continuous pixel positions, and thus motion parameters (trajectory, speed and acceleration) of the finger F can be inferred.

The position of the finger F as a function of time relative to electrode pairs (E1, E3) and (E2, E4) can be determined according to the ratio of the potentials at respective electrodes of the pair, i.e. ($V_{E1}/V_{E3}$) and ($V_{E2}/V_{E4}$). This is illustrated in FIG. 1(*e*). During the process of the finger sliding or touching along the device surface, the electrical fields on the opposite electrodes change accordingly.

If the electric potential of ground and infinity is assumed to be 0 V, then the electric potential of a point charge can be written as:

$$U = k\frac{Q}{r} \quad (1)$$

where Q is the amount of charge, r is the distance to the point charge and k is Coulomb's constant.

The distance between two opposite electrodes (E1 and E3) is assumed to be 1. After contact with the silicone rubber surface, the finger with charge of +Q moves away from the silicone rubber surface to a distance of h. The touch point on the silicone rubber surface is with charge of −Q correspondingly. If the distance between the touch point and E1 is x, then the distance between the touch point and E3 is l−x. Thus, the electric potentials of E1 and E3 ($V_{E1}$ and $V_{E3}$) can be expressed as:

$$\begin{cases} V_{E1} = k\dfrac{Q}{\sqrt{x^2 + h^2}} - k\dfrac{Q}{x} \\ V_{E3} = k\dfrac{Q}{\sqrt{(l-x)^2 + h^2}} - k\dfrac{Q}{l-x} \end{cases} \quad (2)$$

Their ratio can then be derived as:

$$\frac{V_{E3}}{V_{E1}} = \frac{k\dfrac{Q}{\sqrt{(l-x)^2 + h^2}} - k\dfrac{Q}{l-x}}{k\dfrac{Q}{\sqrt{x^2 + h^2}} - k\dfrac{Q}{x}} = \frac{\dfrac{1}{\sqrt{(l-x)^2 + h^2}} - \dfrac{1}{l-x}}{\dfrac{1}{\sqrt{x^2 + h^2}} - \dfrac{1}{x}} \quad (3)$$

The ratio is only dependent on the touch point position, i.e., x, if l and h remain constant. More importantly, the ratio is independent of the amount of charge, which enables the sensor 10 or the sensor 12 to be used for stable and reliable position sensing even under different contact force and relative humidity. The relationship between $V_{E2}$ and $V_{E4}$ can be obtained using the same procedure. Since the raised portions 22*h*, 22*v* of the grid structure 22 are of substantially the same height above surface 20*a*, the distance h is constant.

For simulation purposes, h is set to 1.5 mm, and FIG. 1(*f*) shows the resulting simulated $V_{E3}/V_{E1}$ and $V_{E4}/V_{E2}$ of the four-electrode sensor 10, as a function of charge location. The results show good monotonicity, which is especially important for accurate inference of the location of touching.

Similarly to the 2D sensor 10, the 1D sensor 12 may be used to detect the position of a user's finger according to the ratio of the electrode potentials, $V_{E2'}/V_{E1'}$ in accordance with the principle outlined above. For example, if the ends of the substrate 24 are attached to the wrist and finger of a user as shown at A in FIG. 1(a), the user may extend his or her finger to change the length of the sensor 12 which corresponds to a defined position along an axis, while tapping at a point on the surface of substrate 24 that does not change relative to the user's wrist, to thereby change the ratio of potentials.

The electrodes E1-E4 and E1'-E2' may be attached to the surfaces of their respective substrates 20 and 24. Alternatively, they may be embedded in the substrates 20 and 24. For example, HPE electrodes may be wrapped in silicone rubber during fabrication of the sensor 10 or the sensor 12. When the finger is contacted with the silicone rubber of the substrate 20 or 24, contact electrification occurs at the interface due to the different electron affinities of the finger and the silicone rubber. HPE is conductive and the current through HPE reflects the changes in the external electric field. FIGS. 2(b) and 2(c), respectively, show the open circuit voltage and short circuit current of HPE-silicone rubber device when a user's finger is tapped against the substrate 24.

As mentioned above, 2D and 1D triboelectric sensors 10 and 12 may be used as part of a triboelectric control system, such as the system 30 shown in FIG. 3. The outputs of the electrodes E1-E4 of sensor 10 and electrodes E1'-E2' of sensor 12 may be connected to a detection unit 32 for measurement and pre-processing of signals from the sensors 10, 12. Specifically, analog signals from respective electrodes E1-E4 and E1'-E2' may be captured by a signal acquisition module 32a of the detection unit 32. A filtering and amplifying module 32b may receive the acquired signals from the signal acquisition module 32a, and perform certain signal processing operations, such as applying a low-pass filter to remove noise, followed by amplification of the filtered signal. The filtered and amplified signals are then fed to ADC 32c, and may be output to an external computing device 34 for analysis. In some embodiments, the detection unit 32 may have on-board processing capability for analysis of the output signals from ADC 32c.

Computing device 34 is in communication with a driver unit 36 for a machine such as a robot 38. The driver unit 36 is configured to receive command signals from computing device 34 to cause motion of one or more components of robot 38. In one example, the robot 38 under control is an industrial robot of KUKA AG, with a corresponding KSP600 driver that may be used to control different motors of the robot 38 to make it perform different movements.

Computing device 34 receives the processed signals from the respective electrodes, and determines the potential ratios $V_{E3}/V_{E1}$ and $V_{E4}/V_{E2}$ for the 2D sensor 10. These potential ratios indicate the position of the user's finger F on the surface 20a of the sensor 10, i.e. the (x,y) coordinates in the plane of the sensor 10. Accordingly, by tracking the (x,y) position as a function of time, computing device 34 can infer motion parameters of the user's finger such as speed and direction of movement, and translate these into command signals that are provided to driver unit 36 to cause in-plane movement of (part of) the robot 38.

Computing device 34 may also determine the potential ratio $V_{E2'}/V_{E1'}$, which indicates the position of the user's finger F along the 1D sensor 12. Computing device 34 may track the position as a function of time, and translate this into command signals that are provided to driver unit 36 to cause out-of-plane movement (e.g., movement in a vertical direction or rotation) of (part of) the robot 38.

Figure 4:
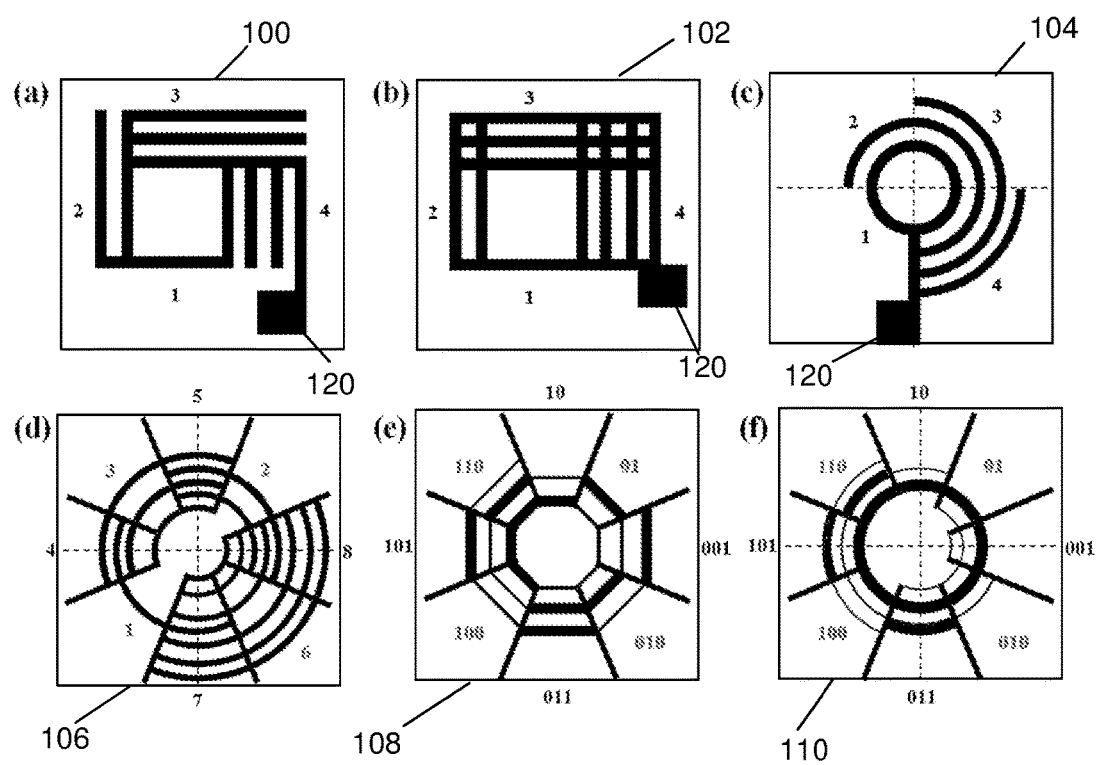
FIG. 4 shows various alternative embodiments of a triboelectric sensor.

Referring now to FIG. 4, some alternative embodiments of triboelectric sensors are shown. In each of the sensors of FIG. 4, a single electrode is provided as a grid structure in or on a substrate. Grating structures of the grid are config-
ured to generate different characteristic signals in different respective directions when an object, such as a user's finger, is slid across the substrate and traverses the grid. The grid structure itself is therefore used to output the signal.

The embodiments depicted in FIG. 4 each provide a triboelectric nanogenerator (TENG) with a single electrode output using a patterned grid or grating design for multi-directional 2D and 3D sensing and controlling. Advantageously, embodiments provide a device in which one electrode can realise multi-directional sensing and controlling based on the output peaks of the generated signal, which is not dependent on the absolute magnitude of the output signal, therefore being robust to different use scenarios and different users. For example, directional sensing can be based on the number, relative positions and/or relative amplitudes of the peaks in the signal. The device according to example embodiments comprises an electrode grid design with different grating structures (e.g., different number of grating elements, different width of grating elements, etc.) disposed along different directions and configured into e.g. a square, polygon or circle shape for multi-direction sensing and controlling. In these embodiments, all the grating structures are connected together and operate under triboelectric based sliding single electrode mode.

In electrode grid designs according to example embodiments, the electrode grid may be formed directly on a substrate to provide an uncovered design, or may be formed on a substrate and further covered with a dielectric layer (for example, a thin layer without any patterns, or a layer with the same pattern as the grating electrode).

For embodiments according to the uncovered design, the contact object can be made from electronegative material. For the covered design, if the cover layer is formed from an electropositive material, then an electronegative material is preferably used for the contact object in order to maximise the output performance. If electronegative material is adopted as the cover layer, then electropositive material is preferably used for the contact object, such as a human finger etc.

In example embodiments the electrode grid may be made from an electropositive material, such as a metal. In other example embodiments, the electrode grid may comprise grating structures made from an electronegative material and a conductive path to collect the triboelectric charges from the electronegative material.

Due to the elegant structure design and operation mechanism, only one electrode is advantageously needed for in-plane 2D controlling according to example embodiments.

Furthermore, two electrodes fabricated on both sides of a thin substrate (for example) such as paper or a card can achieve 3D controlling in free space according to example embodiments.

As shown in FIG. 4, grating structures with varying electrode number or electrode width can be configured into electrode grid designs according to different embodiments to achieve multiple direction control in 2D space under triboelectric based sliding single electrode mode, e.g., square four-direction designs 100, 102 (FIG. 4(a),(b)), circular four-direction design 104 (FIG. 4(c)), eight-direction design 106 with varying electrode number (FIG. 4(d)), and eight-direction designs 108, 110 with varying electrode width and number (FIG. 4(e),(f)). Generally, the grating structures may differ from each other in one or more of: the number of grating elements, the widths of the grating elements, and the sequence of the grating elements. At least some of the grating elements may be non-rectilinear, for example arcuate as in the sensors 104, 106 and 108, in which the grating elements radiate outwards from the centre of the respective sensors.

In some embodiments, a contact pad 120 may be provided as part of electrode 100, 102 or 104, to facilitate connection of the electrode 100, 102 or 104 to an external circuit.

Figure 5:
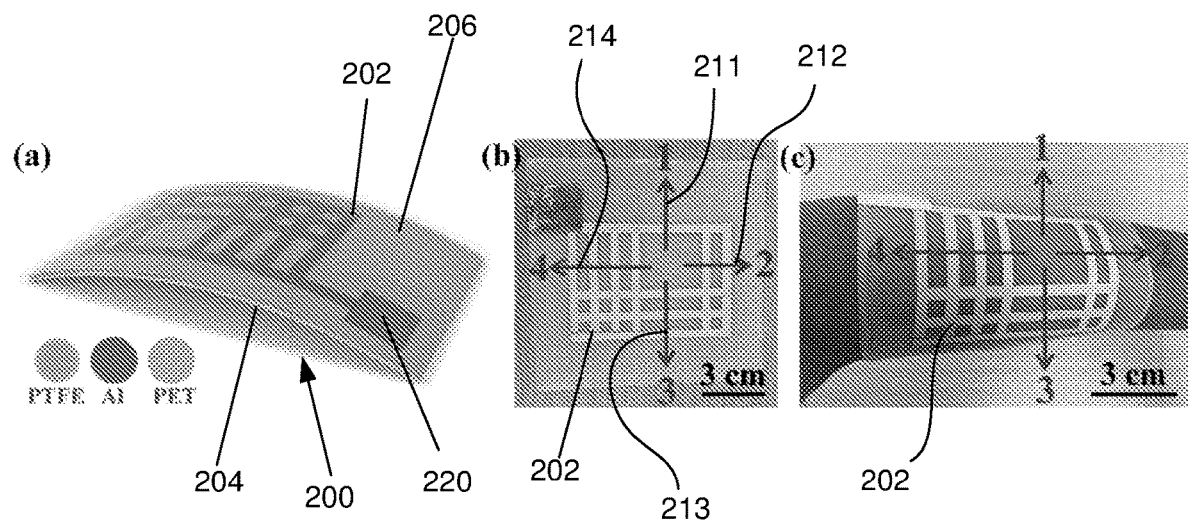
FIG. 5 shows operational characteristics of an embodiment of a triboelectric sensor worn by a user.

FIG. 5 shows a four-direction device 200 according to an example embodiment for 2D motion sensing and control. Specifically, as shown in FIG. 5(a),(b),(c), the device 200 comprises a connected Al electrode grid 202 fabricated on a PET substrate 204 and having a dielectric PTFE thin film covering layer 206 on top. The electrode grid 202 includes different grating structures 211 to 214 for the respective directions indicated by arrows 1 to 4. The electrode grid 202 may have a contact pad portion 220. The grating structures 211 to 214 differ in their number of grid lines. For example, grating structure 212 comprises 2 grid lines, whereas grating structure 214 comprises 4 grid lines.

The operation mechanism of device 200 is based on the contact electrification and electrostatic induction between the surface of the PTFE covering 206 and an active sliding object such as a human finger. In operation, after coming into contact with each other, the surface of the PTFE covering 206 becomes negatively charged and the finger becomes positively charged. Then, when the finger is sliding in a particular direction across (i.e., sliding in and out of) one grating structure e.g. 211 of the electrode grid 202 with a constant speed, the positive charges on the finger balance the negative charges on the surface of the PTFE covering 206, inducing electric potential difference and thereby an output signal in the external circuit. Therefore, an output signal with a characteristic number/structure of peaks is generated when the finger slides across the corresponding grating structure of the electrode pattern. Three different sliding speeds performed by the finger have been characterized according to example embodiments, i.e., slow (~38.0 mm/s), normal (~97.4 mm/s) and fast (~152.0 mm/s). The respective signals obtained with the device 200 supported on a table (FIG. 5(d),(e),(f)) and on a human hand (FIG. 5(g),(h),(i)) are shown. During the measurements, the finger is lifted and moved back into the centre each time. When the finger is not sliding across a specific pattern, whether it is on the surface or in air, the signal is 0. Accordingly, 0 level is measured between two sliding motions as seen in the graphs.

The operating principle of the device 200 may be further understood with reference to FIG. 6(c). In FIG. 6(c), two grating elements 202a, 202b of electrode 202 are taken as an example. All the grating elements are connected together to form the electrode 202, and are connected to an external resistor load R. After a finger wearing a nitrile glove contacts with PTFE 206, electrons are injected from the nitrile glove into PTFE at the interface, due to the different electron affinity of the two materials. Thus the PTFE surface becomes negatively charged and the nitrile glove surface becomes positively charged. Then when the finger slides on the first grating element 202a, the positive charges on the nitrile glove surface balance the negative charges on the PTFE surface, inducing an electric potential difference. Thus electrons are driven to flow from ground to the first grating element 202a, generating a positive output peak 302 on the external circuit. Next, when the finger slides away from the first grating element 202a, the generated electric potential difference disappears and electrons flow back to ground, generating a negative output peak 304 on the external circuit. Similarly, when the finger slides on and away from the second grating element 202b, another output peak 306 (including both the positive peak and the negative peak) is generated. That is, one output signal peak is generated when the finger slides across one grating element. In this way, different directions with different numbers of grating elements can be differentiated based on the number of generated output peaks, e.g., one output peak will be generated when sliding in the direction with one grating element, two output peaks will be generated when sliding in the direction with two grating elements, etc.

Figure 6:
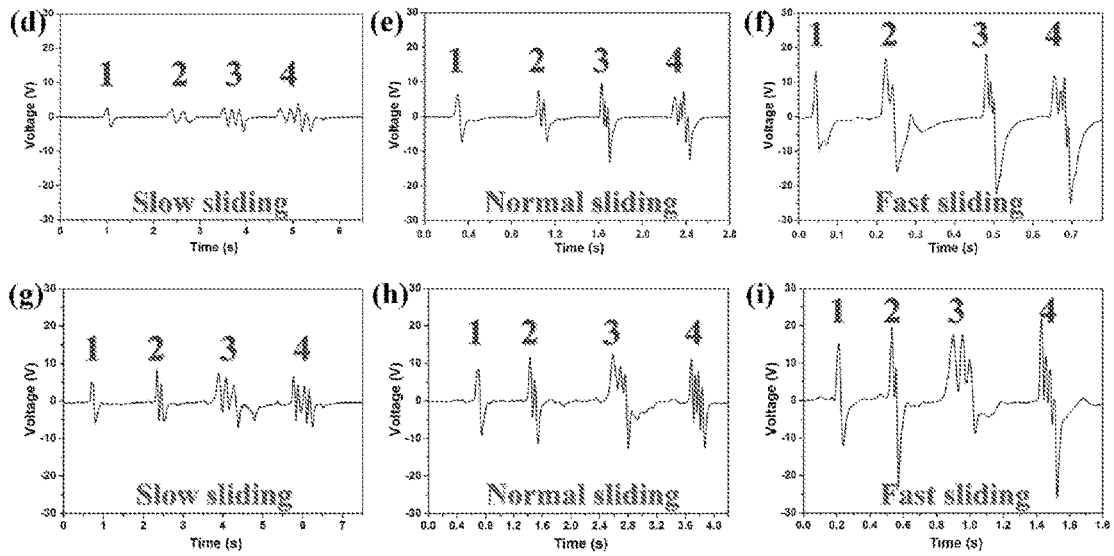
FIG. 6 is a schematic illustration of the operational principle of a triboelectric sensor according to the embodiments of FIG. 4.
Figure 6:
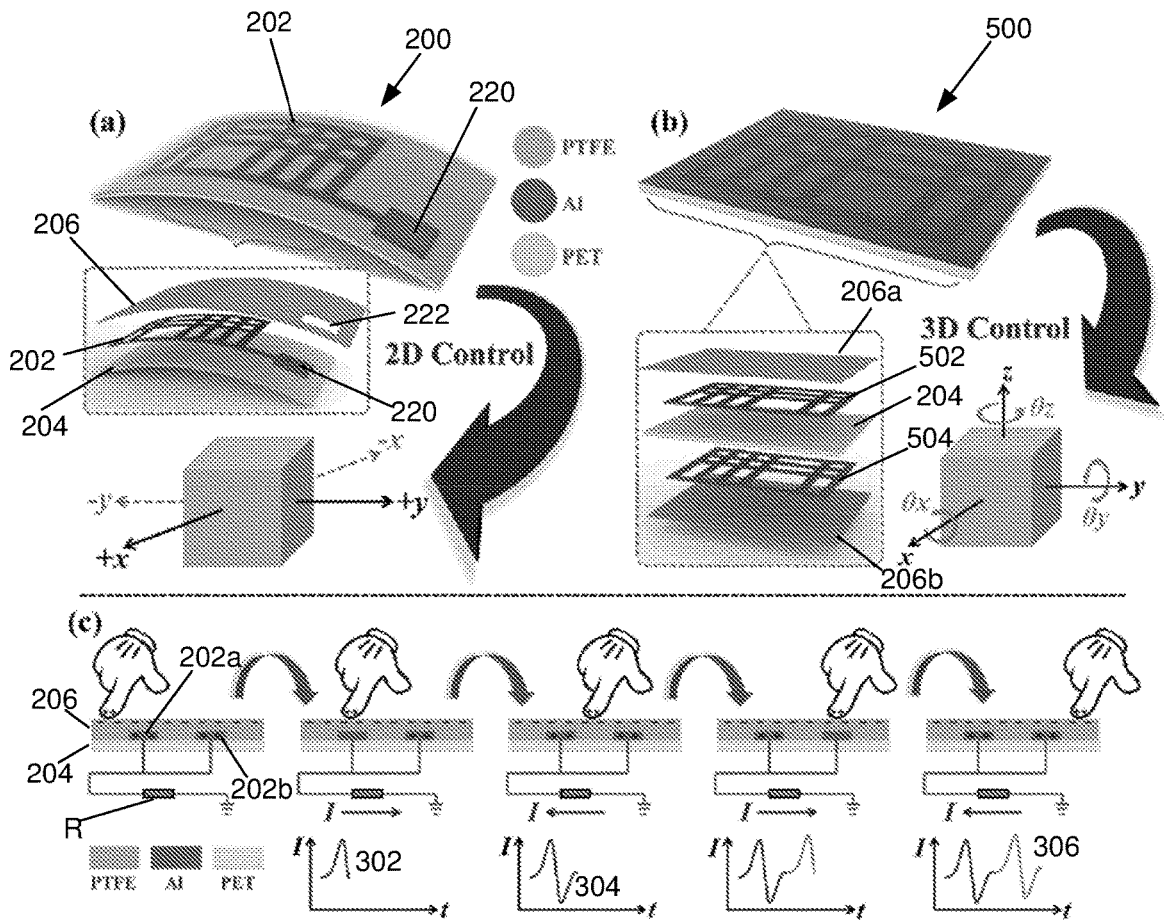
Figure 7:
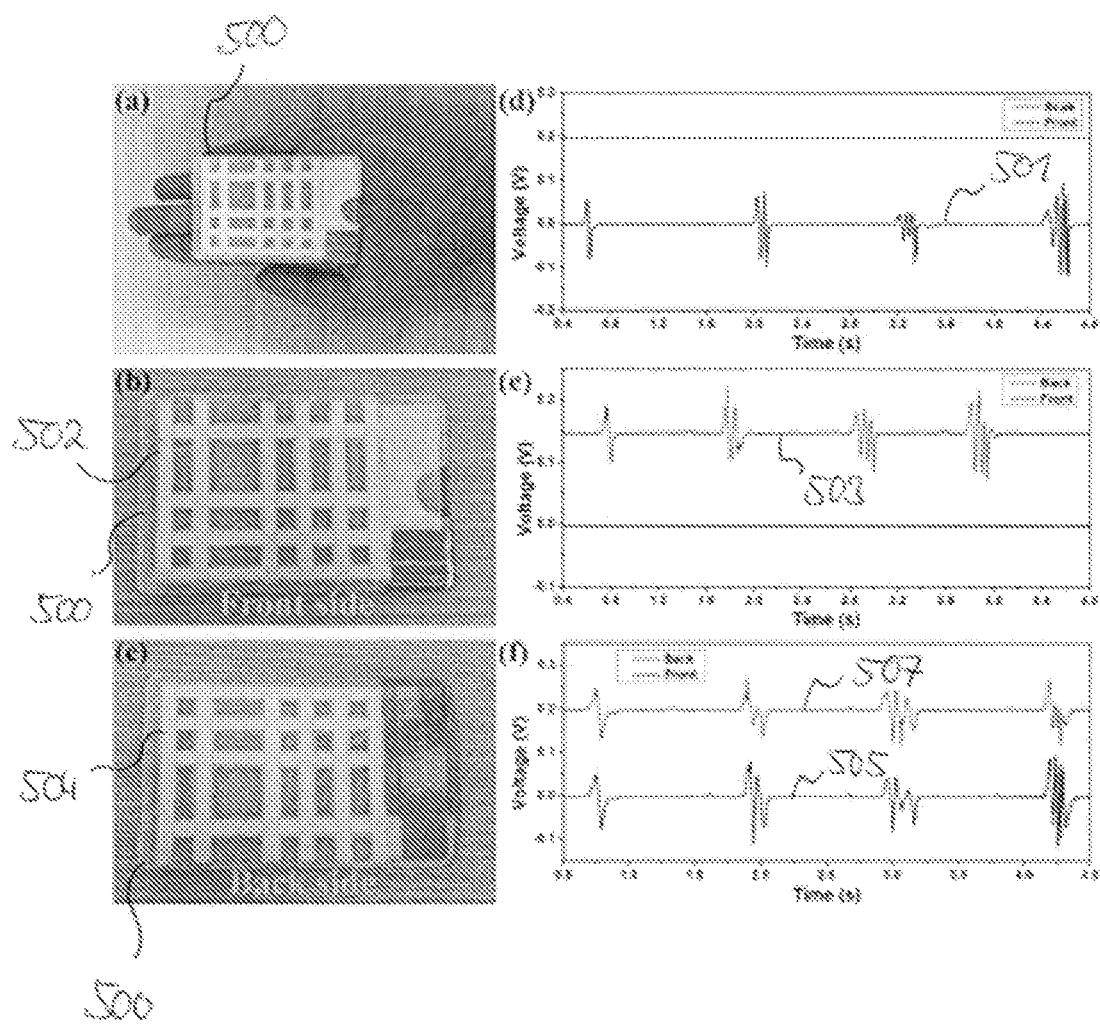
FIG. 7 illustrates output signals from an embodiment of a triboelectric sensor.
Figure 8:
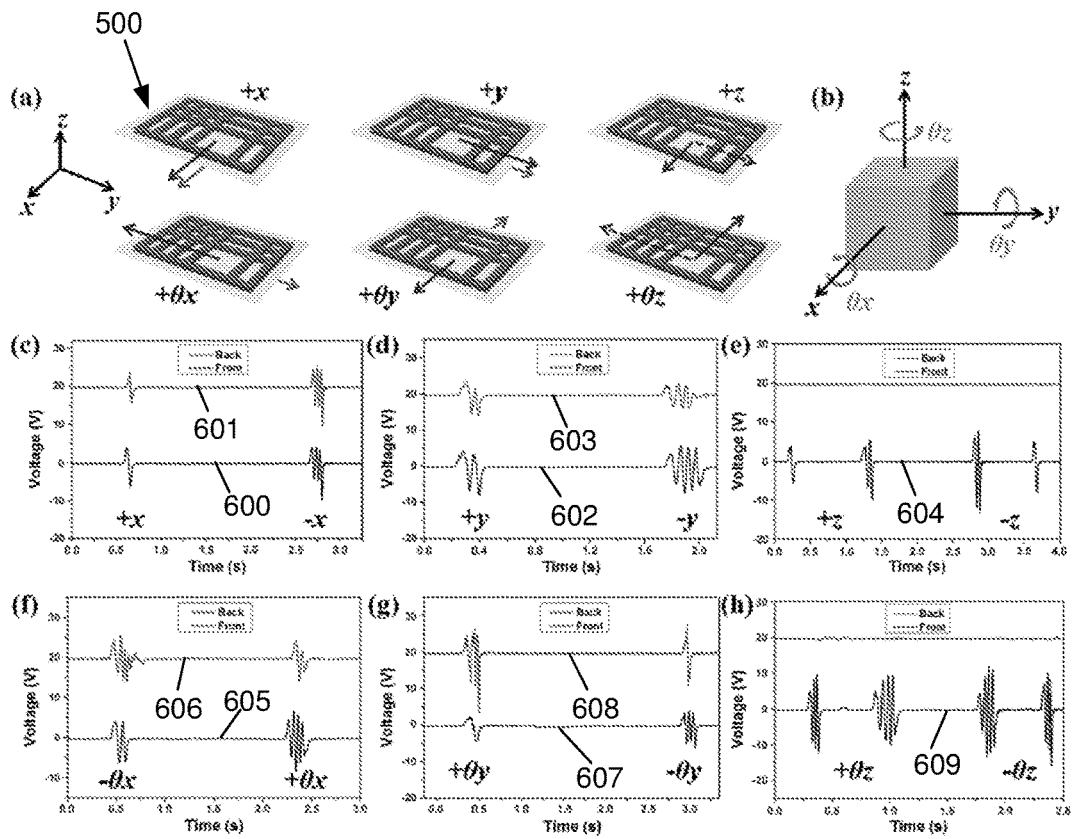
FIG. 8 schematically illustrates the use of an embodiment of a triboelectric sensor for 3D control, and the output signals generated during the use.

In another example embodiment, through integrating two 2D control devices e.g. on both sides of a card, a 3D control (x, y, z translation and rotation) in free space can advantageously be realised, as shown in FIG. 6(b), FIG. 7 and FIG. 8. FIG. 7(a),(b),(c) show a 3D control device 500 supported on a hand, in front side view and in back side view, respectively. Respective fingers are used for sliding on the front and back side of the device 500. FIG. 7(d) shows the output signal 501 from the front side 2D control device single electrode 502 when the finger on the front side of the device 500 is moved along the different directions (+/−x and +/−y directions as shown in FIG. 8(a)). FIG. 7(e) shows the output signal 503 from the back side 2D control device single electrode 504 when the finger on the back side of the device 500 is moved along the different directions (+/−x and +/−y directions as shown in FIG. 8(a)). FIG. 8(f) shows the output signals 505, 507 from the front and back side 2D control device single electrodes 502, 504 when the two fingers on the front and back side of the device 500 are moved simultaneously along the different directions (+/−x and +/−y directions as shown in FIG. 8(a)).

In an example embodiment, when both fingers slide towards the +x or −x direction, the controlled object is programmed to move one step in the +x or −x direction correspondingly. FIG. 8(c) shows the front and back single electrode output signals 600, 601 when both fingers slide in +x direction followed by sliding in −x direction. Similarly, when both fingers slide towards +y or −y direction, the object is programmed to move one step in +y or −y direction correspondingly.

FIG. 8(d) shows the front and back single electrode output signals 602, 603 when both fingers slide in the +y direction followed by sliding in the −y direction. In order to control the object to move in the +z or −z direction, the front finger (on the front side) slides consecutively across +x and +y, or conversely +y and +x. FIG. 8(e) shows the front single electrode output signal 604 when the front finger slides consecutively across the +x and +y directions, followed by sliding consecutively across the +y and +x directions. When the front finger slides towards the +x direction and the back finger slides towards −x direction, the object is programmed to rotate one step in the +θy direction (as shown in FIG. 8(b)). The reverse direction is the −θy direction. FIG. 8(f) shows the front and back single electrode output signals 605, 606 when the front finger slides towards the +x direction and the back finger simultaneously towards the −x direction, followed by the front finger sliding towards the −x direction and the back finger simultaneously towards the +x direction.

Similarly, when the front finger slides towards the +y direction and the back finger slides towards the −y direction, the object is programmed to rotate one step in the −θx direction (as shown in FIG. 8(b)), with the reverse direction for the +θx rotation. FIG. 8(g) shows the front and back single electrode output signals 607, 608 when the front finger slides towards the +y direction and the back finger simultaneously towards the −y direction, followed by the front finger sliding towards the −y direction and the back finger simultaneously towards the +y direction. For +θz or −θz control (as shown in FIG. 8(b)), the front finger slides consecutively across −x and −y, or conversely −y and −x. FIG. 8(h) shows the front single electrode output signal 609 when the front finger slides consecutively across the −x and −y directions, followed by sliding consecutively across the −y and −x directions.

Again, during the measurements, the fingers are lifted and moved back into the centre each time. When the finger is not sliding across a specific pattern, whether it is on the surface or in air, the signal is 0. Accordingly, 0 level is measured between the sliding motions as seen in the graphs.

Therefore, through the elegant, thin and flexible card design of device 500 according to an example embodiment together with a suitable controlling strategy, manipulation of an object in 3D free space can advantageously be achieved.

It is noted that a single electrode design, compared to e.g. the two electrodes design in the card controller device 500, can also be used for 3D control in different embodiments, where different grating structures are used for the electrode grids, e.g. on each of the sides of the card. Then the electrodes on both sides can be connected together into one single electrode to perform 3D control using a suitable signal detection from the (connected) single electrode.

An exemplary architecture for a triboelectric control system 900 for a small vehicle 930 is shown in FIG. 9(a). As shown in FIG. 9(a), the control system 900 includes a control side 910 and a vehicle side 920 with wireless communication between them. The control side 910 comprises the self-powered 2D-control patch 200 (FIGS. 5 and 6) for control signal generation, a processing circuit 912 to convert the signal into a square wave, a microcontroller unit (MCU) 914 to count the number of generated peaks according to the rising and falling edges of the square wave (one pair of rising/falling edges corresponding to a single peak), and then send a command signal to the wireless module 916, and a wireless signal transmitter 916 to communicate with the vehicle side 920. A power supply may be used for the operation of the processing circuit 912, MCU 914 and wireless transmitter 916, in order to detect the self-generated voltage signals from the 2D-control patch 200. In some embodiments, energy generated by the triboelectric sensor 200 itself may be used to power the various components.

Figure 9:
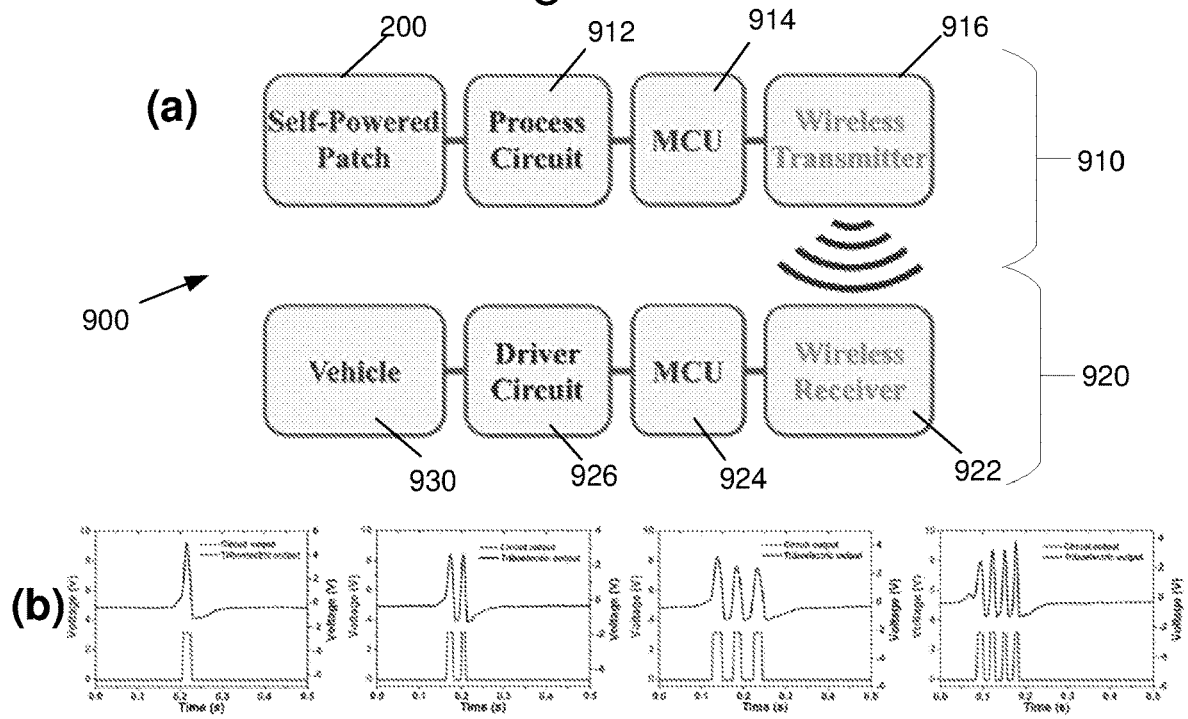
FIG. 9 shows the block architecture of another embodiment of a triboelectric control system.

On the vehicle side 920, first the wireless signal receiver 922 will send the received signal from the control side 910 to another MCU 924, and then the MCU 924 will generate respective signals for the driver circuit 926 to control the movement of the vehicle 930 (i.e., going forward/backward, and turning left/right). FIG. 9(c-f) depict the triboelectric output from the 2D-control patch 200, and the square wave output after the processing circuit 912. Due to the parallel connection of the processing circuit 912 mainly comprising a comparator circuit, the overall measurement impedance is decreased compared to previous measurements, leading to a reduced absolute value in the triboelectric outputs and smaller value variation of output peaks. It can also be observed that the negative peaks of the generated triboelectric signals are less significant. After the processing circuit 912, the analogue triboelectric outputs are converted into square wave outputs that can be easily recognized by the MCU 914. Through counting the number of the output peaks in a certain period, each control command can be clearly identified and send to the control side 920 for vehicle movement control.

Figure 10:
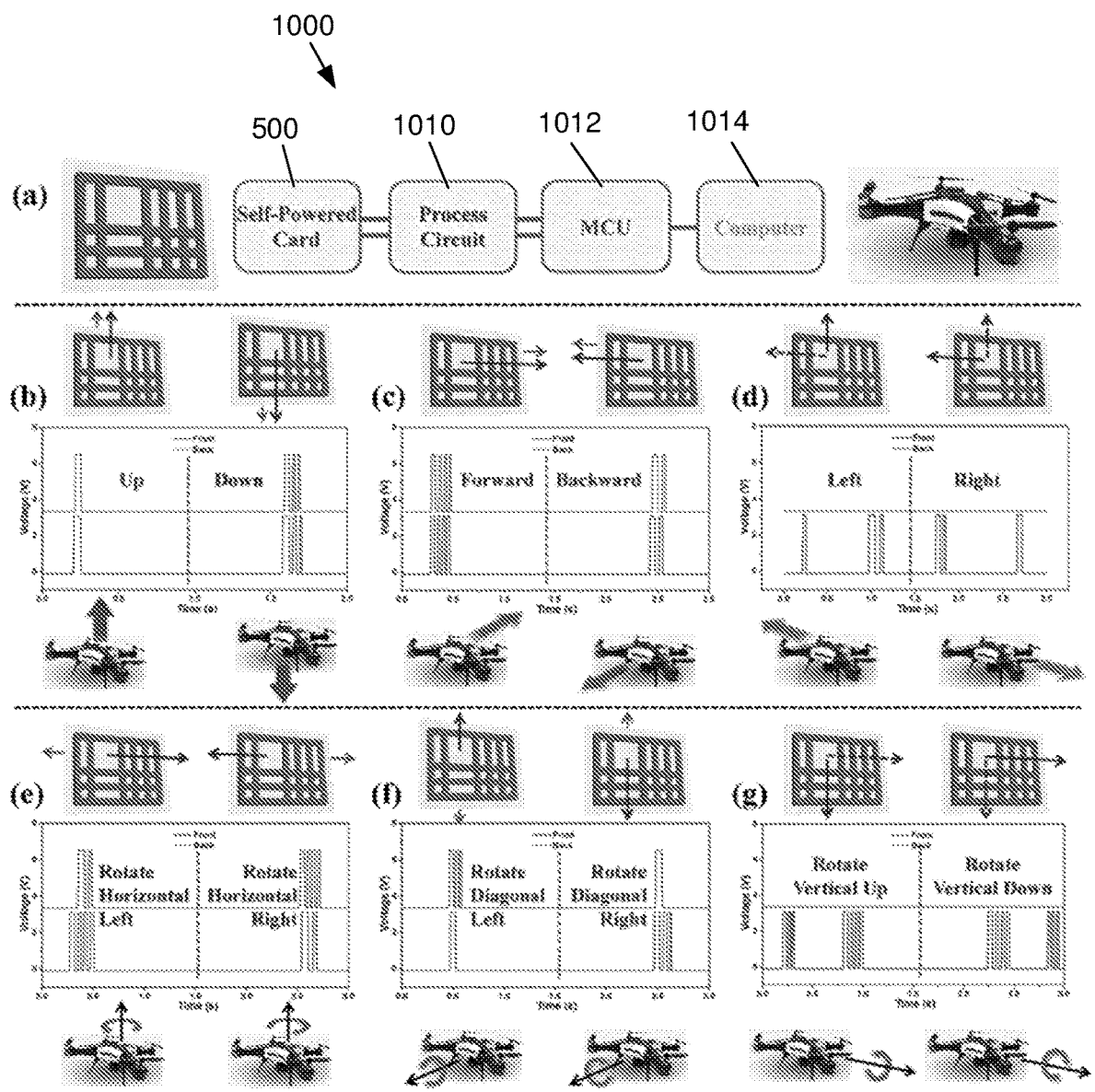
FIG. 10 illustrates use of the triboelectric control system for 3D motion control of a drone.

Use of the 3D control card 500 for real-time control of a virtual drone is illustrated in FIG. 10. As shown in FIG. 10(a), a control system 1000 comprises the 3D-control card 500 for two-channel control signal generation, a processing circuit 1010 for triboelectric output to square wave output conversion, MCU 1012 for counting the number of output peaks in both channels and sending the corresponding control commands, and a computer 1014 for generating the respective movements of the drone after receiving the control commands. FIG. 10(b-g) depict the finger operations of the 3D-control card 500 on its two surfaces, the generated signals from the two channels after the processing circuit, and the corresponding movements of the drone in virtual space with six degrees of freedom (up/down, forward/backward, left/right, horizontal left/right rotation, diagonal left/right rotation, and vertical up/down rotation).

In further embodiments, the grid structure may be configured using information coding. In a first example of this type of configuration, the grid structure may be encoded with large/small electrode width, where the output patterns can be differentiated through the relative amplitude of output peaks (also referred to herein as L/S coding). The second type of configuration is based on information coding with and/or without a strip electrode at a pre-defined position (also referred to herein as 0/1 coding). Accordingly, the output signal patterns can be interpreted from the positions of the generated signal peaks in the time domain.

Advantageously, by the use of L/S or 0/1 coding, it is possible to reduce the number of grid lines required to differentiate between different directions in the plane of the sensor, resulting in a more compact device design. Embodiments therefore enable the realisation of highly scalable and single-electrode triboelectric interfaces, for various applications including 3D control, security, VR/AR, human-machine interaction, robotics, etc.

Figure 11:
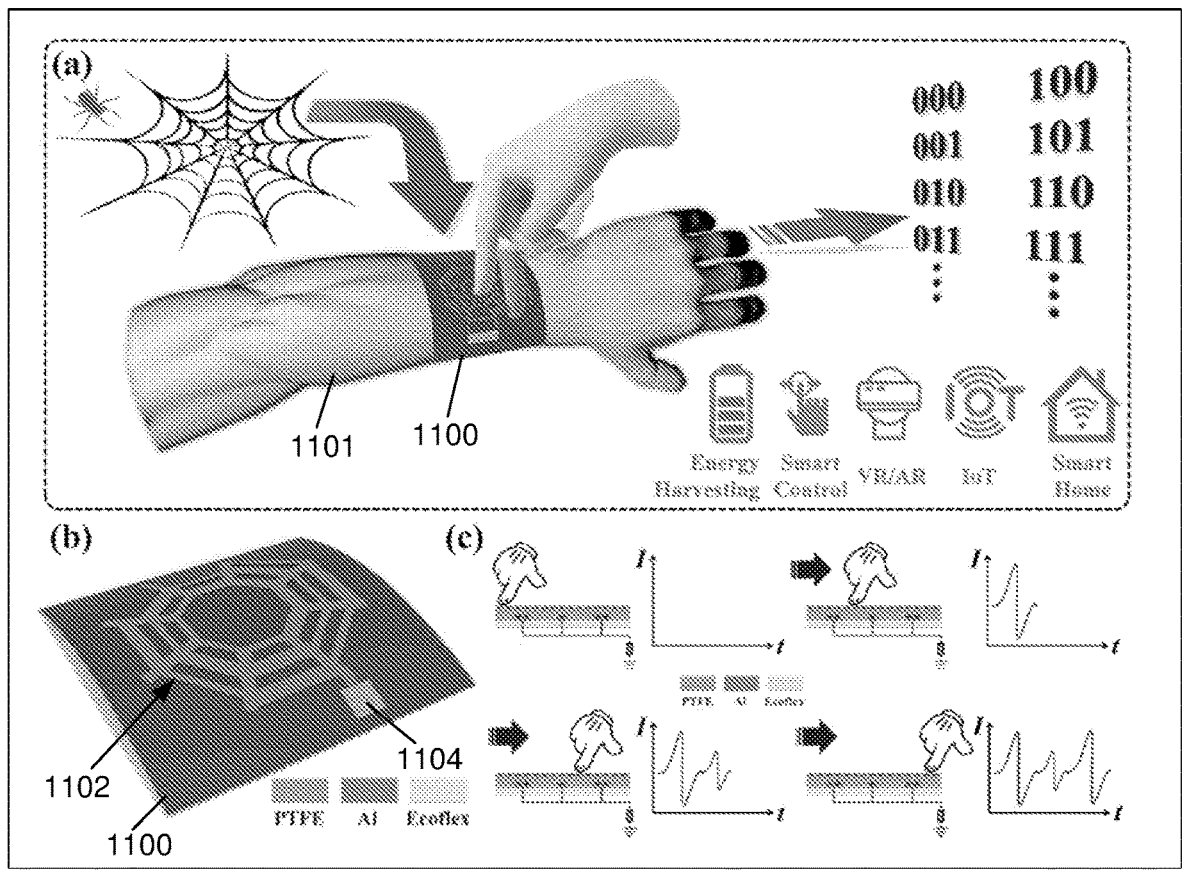
FIG. 11 shows a further embodiment of a triboelectric control system.

A schematic diagram of a triboelectric sensor 1100 attached on a human arm 1101 is shown in FIG. 11(a). FIG. 11(b) shows a schematic of a sensor 1100 with L/S coding, with all the grid lines (electrodes) being connected together to form a single grid structure electrode. As can be seen in FIG. 11(b), the device 1100 includes a grid 1102 having eight directions, each direction being characterised by a different pattern of grid lines. Each pattern differs in number of grid lines, and widths of the respective grid lines, from each other pattern. The device 1100 may comprise only three thin layers, for example, an Ecoflex substrate, a patterned Al electrode 1102, and a polytetrafluoroethylene (PTFE) friction layer, similarly to device 200, providing a very compact device configuration. The Al electrode 1102 is buried between the substrate and the friction layer, with the exception of contact pad 1104 which is exposed to connect the electrode 1102 to an external circuit.

With the L/S coding design, a large output peak is generated when sliding across a grid line with large width, and similarly, a small output peak is generated when sliding across a grid line with small width. Then the output peaks with relative large and small amplitude can be analysed to interpret the coding information on the electrodes.

The operating principle of the single-electrode sensor 1100 with L/S coding is illustrated in the schematic of FIG. 11(c), and is similar to the operating principle of the sensor 200 of FIGS. 5 and 6, except that the heights of the output peaks differ due to the relative widths of the grid lines of grid 1102. When finger F slides on the area of the first strip electrode (large), a large amount of positive charges in that electrode are forced to flow into ground due to the generation of an electric potential difference, resulting in a large positive peak in the external circuit. Next, when the finger F slides out of the area of the first strip electrode, a large amount of positive charge is forced to flow back to the electrode. Then a large negative peak is generated in the external circuit. Similarly, when finger F slides across (i.e., on and out of) the second strip electrode (small) and the third strip electrode (large), a small output peak and a large output peak are then generated correspondingly, as shown in FIG. 11(c).

Thus the coding electrode pattern in the sliding direction can be decoded accordingly based on the relative amplitudes of the output peaks.

Figure 12:
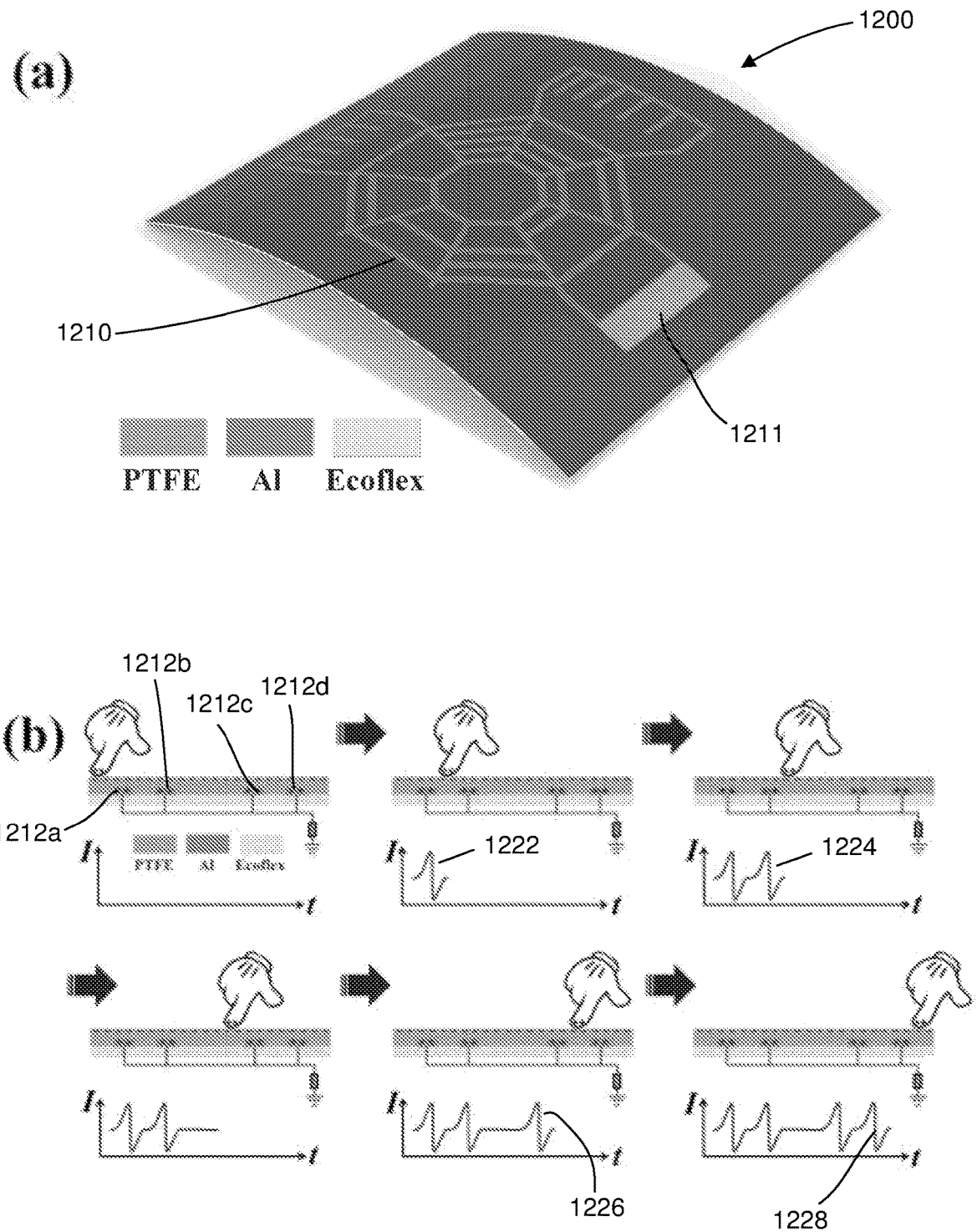
FIG. 12 shows signals generated by a sensor of the triboelectric control system of FIG. 11.
Figure 12:
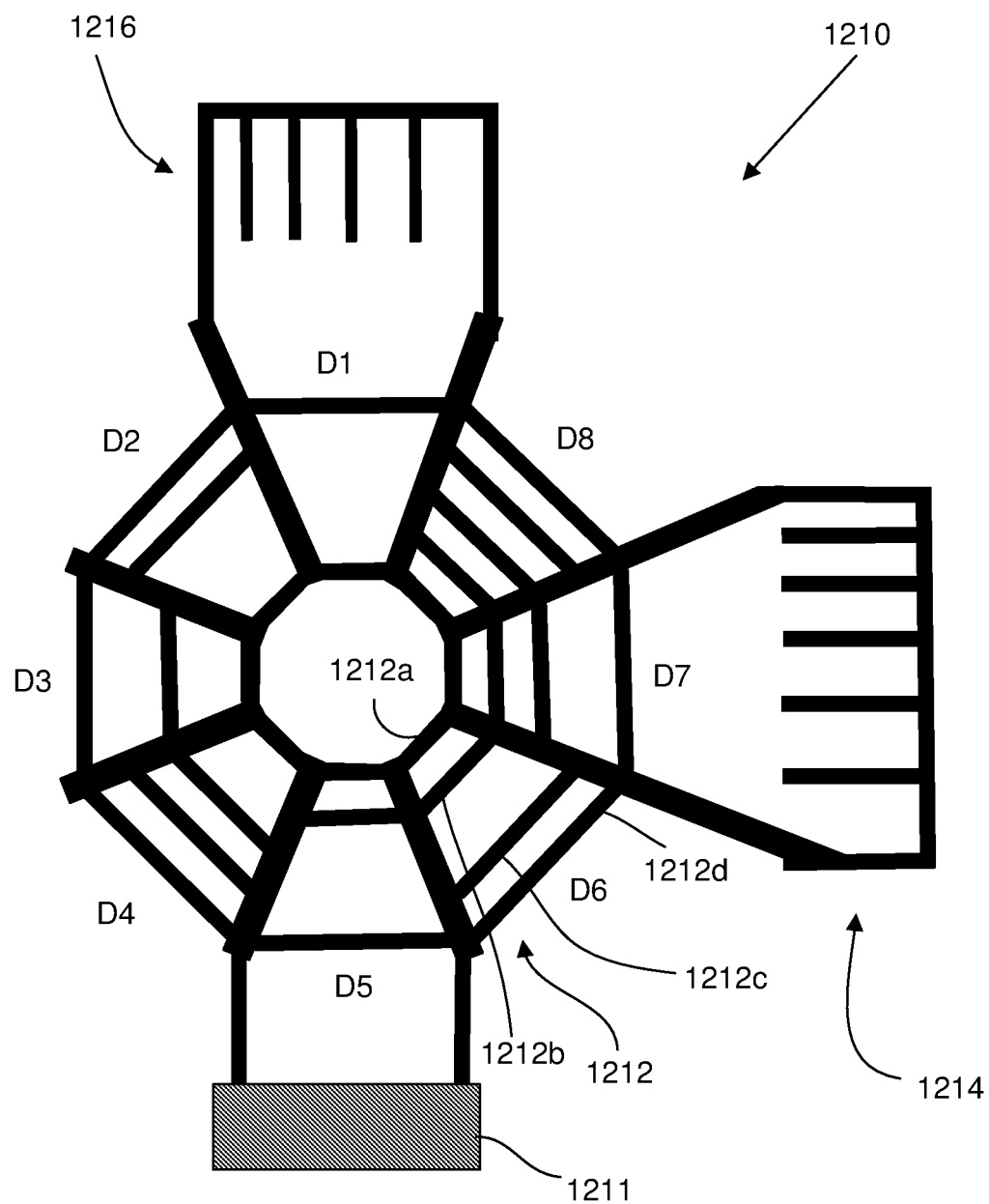
Figure 12:
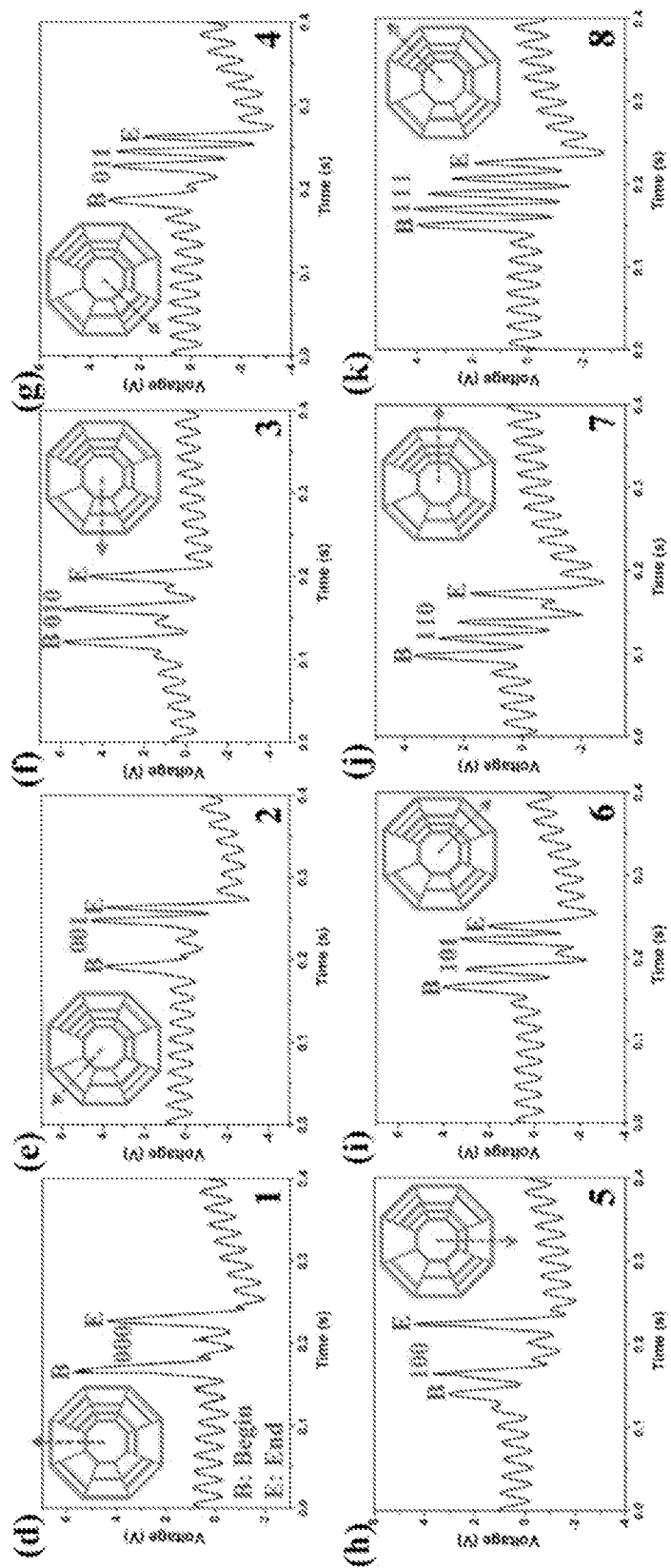

An example of an alternative sensor 1200 that makes use of 0/1 coding is shown in FIG. 12. A sensor 1200 with 0/1 coding may have advantages over L/S coding, as the output signals may be more readily interpretable, and the spacing between grid lines may be kept smaller.

The sensor 1200, as for sensor 1100, may include a substrate, an AI electrode 1210 disposed on the substrate, and a friction layer (e.g. PTFE) disposed on the electrode 1210, with the electrode being buried between the substrate and the friction layer except for a portion 1211 which is exposed and acts as a contact pad for connecting the electrode 1210 to an external circuit.

As depicted in FIGS. 12(a) and 12(c), the electrode pattern in each direction D1-D8 on the grid 1210 may comprise one beginning electrode 1212a and one ending electrode 1212d as reference points for the recognition of the positions of the output peaks in the time domain. Intermediate electrodes may be arranged to be present or absent in accordance with a 3-bit binary code of 000, 001, 010, 011, 100, 101, 110, and 111 (where "1" means that there is one strip electrode in that position and "0" meaning that there is no strip electrode in that position). Three intermediate electrode positions are shown in FIGS. 12(a) and 12(c), to encode eight different directions (denoted D1-D8 in FIG. 12(c)). It will be appreciated that fewer or more intermediate electrode positions may be adopted in certain embodiments, depending on the number of directions that are to be encoded. For example, if only four distinct directions are required, then a grid 1212 with two intermediate electrode (grid line) positions per direction may be adopted.

When sliding across the beginning electrode 1212a, there is always one output peak generated. Then if there is a strip electrode 1212b in the first coding position, another output peak is generated. If there is no strip electrode in the first coding position, no output peak is generated and the signal remains as 0. The same applies for the second and the third coding positions. After three coding electrodes, another output peak is generated from the ending electrode 1212d as another reference point. Therefore, based on the information-coding electrode patterns, output signals with different peak positions in the time domain will be generated, which can be decoded to reveal the coded information. The amplitude of the output peaks can be ignored in this decoding process, offering a more straightforward and reliable detection mechanism via the detection of presence or absence of peaks in the time domain signal.

The operating principle of sensor 1200 is illustrated in FIG. 12(b) for electrode pattern "101", corresponding to direction D6 in FIG. 12(c). When finger F slides across the beginning strip electrode 1212a, an output peak 1222 is generated in the external circuit. Then when finger F slides across the first coded strip electrode ("1") 1212b, another output peak 1224 is generated. Moving forward, when finger F is sliding on the area of the second coded strip electrode ("0"), no output peak is generated since no strip electrode is present due to the "0" coding. After that, two output peaks 1226, 1228 are generated when finger F slides across the third coded strip electrode ("1") 1212c and the ending strip electrode 1212d. Since finger F is sliding on the sensor 1200 with a relatively constant speed, the 0/1 coding information can be interpreted from the positions of the generated peaks in the time domain.

FIG. 12(c) shows a schematic of an electrode grid 1210 of the eight-direction sensor 1200, with a central grid portion 1212 encoding the directions D1-D8 for in-plane control, and two additional grid portions having sensing patterns 1214 and 1216 for potential up/down and rotation control. The corresponding output signals for these eight directions are presented in FIG. 12(d-k). The letter "B" and "E" in the graphs denote the beginning reference point and ending reference point from the two reference electrodes 1212a and 1212d. With the help of these two reference points, the coding information in the electrode patterns can be interpreted accordingly. For example, if there is no output peak between the two reference points, it means that the coding information is 000. If there are three output peaks between the two reference points, it means that the coding information is 111. With one output peak in between, the coding information can be 001, 010, or 100, according to the position of the peak, i.e., closer to the ending reference point (001), in the middle of the two reference points (010), or closer to the beginning reference point (100). Similarly, if there are two output peaks in between, the coding information can be 011, 101, or 110, according to the positions of the two output peaks, i.e., both closer to the ending reference point (011), one closer to the beginning reference point and one closer to the ending reference point (101), or both closer to the beginning reference point (110). Through measuring the peak position with respect to the two reference points in the time domain, the coding information in each direction can be decoded. The robustness of the device 1200 and detection mechanism regarding the variation of sliding speed is discussed below in Example 3. The experimental results indicate that as long as the sliding speed does not vary by more than 40%, the coding information can be correctly decoded and all directions can be recognised.

The sensor 1200 with 0/1 coding may be adopted for 3D drone control, with the eight 0/1 coding electrode patterns for multi-directional in-plane control and the two additional electrode patterns for rotation and up/down control. In this regard, 3D drone control can be realised using the sensor 1200 with only one electrode output. To differentiate the output signal patterns from those of in-plane control, the electrode pattern 1216 for rotation control may be configured with six strip electrodes while the electrode pattern 1214 for up/down control may be configured with seven strip electrodes. To further distinguish the direction of sliding left/right and up/down, the spacing of these electrodes may be varied from small to large in each pattern. Then according to the number of output peaks and the trend of the peak intervals (increasing or decreasing), left/right rotation control and up/down control can be determined.

Figure 13:
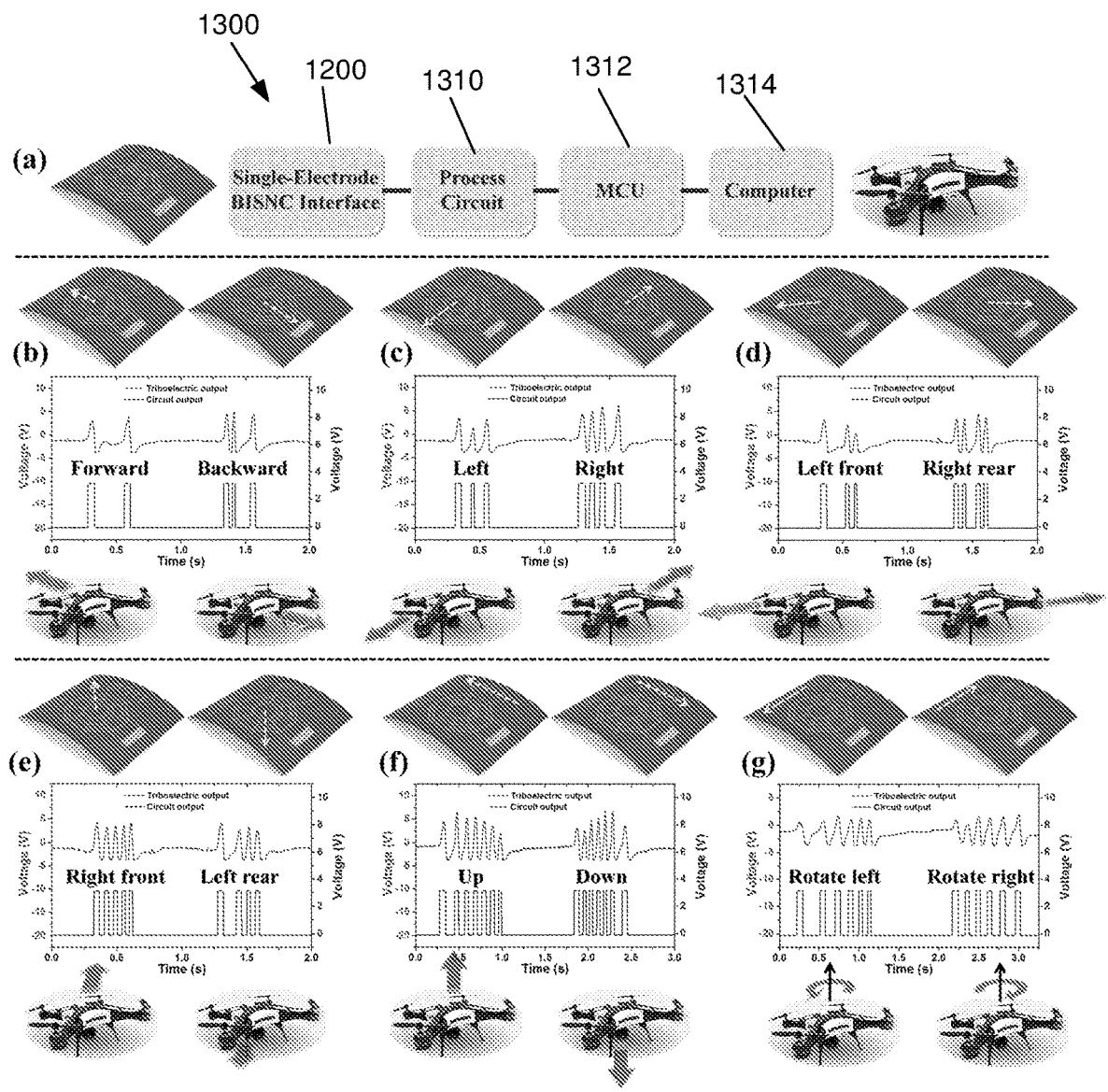
FIG. 13 shows an embodiment of a triboelectric sensor and signals generated thereby.

In one embodiment, the sensor 1200 may be adopted for 3D control of a virtual drone in cyber space. As shown in FIG. 13, a triboelectric control system 1300 comprises an eight-direction sensor 1200 as the control interface, a processing circuit 1310 for triboelectric signal detection and conversion into square wave signal, a microcontroller unit (MCU) 1312 for signal recognition and control command generation, and a computer 1314 for drone manipulation based on control command. The interface 1200 is programmed with the MCU 1312 to control the 3D motions of the drone intuitively according to different finger sliding operations. First the eight directions with 0/1 coding electrodes are programmed to control the in-plane motions of the drone, i.e., forward, backward, left, right, left front direction, right rear direction, right front direction and left rear direction. The generated triboelectric signals from the interface 1200 and the square wave signals after the processing circuit 1310 for the eight directions are depicted in FIG. 13(*b-e*). The corresponding finger sliding traces on the interface 1200 and drone motions in 3D space are also shown as insets. Then the right electrode pattern 1214 of seven strip electrodes with varying spacing is programmed to control the up/down motion of the drone when sliding up or down by finger. The top electrode pattern 1216 of six strip electrodes with varying spacing is programmed to control the in-plane rotation motion of the drone under left/right finger sliding. The generated triboelectric signals and the square wave signals for the up/down and in-plane rotation drone control are illustrated in FIGS. 13(*f*) and 13(*g*), together with the corresponding finger sliding traces and drone motions.

In addition to application in 3D control as described above, embodiments of the presently disclosed sensors may be used for other applications such as security code entry. For instance, 4 directions can be defined using two-bit coding electrodes, 8 directions can be defined using three-bit coding electrodes, 16 directions can be defined using four-bit coding electrodes, etc.

Figure 14:
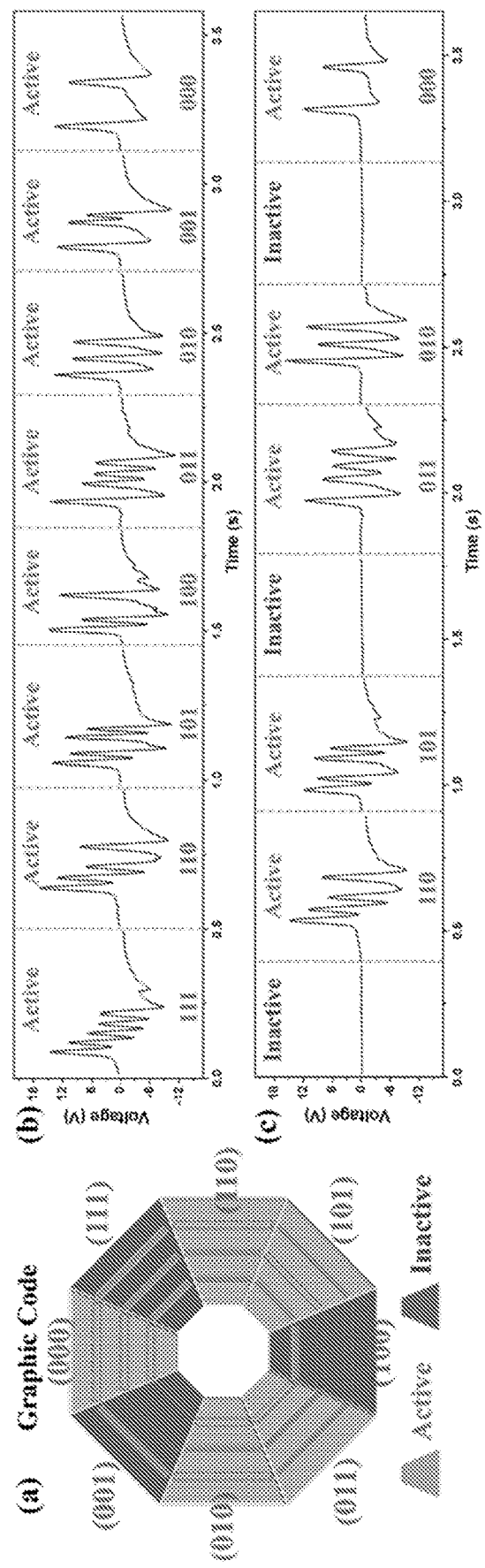
FIG. 14 shows another embodiment of a triboelectric sensor and signals generated thereby.

In one embodiment, an eight-direction 0/1-coding sensor may be adopted as the interface of a security code system. Two types of coding strategies may be implemented using the device, that is, a graphic code and a digital code, as depicted in FIGS. 14(*a*) and 15(*a*). In the graphic code system, each direction is only regarded as active or inactive. To set the code, one can select which direction is active and which direction is inactive. Then in order to trigger the code, one only needs to remember all the active directions and slide, regardless of the sliding order. Thus the graphic code is very straightforward and easy to remember, provides a fast response in both triggering and recognition, and importantly, requires no specific order of sliding. As long as one slides all the "set" active directions, the code is considered as correct. FIG. 14(*b,c*) show a first example of a graphic code with all the directions set as active and a second example of only directions of east, southeast, southwest, west and north set as active, respectively.

Figure 15:
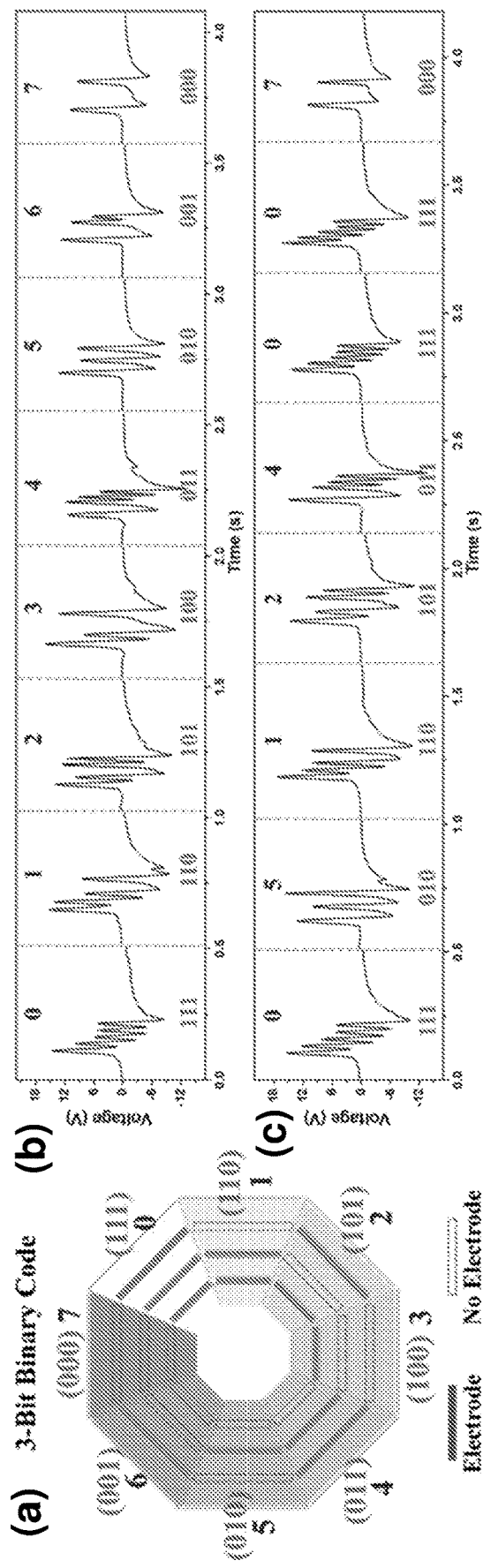
FIG. 15 shows a yet further embodiment of a triboelectric sensor and signals generated thereby.

In the digital code embodiment, each direction is treated as one digit of an octal code, i.e., from 0 to 7. To set the code, one slides each direction in a specific order. Then to trigger the code, one slides all the selected directions in the same order. Thus to successfully enter the code, one needs to remember both the numbers (directions) and the order. It can be seen that the digital code system is more similar to a traditional code system and it offers a higher safety level compared to the graphic code. FIGS. 15(*b*) and (*c*) show two examples of time-domain signals for digital codes: one with "01234567" as the code and one with "05124007" as the code.

In certain embodiments, the interface 1200 can be configured into one of the above two code systems according to the usage requirements and user's preference.

Figure 16:
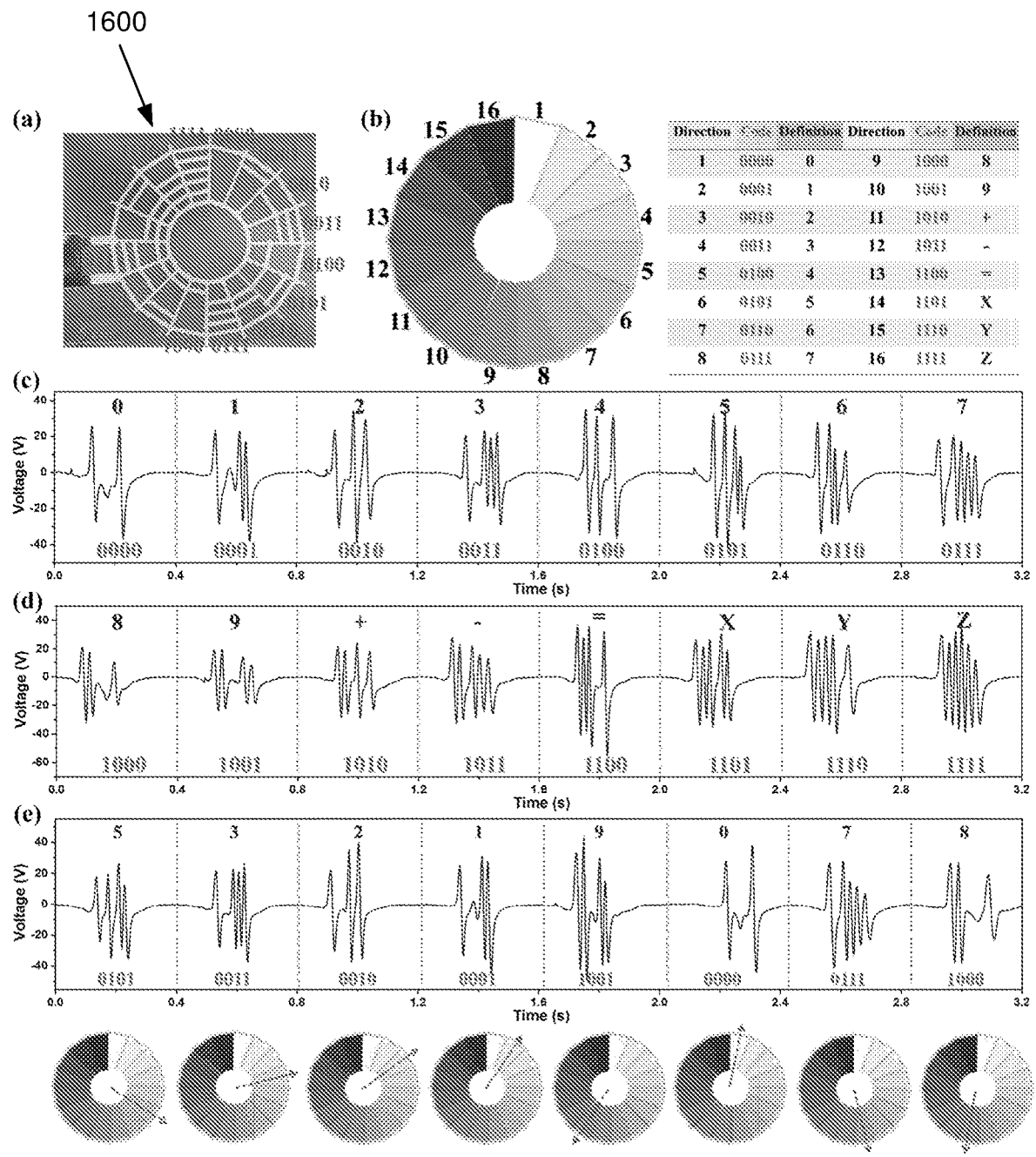
FIG. 16 shows a yet further embodiment of a triboelectric sensor and signals generated thereby.

An example of a sixteen-direction 0/1-coding interface 1600 with 4-bit binary code is shown in FIG. 16(*a*). FIG. 16(*c,d*) depict the corresponding output signals from the sixteen directions, showing the 4-bit binary coded electrodes between the two reference (beginning and end) electrodes can be differentiated according to the time-domain output peaks.

Figure 38:
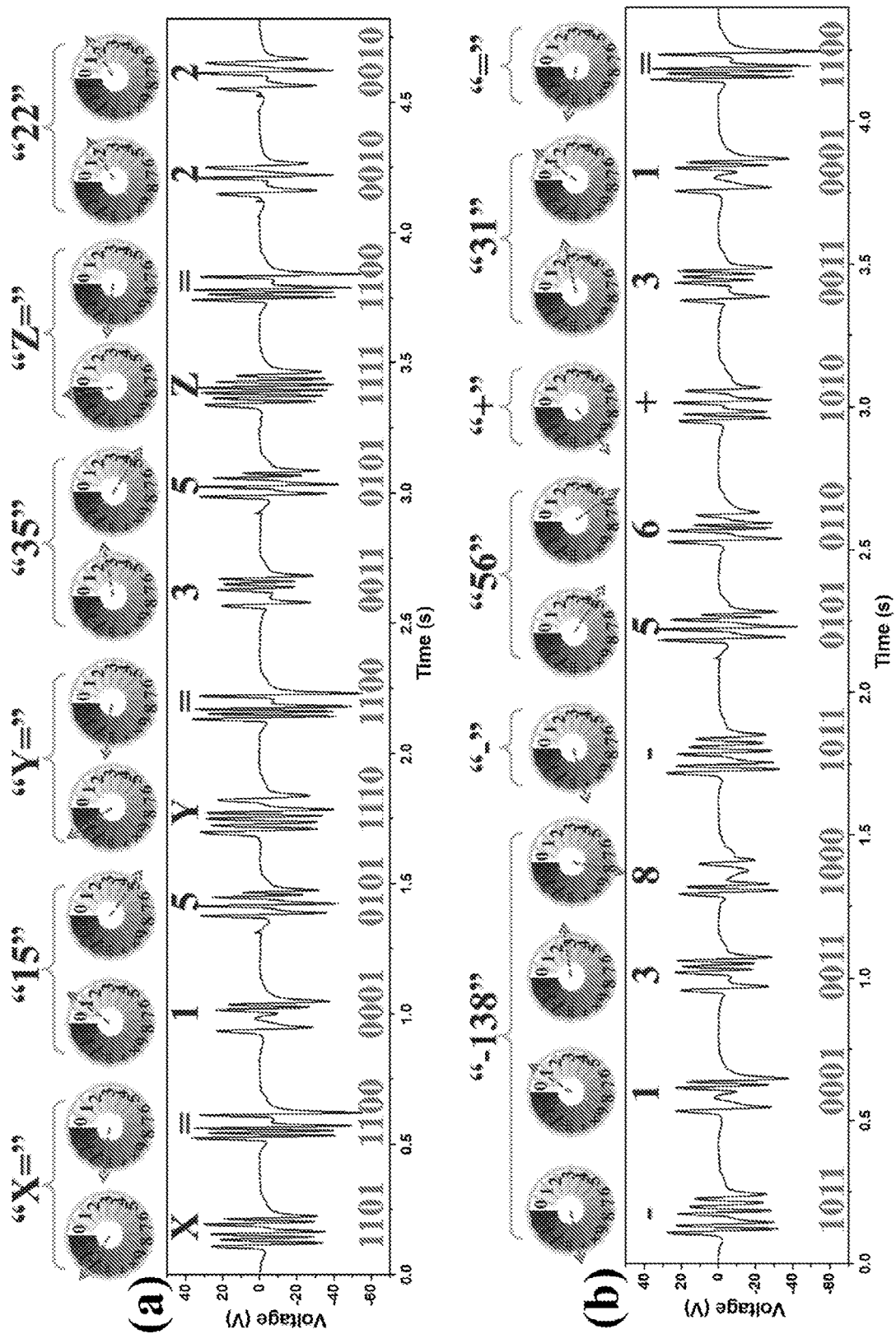
FIG. 38 shows application of a triboelectric sensor with a grid configured according to 0/1 coding as an interface for a calculator.

In addition to the security code system described above, the sixteen-direction interface can also be used for Binary Coded Decimal (BCD) and other functions, as illustrated in FIG. 16(*b*). For instance, the sixteen-direction interface can be used to set the spatial coordinates of a point (15, 35, 22) by consecutively sliding across direction 14, 13, 2, 6, 15, 13, 4, 6, 16, 13, 3 and 3 ("X" "=" "1" "5" "Y" "=" "3" "5" "Z" "=" "2" "2"). In another example, the sensor 1600 can function as the input interface of a calculator, e.g., to calculate the result of "−138−56+31=" by consecutively sliding across direction 12, 2, 4, 9, 12, 6, 7, 11, 4, 2 and 13 ("−" "1" "3" "8" "−" "5" "6" "+" "3" "1" "="), as depicted in FIG. 38. The sixteen-direction interface 1600 can be used to provide each digit of a password varying within the decimal number (i.e., from 0 to 9). FIG. 16(*e*) shows the corresponding output signals for the coding information of "53219078", together with step-by-step sliding indications on the respective directions.

EXAMPLES

Example 1

Figure 2:
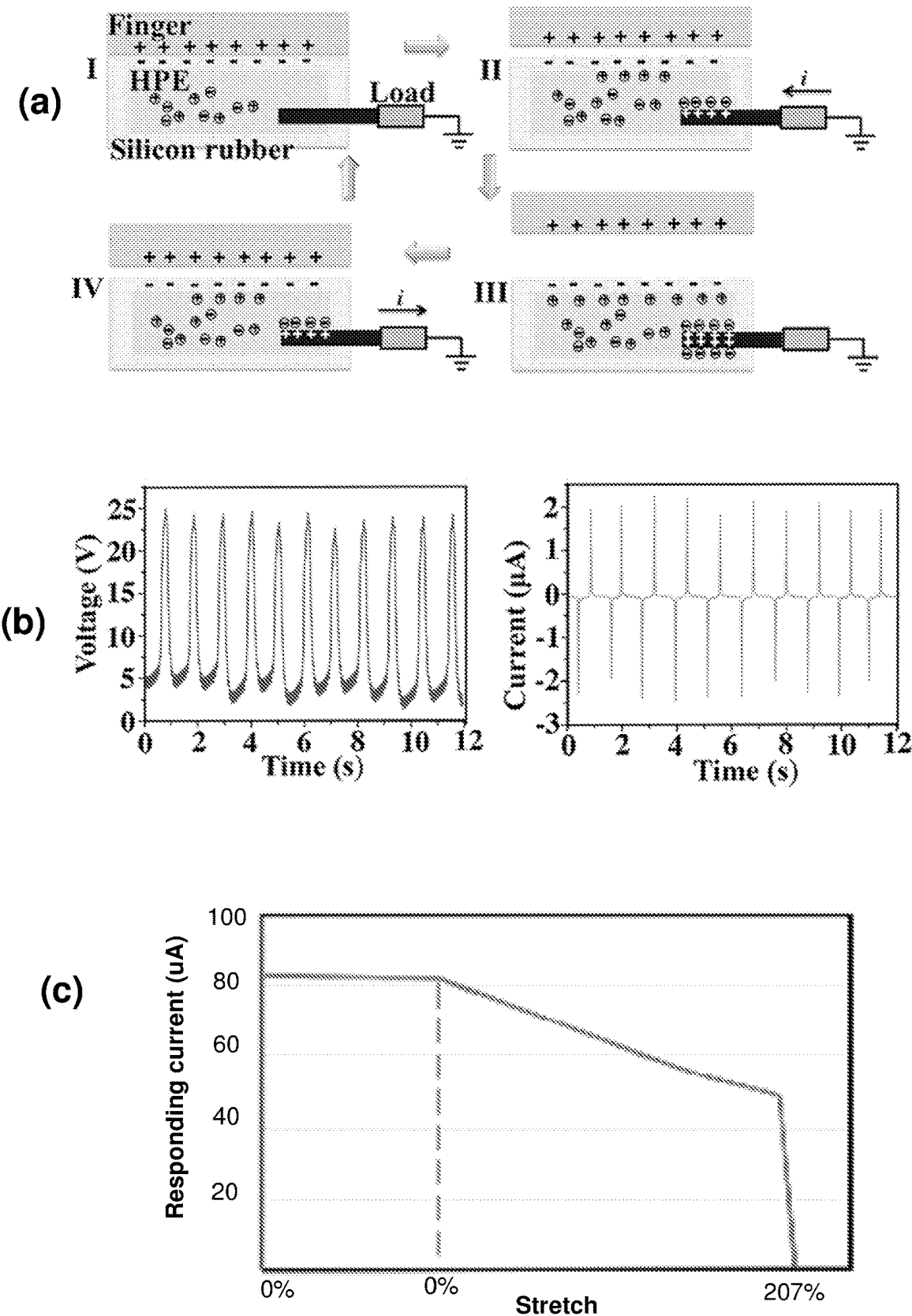
FIG. 2 shows the TENG based working mechanisms of an HPE electrode, and the electrical characteristics of the electrode.
Figure 22:
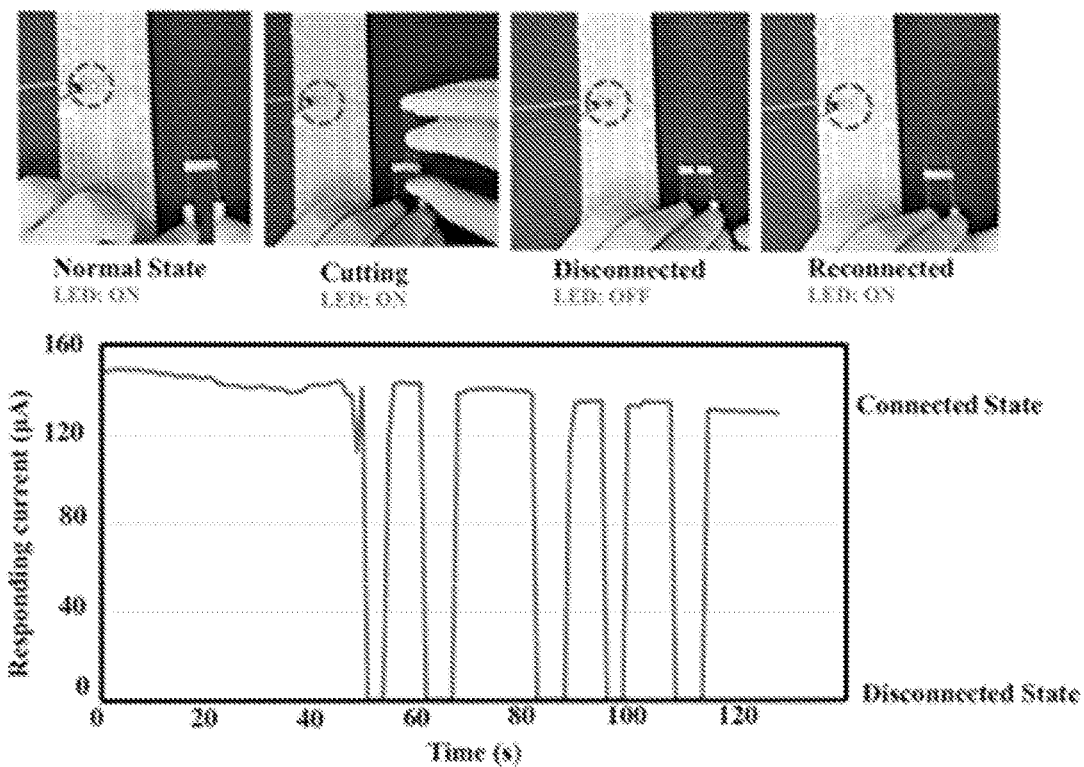
FIG. 22 is a graph of current as a function of time for an electrode fabricated by the process of FIG. 21.

As shown in FIG. 2(*a*), a sensor device 10 was fabricated with electrodes formed from HPE. The HPE was then examined under stretched motion by a linear motor. In the stretching process, the resistance range was about 18 KΩ-30 KΩ based on an applied voltage of 1.5 V. The electrical characteristics curve is shown in FIG. 2(*c*). It can be seen that the electrode material still exhibits good electrical conductivity under a stretchable state up to 200% strain. Demonstration and test curves of its electrical conductivity are shown in FIG. 22. Dimensions of the 2D sensor 10 are listed in Table S1.

TABLE S1

Dimensions of the sensor

| Parameter Name | Value |
|---|---|
| Length of device | 80 mm |
| Width of device | 80 mm |
| Length of each electrode | 70 mm |
| Width of each electrode | 10 mm |
| Width of grid line | 2 mm |
| Thickness of grid line | 1.5 mm |
| Side length of each small lattice | 10 mm |
| Thickness of electrode | 1.5 mm |
| Thickness of silicone rubber | 2 mm |

Figure 21:
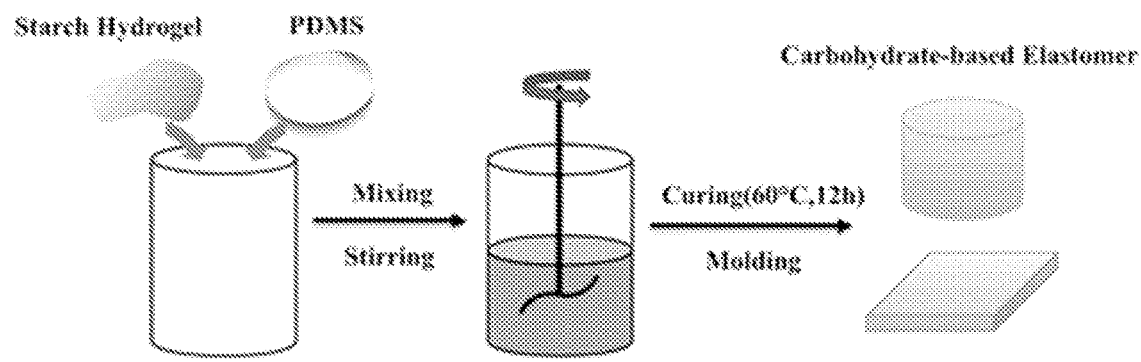
FIG. 21 is a schematic depiction of a process for fabricating a carbohydrate-based elastomer for an electrode of the triboelectric sensor of FIG. 1(b) or FIG. 1(c)

As shown in FIG. 21, a carbohydrate-based elastomer may be fabricated for use as a flexible electrode material. Liquid PDMS was prepared by mixing silicone elastomer base and cross-linker (Sylgard 184, Dow Corning) at a mass ratio of 10:1. Both starch-based hydrogel and liquid PDMS were degassed in a vacuum chamber to remove gas bubbles in the gel. Then they were mixed together at a volume ratio of 3:1 to obtain a precursor of carbohydrate-based elastomer. To remove the bubbles in the precursor, the precursor was centrifuged for 10 min at a speed of 3000 rpm.

Figure 17:
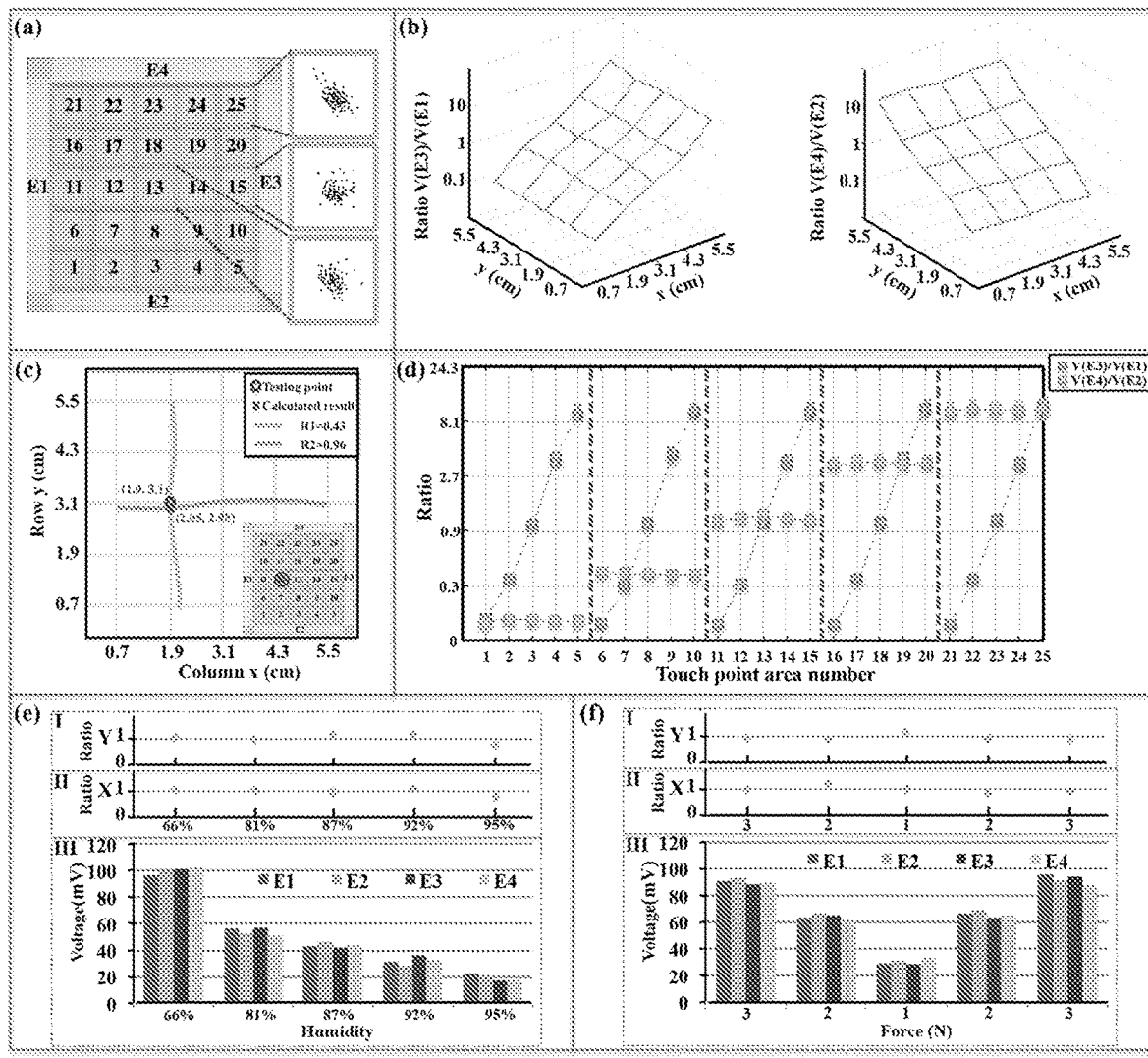
FIG. 17 shows test results from the triboelectric sensor of FIG. 1(b)

Voltage ratios for electrodes E1-E4 of the sensor 10 were measured at various points on the grid 22. FIG. 17 shows (a) 100 tests of voltage ratios of opposite electrodes at lattice points No. 13, No. 15, and No. 25, showing good centrality. (b) Voltage ratios of E3 and E1 with 25 testing points, and the voltage ratios of E4 and E2 with 25 testing points. (c) Comparison between the test location and the actual location. (d) The average values and the standard deviation values of the ratios $V_{E3}/V_{E1}$ and $V_{E4}/V_{E2}$ in a sequential order. (e) Tests of sensor 10 under varying humidity. (f) Tests of sensor 10 under varying force.

To generate the results in FIG. 3(a), measurement for each virtual "pixel" or cell (1-25) was repeated 100 times to calculate the average value as the standard contact point in the square area. For each point, 100 groups of the peak output voltages were obtained in advance. Because of the restriction imposed by the grid 22, the finger contact points with the silicone rubber substrate are mainly concentrated in the centre area of each pixel. With 100 tests, we obtained stable outputs, and the voltage ratios also show notable aggregation. Then the ratios of $R_1 = V_{E3}/V_{E1}$ and $R_2 = V_{E4}/V_{E2}$ of each group were calculated, as shown in FIG. 17(b). The average values of the calculated $R_1$ and $R_2$ for each touch point are listed in Table S2 and Table S3, respectively.

TABLE S2

Voltage ratios calculated ($R_1$).

|  | x = 0.7 | x = 1.9 | x = 3.1 | x = 4.3 | x = 5.5 |
|---|---|---|---|---|---|
| y = 5.5 | 12.25 | 12.11 | 11.06 | 10.13 | 10.69 |
| y = 4.3 | 3.92 | 3.88 | 4.26 | 3.38 | 3.72 |
| y = 3.1 | 1.26 | 0.98 | 0.99 | 1.37 | 1.19 |
| y = 1.9 | 0.44 | 0.50 | 0.39 | 0.37 | 0.35 |
| y = 0.7 | 0.14 | 0.09 | 0.11 | 0.11 | 0.13 |

TABLE S3

Voltage ratios calculated ($R_2$).

|  | x = 0.7 | x = 1.9 | x = 3.1 | x = 4.3 | x = 5.5 |
|---|---|---|---|---|---|
| y = 5.5 | 0.09 | 0.34 | 1.02 | 3.89 | 13.33 |
| y = 4.3 | 0.12 | 0.41 | 0.98 | 4.37 | 10.82 |
| y = 3.1 | 0.11 | 0.32 | 1.01 | 4.62 | 11.29 |
| y = 1.9 | 0.09 | 0.36 | 0.91 | 3.97 | 12.31 |
| y = 0.7 | 0.08 | 0.31 | 0.95 | 3.83 | 13.09 |

$R_1$ and $R_2$ monotonically increase and the voltage ratio trends show good resolution. To verify the performance of the locating capability of the device, a location test at the centre point of cell No. 12 was carried out, as shown in FIG. 17(c). The ratios obtained from the measured output voltages were $R_1 = 0.43$ and $R_2 = 0.96$. Two curves corresponding to $R_1$ and $R_2$ were plotted and the intersection point was calculated as (2.05, 2.98). The distance deviation between the actual touch point and the calculated point was 1.5 mm.

Figure 23:
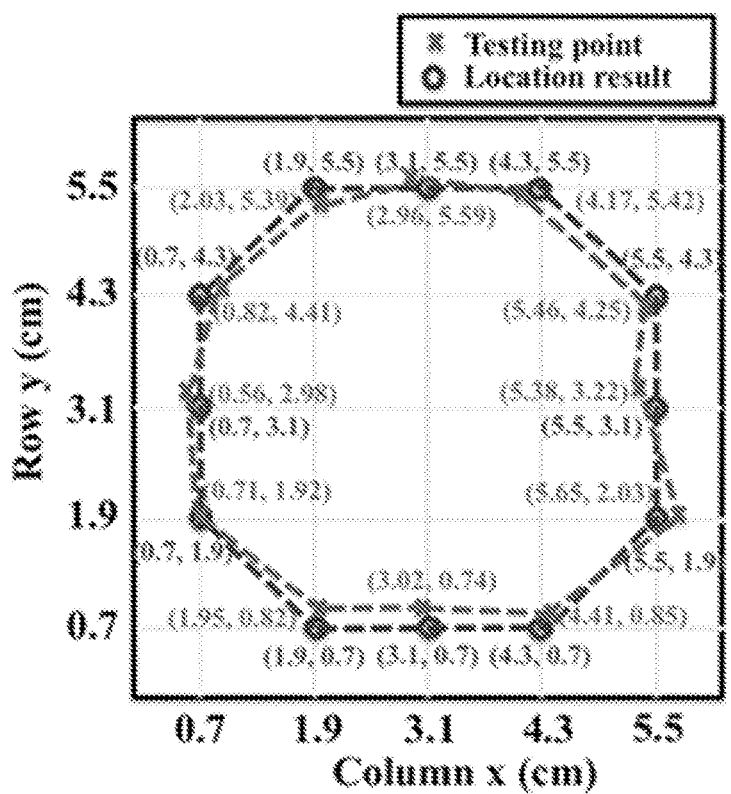
FIG. 23 is a plot of locations detected by the sensor of FIG. 1(b)

Similarly, through experimental testing and calculation by MATLAB, the distance deviations of all twenty-five points were determined as being between 0.02-1.60 mm. Therefore, the position-sensing resolution of the points in a single cell is ~1.6 mm. All the average values and the standard deviation values of the ratios are plotted in FIG. 17(d). In order to achieve the accuracy and standardisation of trajectory monitoring and motion detection, normalisation of the average values for each region of the above test was carried out. The ratios obtained can be divided into twenty-five values for both $R_1$ and $R_2$ when the touch point changes. These values are defined as the ratios of the geometric centre points of every cell in the grid. In trajectory measurements, these discrepancies can be eliminated by normalisation. Taking the ring location as an example, the normalisation of theoretical ratios and experimental values is illustrated in FIG. 23. In order to check the reliability of the sensor 10, the tests were conducted under different environments and forces as shown in FIGS. 17(e) and 17(f). It can be seen that the voltage ratio of the opposite electrodes is stable although the voltage amplitude varies with the change of humidity and force, implying that the ratio method can eliminate external interference.

A spray device was used to change the humidity on the surface of the device. Five groups of experiments were carried out under different humidity. The measured values of surface humidity of the 5 groups are 66%, 81%, 87%, 92%, and 95% respectively. In each group, the voltages of four electrodes were detected by tapping the centre point (3.1, 3.1) of the 1D sensor 12. The average values of electrode voltages of each group (measured 50 times) were calculated, and depicted by the column diagram, as shown in FIG. 17(e)-III. The ratios of the tapping point in X direction and Y direction were calculated according to the average values, and marked in FIGS. 17(e)-I and 17(e)-II. It can be seen that with the increase of humidity, the output voltage of the electrode will decrease significantly, but it does not affect the calculated value of the position point. As shown in FIG. 17(f), five groups of experiments were carried out under different forces. From FIG. 17(f), it can be seen that the magnitude of the force has negligible effect on the location calculation.

In the above analysis, the pixel matrix of 5×5 was calibrated and the average value of each region voltage was processed. In order to quantitatively characterize the sensor's response to motion, e.g., a finger sliding through the surface of the sensor, the pixel area touched by the finger records the voltage signal to detect its movement and trajectory. The output voltage signals of the twenty-five lattice regions (cells) are recorded in real time. By addressing and monitoring the positive output voltage signals in the twenty-five lattice regions, the touch information of finger can be obtained. When the finger slides on the sensor along a specific path, the voltage of the region that the finger passes through rises to a peak. In this regard, a 2D contour plot of the values of the output voltage from all electrodes is obtained, which explicitly indicates the moving path of the finger. Since the interval between two neighbouring regions is a constant that is pre-determined when constructing the grid structure, the location of the object can be inferred readily. More importantly, the trajectory, velocity and acceleration of the object can be derived through analysis and calculation.

Figure 18:
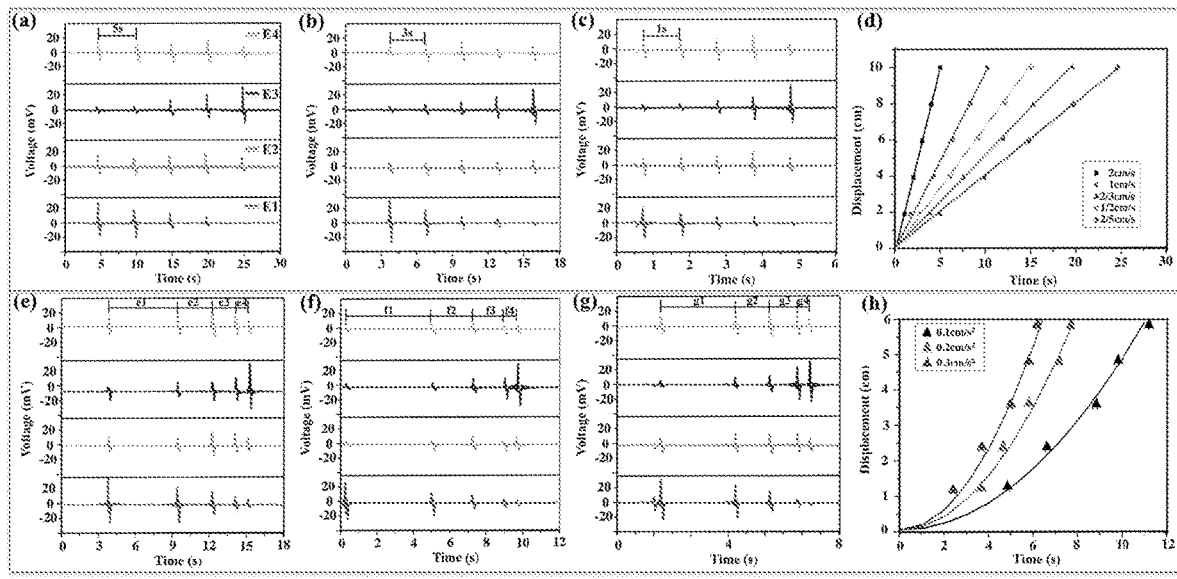
FIG. 18 shows voltage and displacement as a function of time for the triboelectric sensor of FIG. 1(b)

The 2D sensor 10 may be fixed on the platform of a linear motor, and the characteristic may be calibrated by setting different speeds of the linear motor. In the experiment described herein, the sensor 10 is moving with the motor and the finger is stationary relative to ground. FIG. 18(a-c) show the measured voltages when the finger slides on the sensor 10 with different velocities. By simply dividing the distance between two regions by the time taken to cover the distance, the velocity from one electrode to another can be derived. The displacement of the finger sliding with time can be easily derived, which is presented in FIG. 18(d). FIG. 18(e-g) demonstrate the ability of the sensor 10 to detect accelerated motion of a finger sliding with different accelerations. The ratios of the opposite voltages can be used to calculate the trajectory of the finger as it slides, and the acceleration of the motion can be calculated combined with the time of the voltage interval. The displacement of the finger sliding with time can be easily derived, which is presented in FIG. 18(h). Because the velocity and acceleration of the sensor 10 are preset by the linear motor in the presently described experiment, the calculated velocity and acceleration are essentially in agreement with the preset value, ignoring the influence of the slight jitter of the finger.

Figure 19:
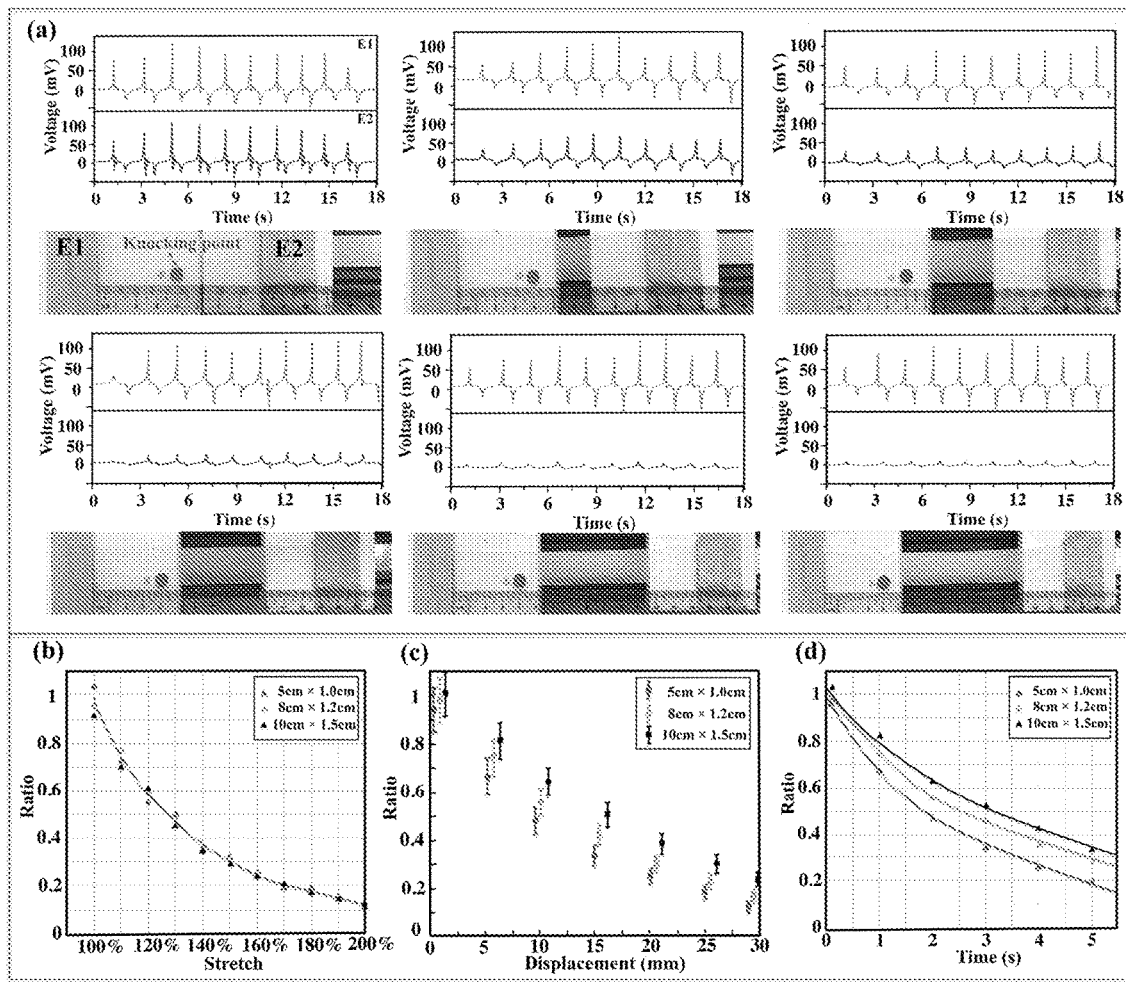
FIG. 19 shows voltage measurements from an experiment in which a user's finger taps on the triboelectric sensor of FIG. 1(c)

In the discussion above, testing of the 2D sensor 10 is described. Based on a similar analogue location principle, a stretchable 1D sensor 12 may also be devised and tested. The E1' end of the 1D sensor 12 may be fixed, while the E2' end is movable and subjected to tensile stress (FIG. 19(a)). When knocking a point with constant distance to E1' on the patch 12, a voltage ratio of the two electrodes ($V_{E2'}/V_{E1'}$) can be obtained, through FIG. 1(e) and Equation 3. Then the patch 12 may be stretched to a certain distance, and the voltage ratio decreases when the same point is knocked at a constant distance relative to the E1' position. The ratio further decreases with increasing stretch length. Based on this phenomenon, the stretch length of the E2' end can be measured by knocking a fixed point relative to E1'. That is to say, the stretch displacement and stretch velocity/acceleration of the E2' end with fixed knocking frequency can be measured. The 1D sensor 12 exhibits stretchable capability as shown in FIG. 19(a). In an experiment, three different sizes of the patch 12 were investigated in terms of their output voltage ratios. The ratio change as a function of change of stretch percentage of the two electrode (E1', E2') voltages is shown in FIG. 19(b). It can be seen that with the same percentage of stretching, the voltage ratio is basically the same, indicating that the width and thickness of the patch does not affect the output value during stretching.

In terms of displacement and velocity detection, the resolution of stretch displacement was determined. The relationships of the error bars of E2'/E1' to the stretch displacement corresponding to different initial lengths are shown in FIG. 19(c). The resolution gradually decreases with the increase of stretch length. In addition, the longer the initial length, the faster the resolution decreases. It can be seen that when the stretch displacement is less than 25 mm, the resolution of the three patches is ~5 mm. When the stretch length exceeds 25 mm, the resolution is greater than 5 mm. Therefore, a patch with a shorter initial length is calibrated in terms of the stretch curve in advance, for later application. FIG. 19(d) shows the curves of the voltage ratios with time under a stretch speed of 5 mm/s. The 1D sensor 12 can be stretched to as long as 500%, and the stretchability depends on the type, thickness and curing extent of the silicone rubber.

Figure 24:
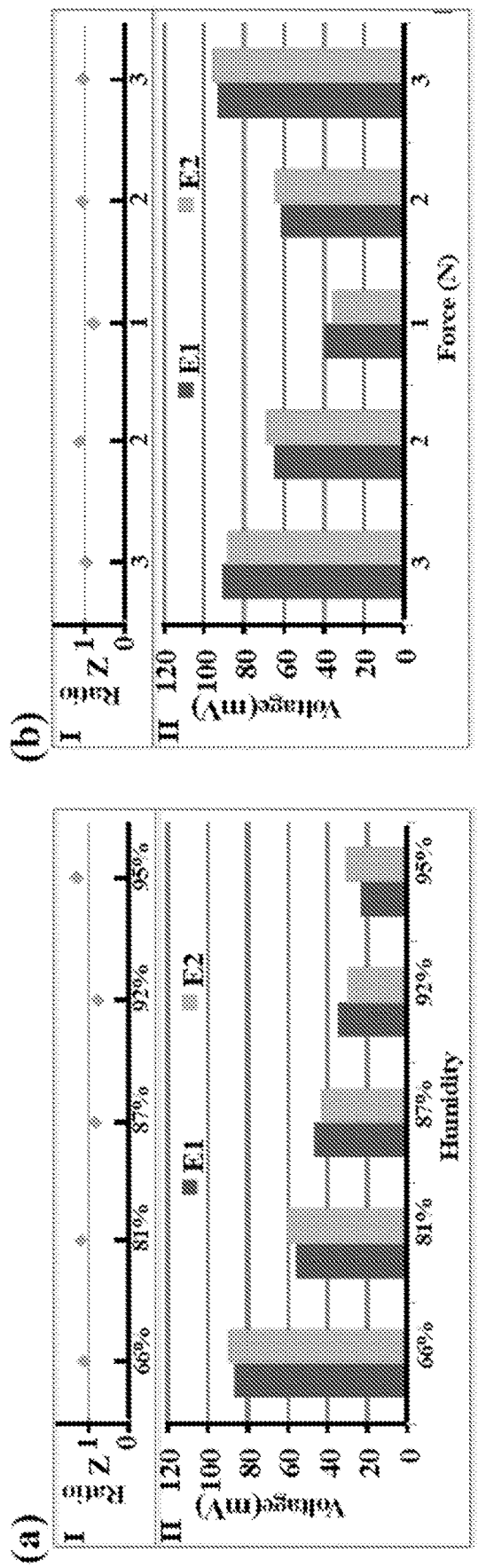
FIG. 24 shows stability test results for the sensor of FIG. 1(c)
Figure 25:
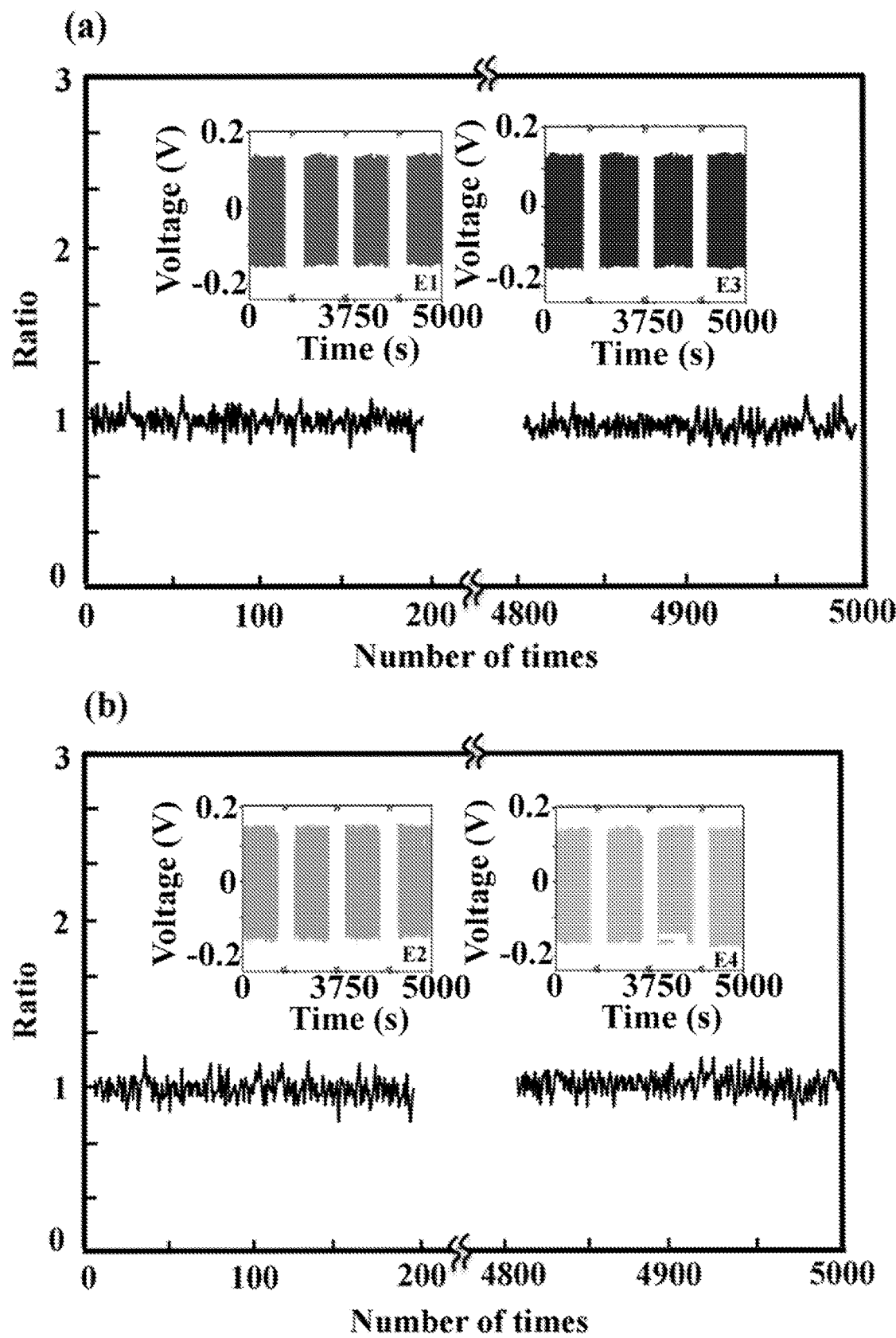
FIG. 25 shows long-term stability test results for the sensor of FIG. 1(b)

To check the reliability and long-term stability of the device 12, a reliability test was conducted on the 1D sensor 12 as shown in FIG. 24 and a long-term stability test was conducted as shown in FIG. 25. Similar to the 2D sensor 10, the influence of humidity and force on 1D sensor 12 can be ignored. As shown in FIG. 25, there is no significant change of ratios of opposite electrodes after testing under 5000 cycles, which indicates a stable and durable electrical property of the sensor 12.

Figure 20:
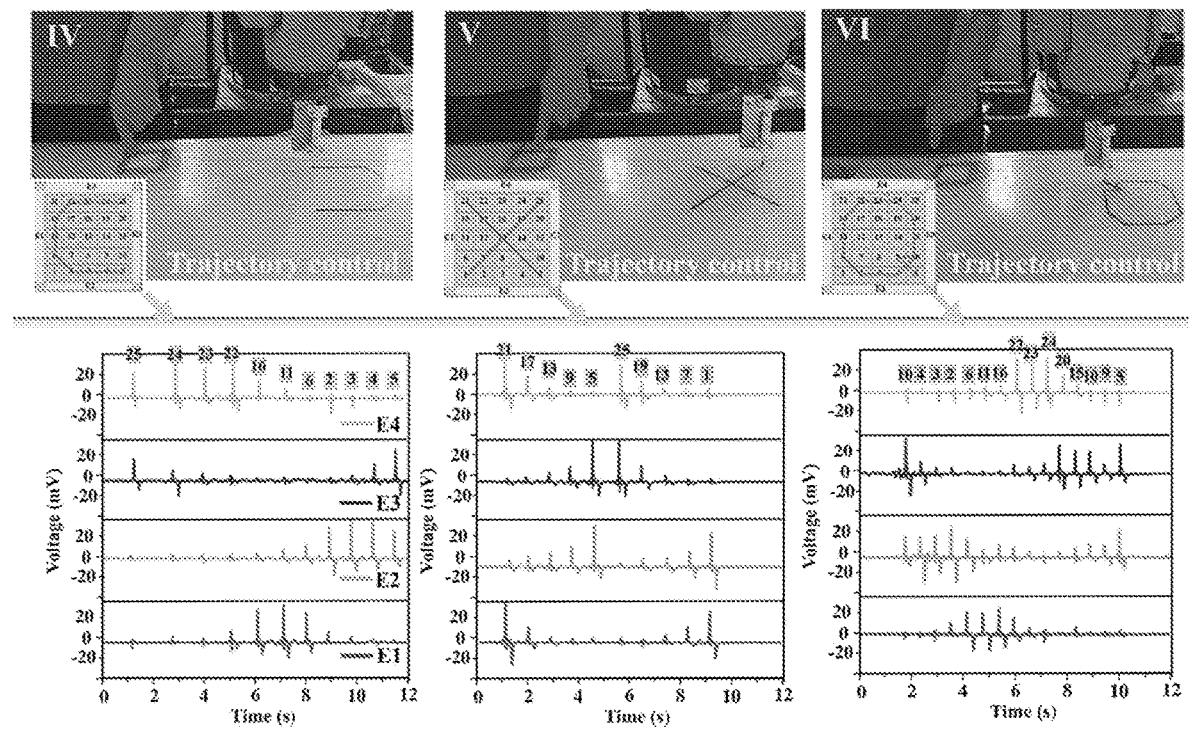
FIG. 20 shows voltage curves during control of a robot to perform various tasks by the system of FIG. 3.

As discussed above, the 1D sensor 12 and 2D sensor 10 can enable trajectory, displacement and velocity detection. Therefore, the combination of the two patches can achieve 3D signal detection and control. The concept can be applied to the applications of robotics, electronic skins, and automatic control, etc. To evaluate 3D control enabled by the sensors 10 and 12, a robotics control system 30 was developed as shown in FIG. 3. Through the control connection between the patches 10, 12 and the robotic manipulator (34, 36), experiments with different sliding speeds were conducted to control the robotic manipulator with different moving speeds. The trajectory tracking ability of the sensors 10, 12 were utilised to control the robotic manipulator to write different letters. Three letters "C", "X" and "Q" were selected and written by the robot manipulator on a whiteboard. FIG. 20(c) illustrates the voltage curves of four electrodes corresponding to the letter trajectories induced by a fingertip.

Example 2

Figure 26:
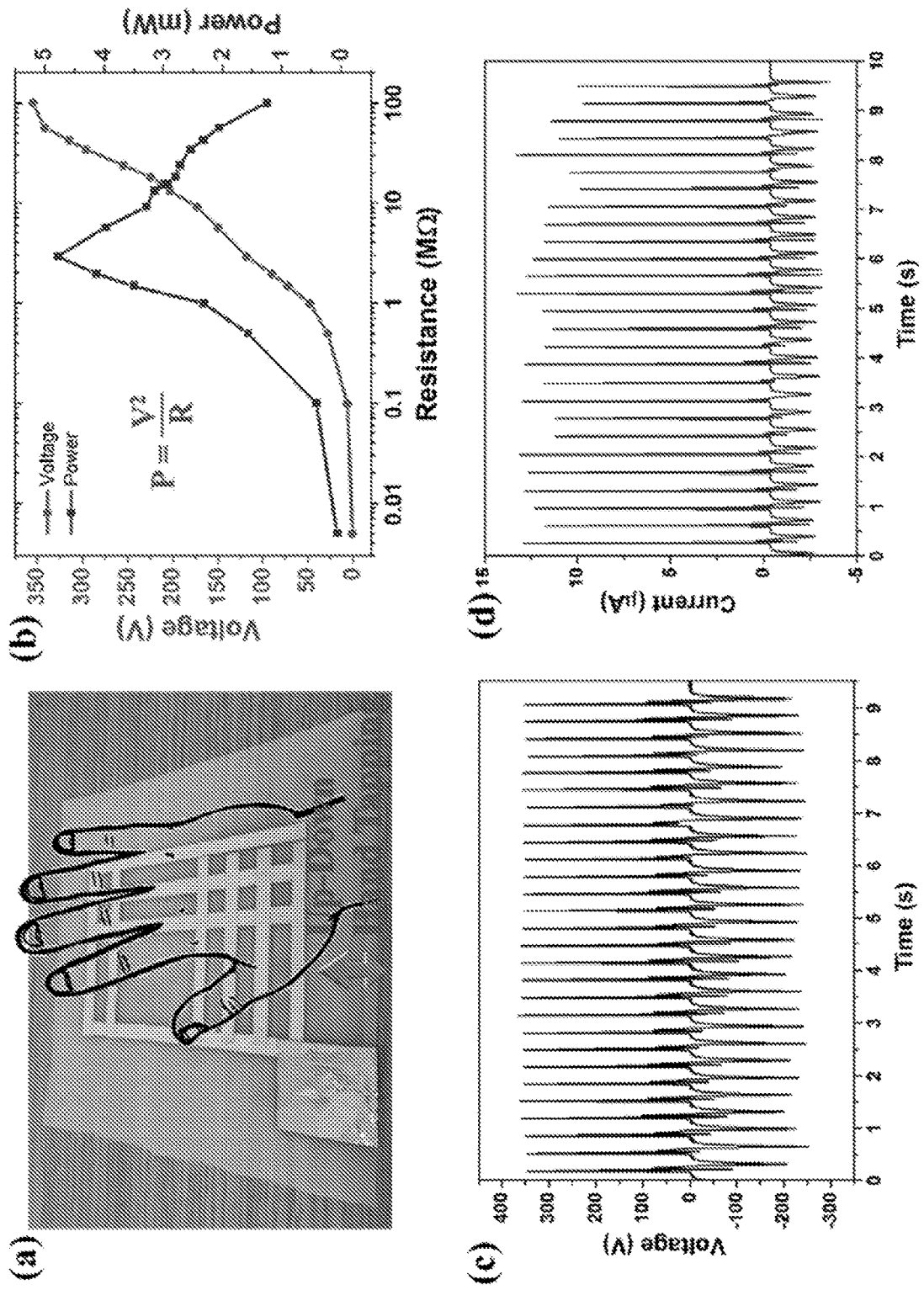
FIG. 26 shows energy harvesting results for the sensor of FIG. 5.

The energy harvesting performance of a four-direction device 200 from hand tapping (~3 Hz, illustrated in FIG. 26(a)) is shown in FIG. 26. When the resistance of the external load varies, a maximum output power of 4.8 mW can be achieved (FIG. 26(b)). FIG. 26(c) and FIG. 26(d) illustrate the output voltage of the device under 100 MΩ load (~355 V) and short circuit current (~12 µA), respectively.

Figure 27:
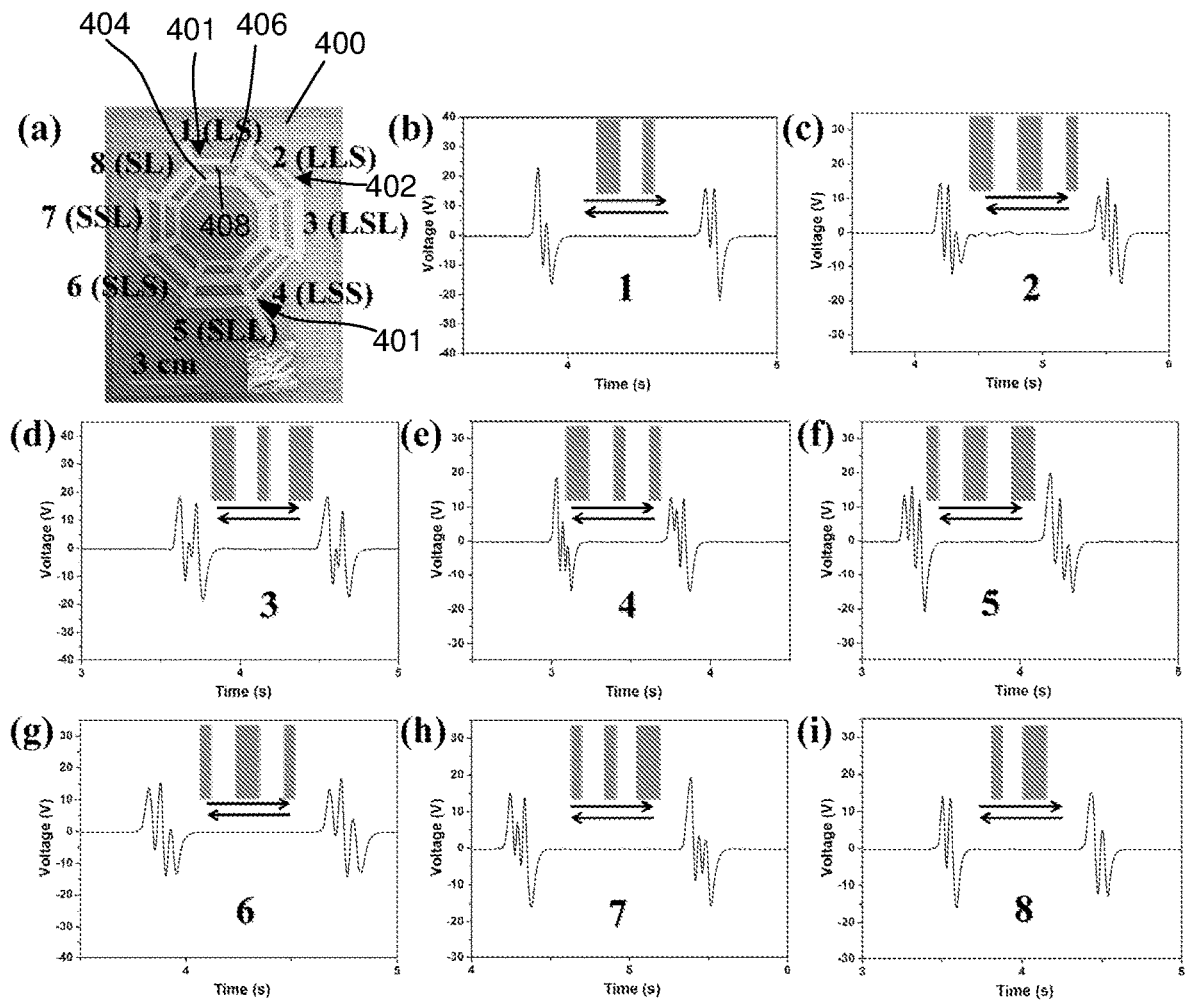
FIG. 27 shows an embodiment of a 2D triboelectric sensor and signals generated during use thereof.

Eight-direction control can, for example, be realised through a device 400 with a single electrode grid 401 (FIG. 27(a)) according to an example embodiment, shown in FIG. 27. The electrode grid has different interconnected grating structures e.g. 402 along the different respective directions 1 to 8 with grating element width of 8 mm (e.g. grating element 404) and 4 mm (e.g. grating element 406), and spacing of 6 mm (e.g. 408). Grating elements with larger width (e.g. 406) tend to produce higher output peaks due to the larger contact area during sliding. In testing of the device 400, the sliding motion is performed by a finger for signal generation. Due to the relatively large size of the human finger relative to the electrode spacing (e.g. 408), the output signal pattern does not exactly follow the electrode pattern compared to an ideal case (i.e., larger output peak from a wider electrode). Thus a forward/backward sliding and a detection/control strategy are employed for the interpretation of the signal corresponding to the respective grating structures e.g. 402 for the different respective directions 1 to 8 according to an example embodiment. The output signals for forward/backward sliding along the respective directions 1 to 8 are shown in FIG. 27(b-i), and the detection/control strategy for interpretation is illustrated in Table S4. When another contact object with smaller dimension (such as a pen) is adopted for sliding or the grating element spacing is increased to larger than the finger width according to different embodiments, an expected output signal pattern corresponding to the electrode pattern can be achieved, i.e., a larger output peak generated from a wider electrode.

TABLE S4

Signal direction strategy for eight-direction control.

| Electrode width design | Signal peak relative value (High; Similar; Low) - compared to first peak "-" | |
|---|---|---|
| | Forward sliding | Backward sliding |
| Direction-1 Large; Small (10) | -L | -S |
| Direction-2 Large; Large; Small (110) | -SL | -HL |
| Direction-3 Large; Small; Large (101) | -LH | -LH |
| Direction-4 Large; Small; Small (100) | -LL | -LH |
| Direction-5 Small; Large; Large (011) | -HL | -LL |
| Direction-6 Small, Large; Small (010) | -HL | -HL |
| Direction-7 Small; Small; Large (001) | -LH | -LL |
| Direction-8 Small; Large (01) | -S | -L |

Figure 28:
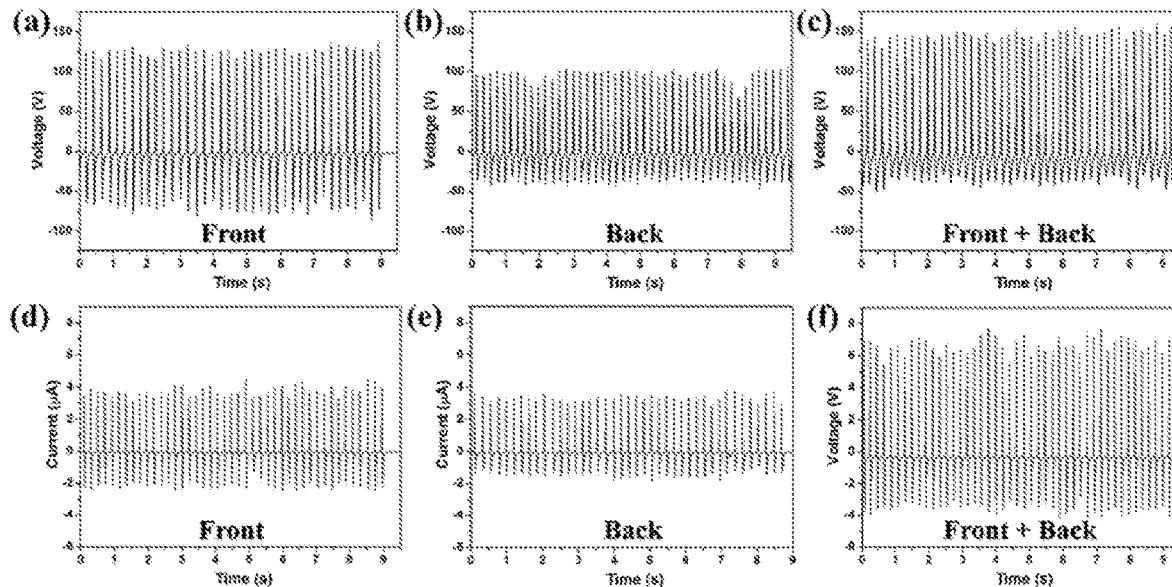
FIG. 28 shows energy harvesting performance of the sensor of FIG. 7.

The energy harvesting performance of the card controller device 500 is shown in FIG. 28.

When only the front side of device 500 is connected, output voltage on 100 MΩ load and short circuit current of 128 V and 3.7 µA can be achieved, see FIGS. 28(a)_ and 28(d). Similarly, when only the backside is connected, output of 100 V and 3.35 µA is achieved, see FIGS. 28(b) and 28(e). Then when both sides are connected in parallel, a total output of 145 V and 6.85 µA can be achieved, see FIGS. 28(c) and 28(f).

It is noted that a single electrode design, compared to e.g. the two electrodes design in the card controller device 500, can also be used for 3D control in different embodiments, where different grating structures are used for the electrode grids, e.g. on each of the sides of the card. Then the electrodes on both sides can be connected together into one single electrode to perform 3D control using a suitable signal detection from the (connected) single electrode.

Example 3

Figure 34:
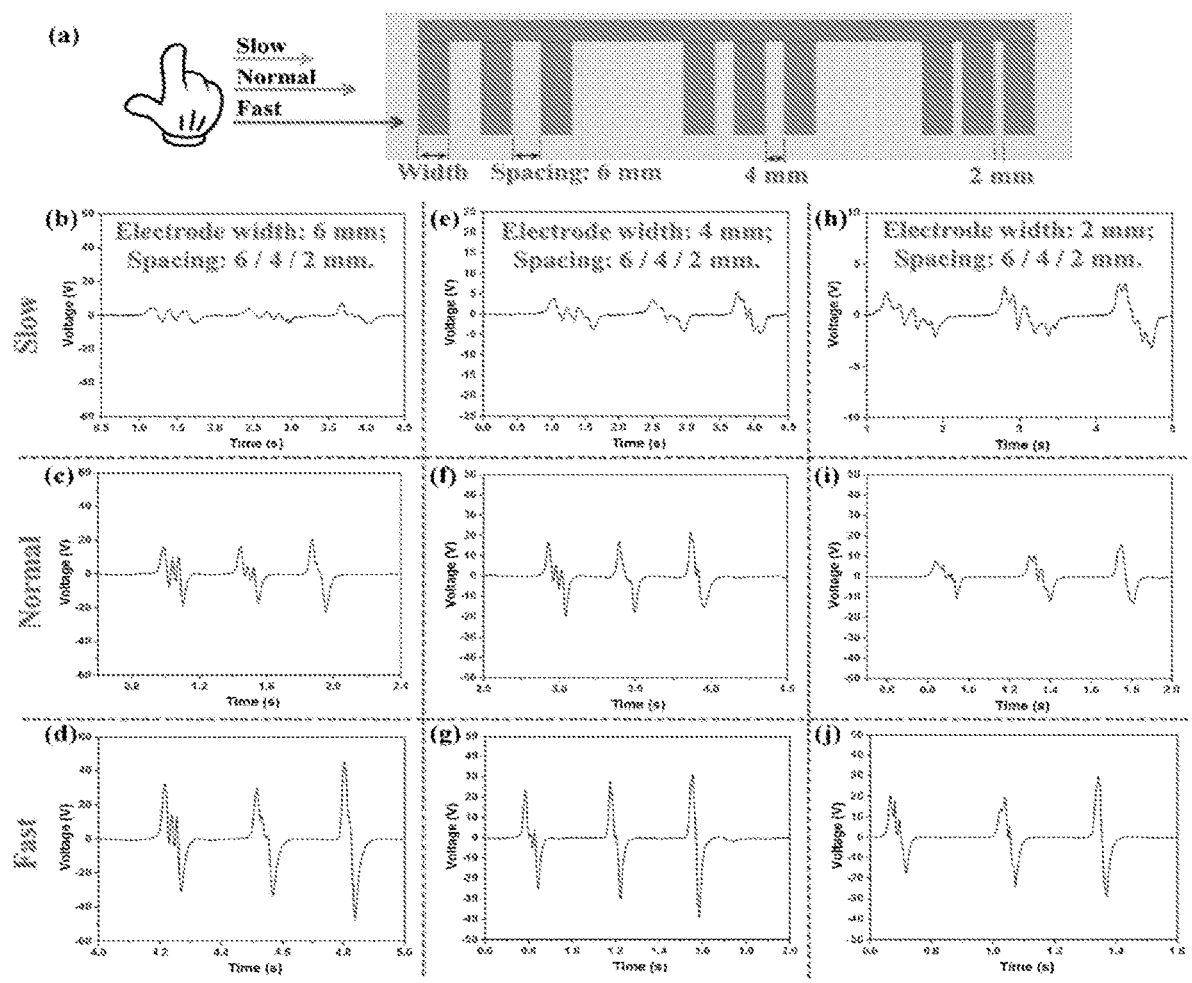
FIG. 34 shows test results during another process for optimising electrode spacing for a triboelectric sensor.

To determine a suitable electrode width and spacing for sensors 1100, 1200, 1600, measurements with both electrode width and spacing varying from 6 mm to 2 mm were conducted, as shown in FIG. 34, which shows: (a) Schematic of the electrode patterns for the measurement. The generated output peaks from the 8/2/8 mm and 6/2/6 mm electrode patterns under finger sliding in a (b) slow, (c) normal, and (d) fast manner. The generated output peaks from the 8/4/8 mm and 6/4/6 mm electrode patterns under finger sliding in a (e) slow, (f) normal, and (g) fast manner.

Figure 29:
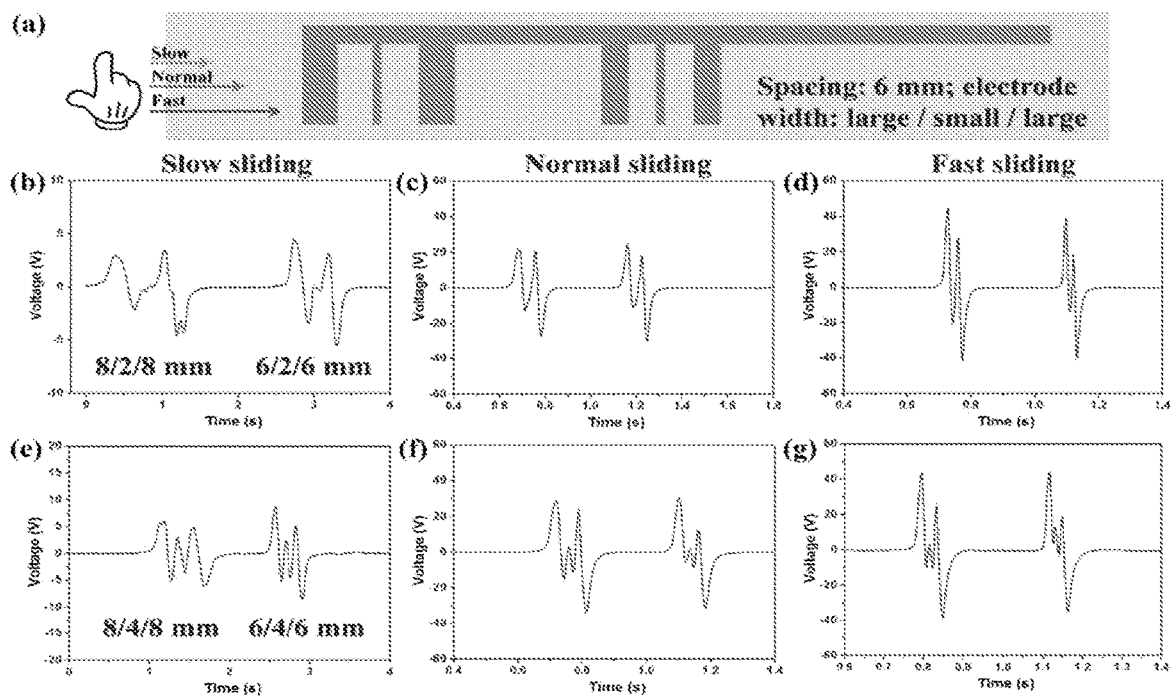
FIG. 29 shows test results during a process for optimising electrode spacing for a triboelectric sensor.

According to the experimental results, it was concluded that certain electrode width and spacing are preferable for the finger sliding application. Typically, electrode spacing of 6 mm can achieve clear signal identification with separated output peaks. To decide the electrode width for large and small electrodes, measurements as shown in FIG. 29 were conducted. The schematic in FIG. 29(*a*) indicates that two sets of large/small/large electrode patterns with different dimensions were connected together and investigated under three sliding speeds (slow ~38 mm/s, normal ~97 mm/s, and fast ~152 mm/s). The electrode spacing in both patterns was kept as constant of 6 mm. The measurements in FIG. 29(*b-d*) were conducted with electrode width of the large/small/large patterns of 8 mm/2 mm/8 mm and 6 mm/2 mm/6 mm, under slow, normal and fast sliding respectively. Similarly, the measurements in FIG. 29(*e-g*) were conducted with electrode width of 8 mm/4 mm/8 mm and 6 mm/4 mm/6 mm. From the results, it can be observed that with larger difference in the electrode width, the variation of the output signal amplitude is more obvious. But if the electrode with small width is too narrow, its generated output peak will have limited amplitude due to the small contact area, which is easily submerged in the large output peaks from the electrodes with large width. Accordingly, electrode widths of 8 mm and 4 mm may be adopted for the electrodes in the L/S coding configuration.

Figure 35:
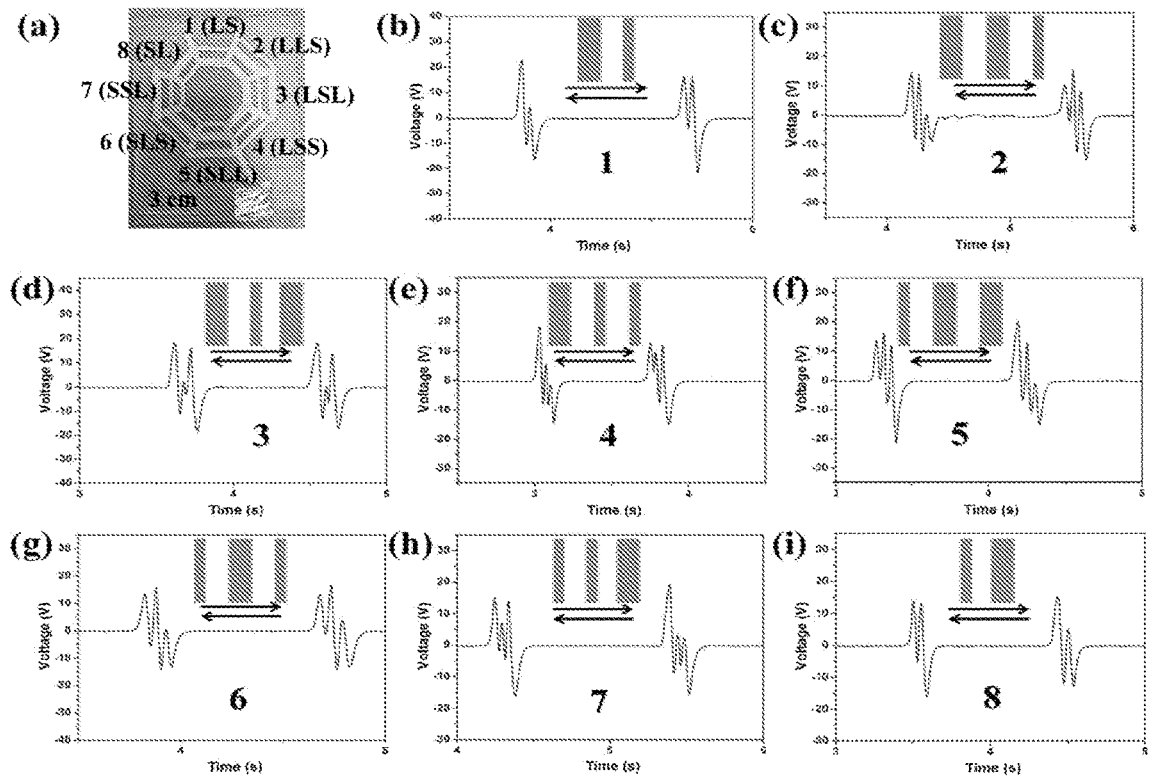
FIG. 35 shows an embodiment of a sensor with a grid configured according to L/S coding, and signals generated during use thereof.

Based on the above optimisation results, a sensor was fabricated with large electrode width of 8 mm, small electrode width of 4 mm, and electrode spacing of 6 mm. In the ideal case, the electrodes with larger width should produce higher output peaks due to the larger contact area during sliding. However, due to the relatively large size of the human finger of ~15 mm and the small electrode spacing of 6 mm, the finger may cover two adjacent electrodes simultaneously and cause the overlapping of generated output peaks, as shown in FIG. 35. The negative peak of the former signal may overlap with the positive peak of the later signal, leading to amplitude reduction of the second signal. Thus amplitude of the output peaks may not come out as expected (namely, large amplitude from large electrode and small amplitude from small electrode).

In order to accurately recognise the electrode patterns, a forward/backward sliding strategy is proposed together with a signal interpretation table, as illustrated in FIG. 35 and Table S5.

Due to the relatively large size of human finger of ~15 mm and the small electrode spacing of 6 mm, there are situations where finger are covering two electrodes (e.g., finger sliding out of the first electrode and sliding in the second electrode) at the same time. This causes the overlapping of negative component of the first peak and positive component of the second peak, leading to a reduction in amplitude for the second peak, as shown in FIG. 35(*b-i*).

In Table S5, the last two columns of the table indicate the comparison results of the current peak with the former peak (i.e., the second peak with the first peak, and the third peak with the second peak). The comparison results are roughly categorized into three classes, i.e., larger ("L"), equivalent ("E") and smaller ("S"). With the overlapping effect, the large/small (former electrode is large and current electrode is small) the comparison result is always "S", same as the electrode pattern. Similarly, results of large/large and small/small can be "E" or "S", while results of small/large comparison can be "L" or "E". For the patterns with only two strip electrodes (direction 1 and 8), only one comparison is required for forward and backward sliding. Based on the comparison results as indicated in the table, they can be easily differentiated. For the other six directions with three strip electrodes, whenever an "L" comparison result appears in the forward and backward sliding, it means that the current electrode must have a larger electrode width than the former one. That is, the current electrode width is large, and the former electrode width is small. If both the forward sliding and backward sliding have "L", the electrode pattern can be easily interpreted, such as direction 3 and 6. Then the other directions can be interpreted according to the comparison results in Table S1.

TABLE S5

Signal interpretation table (comparison result of the current peak amplitude with the former one: "L"—larger, "E"—equivalent, "S"—smaller).

| Direction | Electrode patterns in | Forward sliding | Backward |
|---|---|---|---|
| Direction-1 | Large; Small | -S | -E |
| Direction-2 | Large; Large; Small | -ES | -LS |
| Direction-3 | Large; Small; Large | -SL | -SL |
| Direction-4 | Large; Small; Small | -SS | -SL |
| Direction-5 | Small; Large; Large | -LS | -SS |
| Direction-6 | Small; Large; Small | -LS | -LS |
| Direction-7 | Small; Small; Large | -SL | -SS |
| Direction-8 | Small; Large | -E | -S |

Figure 30:
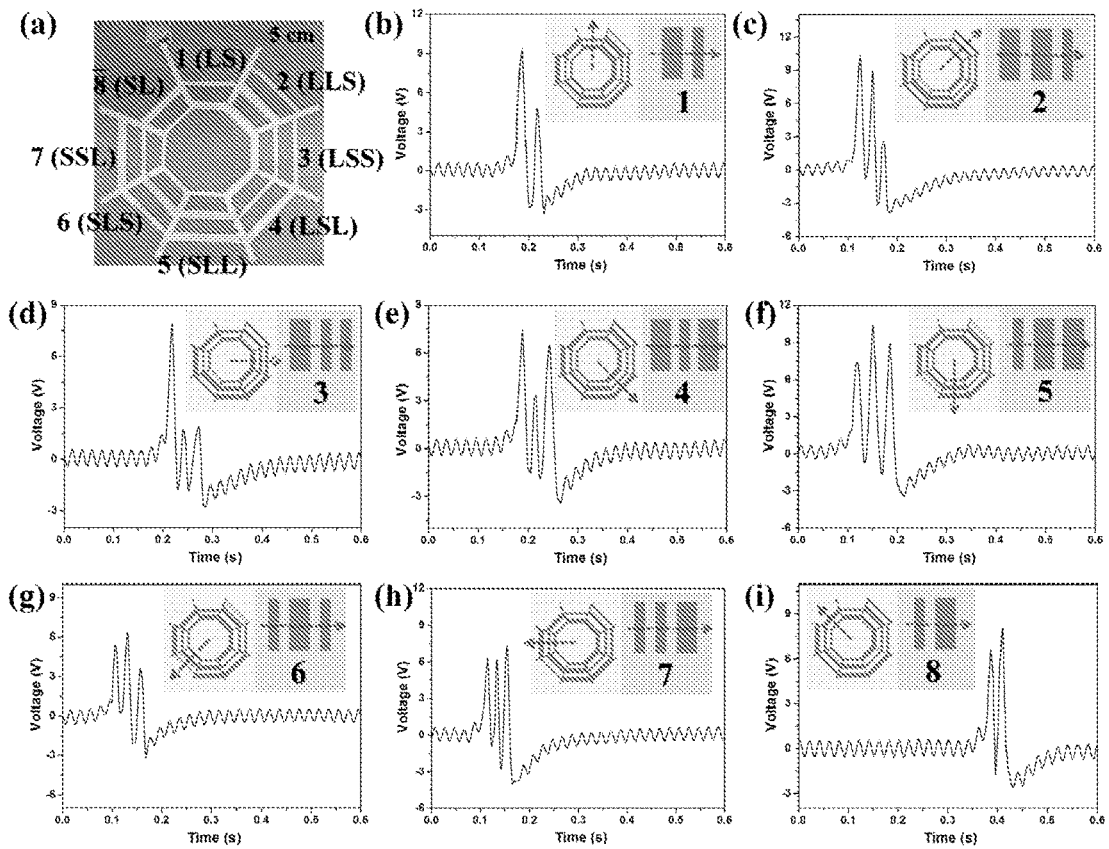
FIG. 30 shows an embodiment of a triboelectric sensor with a grid configured according to L/S coding, and signals generated during use thereof.

To minimise the negative effect of overlapping signals and develop a more intuitive detection mechanism, an alternative eight-direction interface with larger electrode spacing (15 mm) was fabricated and investigated. The interface is shown in FIG. 30(*a*). Because of the larger electrode spacing, the overlapping of output signals can be minimised and an expected output signal pattern corresponding to the electrode pattern can be achieved, i.e., large amplitude from large electrode. The generated output signals when sliding across the eight directions are illustrated in FIG. 30(*b-i*), respectively. According to the measurement results, it can be observed that the amplitude variation of the output signals is able to follow the width variation of the sensing electrodes correspondingly. Furthermore, no backward sliding is required in order to determine the coding information in electrodes. In this way, the interpretation mechanism in the processing circuit can then be significantly simplified.

Figure 31:
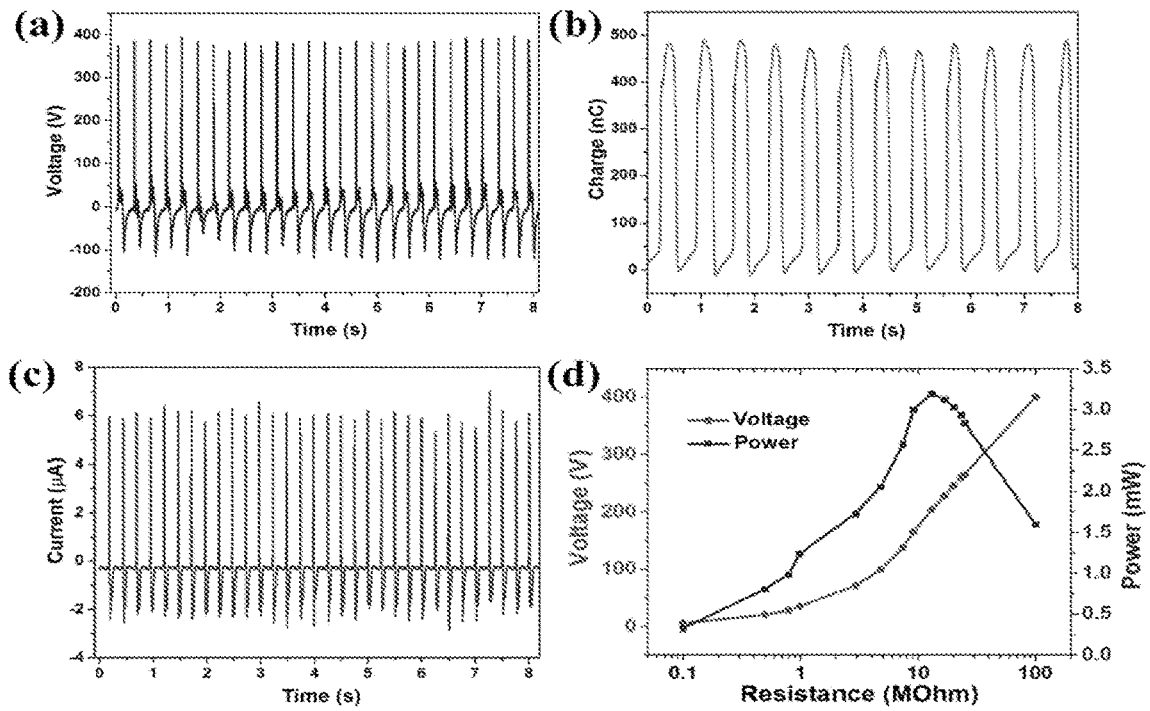
FIG. 31 shows energy harvesting performance of the sensor of FIG. 30.

The triboelectric mechanism enables the interface to also function as an energy harvester to scavenge mechanical energy from various contact and sliding motions such as human tapping. Measurement results from human hand tapping are summarised in FIG. 31, where the recorded output voltage (on a 100 MΩ load), charge and short circuit current of the device are 385 V, 482 nC and 6.25 µA, respectively. When changing the resistance of the connected external loads, the interface can produce a maximum output power of 3.2 mW on a matched resistance of 13 MΩ (with tapping frequency of ~3.5 Hz). Therefore, the interface not only can be used as a self-powered interface, but also can be used as an energy harvester/generator to scavenge energy from human motions, and the scavenged energy can be stored in a capacitor for the potential operation of the back-end circuits, thereby enabling self-powered and battery-less functional interfaces.

Figure 33:
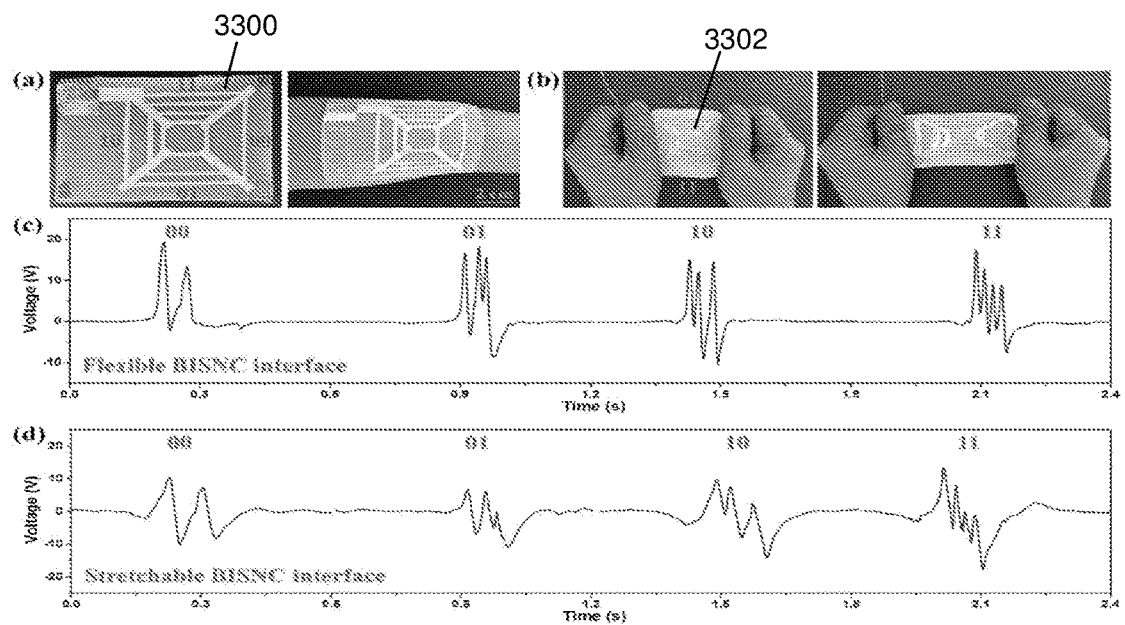
FIG. 33 shows examples of flexible and stretchable sensors and signals generated thereby.
Figure 39:
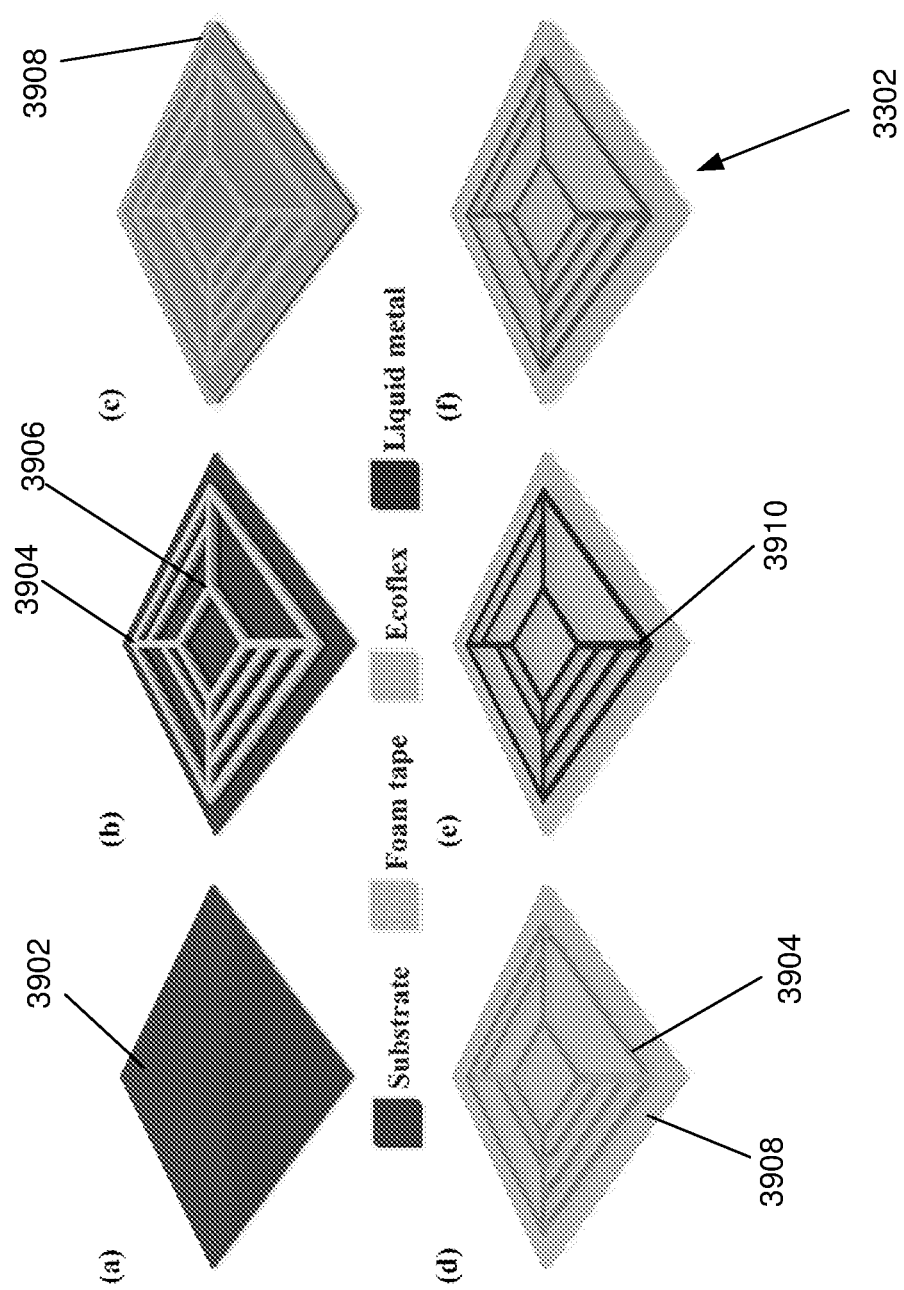
FIG. 39 schematically depicts a process for fabricating a triboelectric sensor according to certain embodiments.

In addition, interfaces according to certain embodiments can be equipped with flexible and/or stretchable compatibility toward flexible wearable applications. A flexible four-direction interface and a stretchable four-direction interface are shown in FIGS. 33(a) and 33(b), respectively. The flexible interface 3300 is based on the same device structure and materials as the interfaces described above, while the stretchable interface 3302 is fabricated with encapsulated liquid metal inside of Ecoflex channels, to thereby form the coding electrode patterns. The detailed fabrication process of the stretchable interface 3302 is illustrated in FIG. 39.

The output signals from the flexible and stretchable interfaces 3300, 3302 are depicted in FIGS. 33(c) and 33(d), respectively. From the results, it can be observed that the coding information along the four directions can be clearly interpreted from the generated peaks for both devices. According to the above demonstrations, the single-electrode interfaces according to certain embodiments exhibit outstanding scalability, showing great potential in diverse control, security, flexible and wearable applications.

Figure 32:
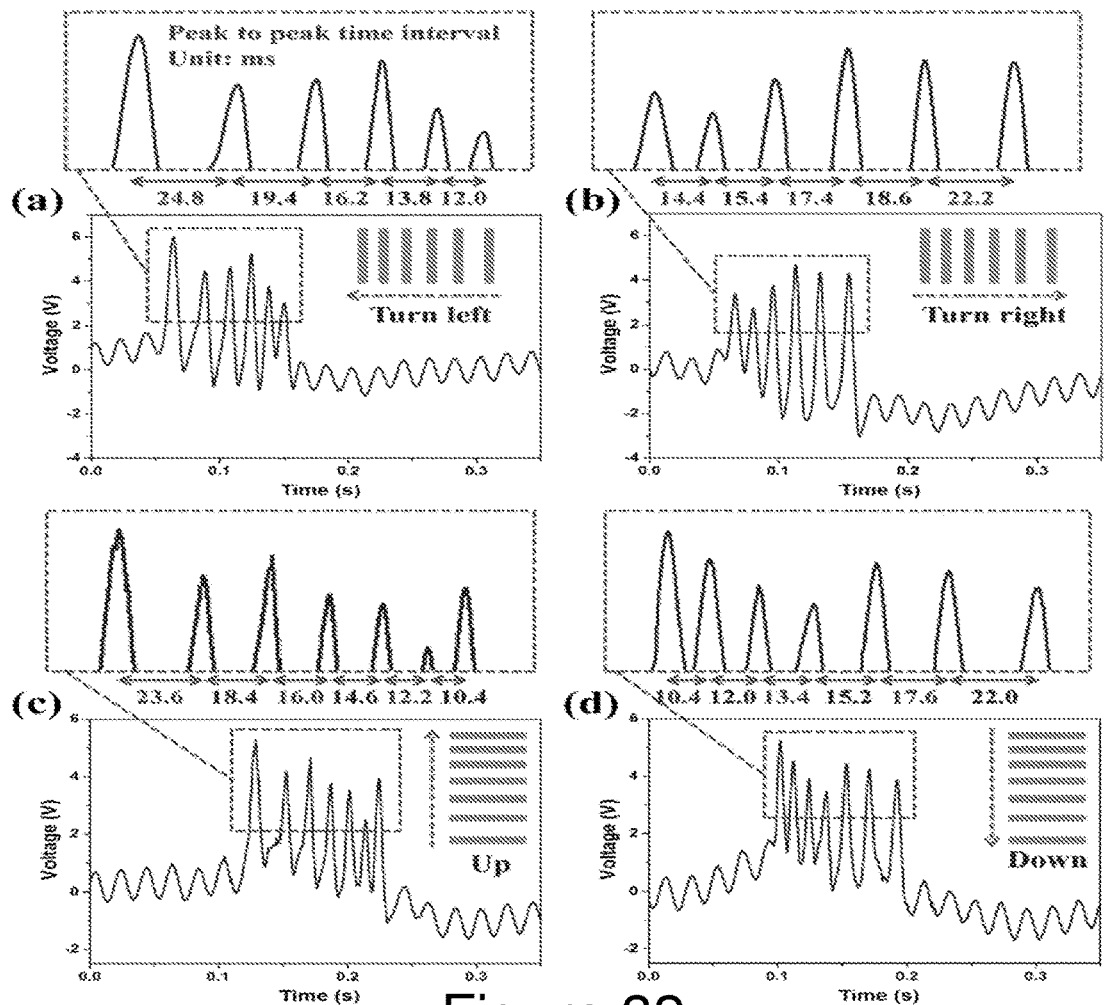
FIG. 32 shows testing results for grid control patterns of the sensor of FIG. 12.
Figure 37:
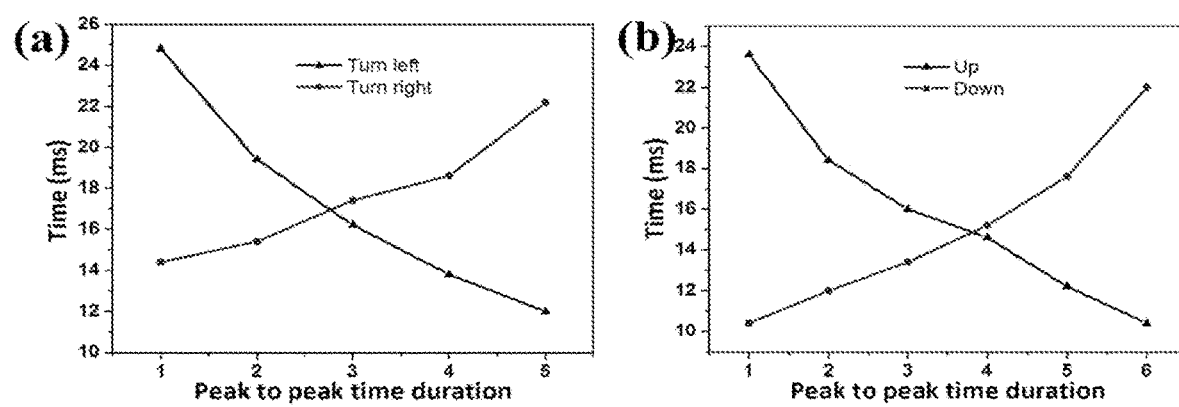
FIG. 37 shows the peak to peak time duration for signals generated by the sensor of FIG. 12.

FIGS. 32(a) and 32(b) show the generated signals for rotation control in the drone control interface of FIG. 13, and the enlarged view of the output peaks and their time intervals. When sliding left, there are six peaks in the generated signal and their time intervals are decreasing. Then when sliding right, their time intervals are increasing. FIGS. 32(c) and 32(d) show the generated signals for the up/down control and enlarged view of the output peaks and their time intervals. When sliding up, there are seven peaks in the generated signal and their time intervals are decreasing. Then when sliding down, their time intervals are increasing. The trend of the time intervals in rotation control and up/down control is illustrated in FIG. 37.

Fabrication of the interface 3300: PTFE thin film was first cut into the size of the designed interface. Then aluminum tape electrodes were attached on the backside of the PTFE thin film, forming the structure layout of connected spider-net. All the electrodes are connected together, and thus there is only one sensing electrode for the BISNC interface. After that, Ecoflex™ 00-30 solution with mass ratio of 1:1 (Part A: Part B) was mixed thoroughly and coated on top of the electrode as insulation and protection layer. Last, the interface was cured overnight at room temperature.

Fabrication of the stretchable interface 3302: The process started from moulding substrate 3902 preparation and cleaning. Next, foam tapes 3906 were attached on the substrate forming the fluidic channels in the desired electrode grid pattern 3904. Then Ecoflex™ 00-30 solution was cast on top and cured at room temperature. Next, Ecoflex 3908 with fluidic channels 3904 was peeled off from the substrate, and then liquid metal 3910 was filled into the fluidic channels using a syringe. Last, another Ecoflex layer was cast on top and cured for encapsulation.

Characterization of the interface 3300: The output voltage of the interface 3300 was measured by DSO-X3034A oscilloscope (Agilent) with a high impedance probe of 100 MΩ.

The output current and charge were measured by Keithley 6514 Electrometer. Programmable Arduino UNO was adopted as the microcontroller unit for signal recognition and command generation.

Figure 36:
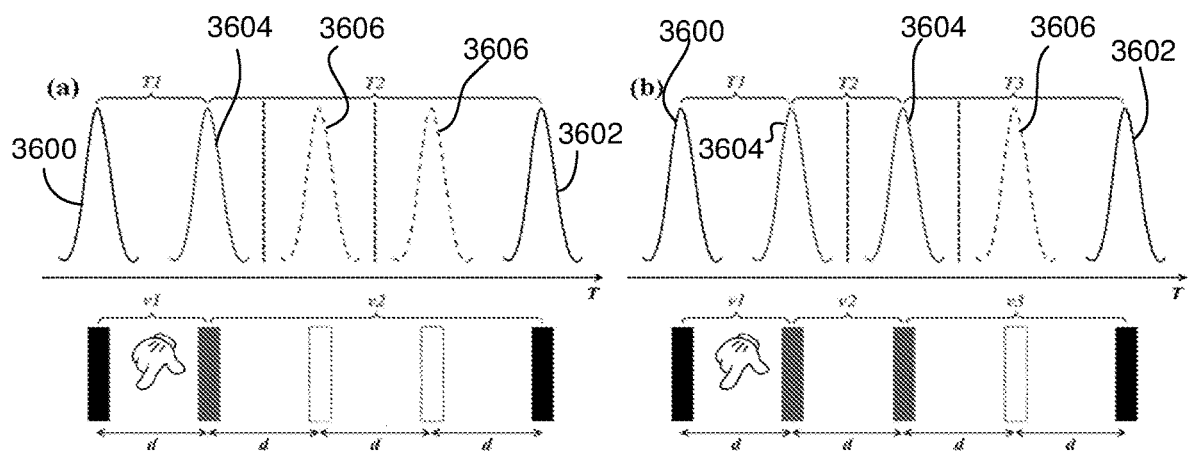
FIG. 36 is an illustration of the tolerance in variation in sliding speed for a sensor having a grid configured in accordance with 0/1 coding.

As shown in FIG. 36, the 0/1-coding interface 1200 shows excellent robustness and reliability in diverse ambient conditions and usage scenarios, such as different humidity, different sliding force, and different sliding speed, etc. The sole constraint is that the sliding speed should be maintained relatively constant during the sliding, whether in a slow, normal or fast manner, due to the detection mechanism of the peak positions in the time domain. Therefore, the variation tolerance of sliding speed for practical usage was investigated.

There are eight electrode patterns corresponding to the eight directions. Including the beginning and ending reference electrodes 1212a and 1212d, there are 4 classes of generated signals in terms of the number of peaks, i.e., 2 peaks (000), 3 peaks (001, 010, 100), 4 peaks (110, 101, 011), and 5 peaks (111). In the case of 2 peaks and 5 peaks, there is only one possibility for each case, thus 000 and 111 can be easily recognised based on the number of the generated peaks, irrespective of the variation in sliding speed.

In the case of 3 peaks, the ideal signal (100) with constant speed is shown in FIG. 36(a), with peaks 3600 and 3602 representing the reference peaks, peak 3604 representing the real coding peak, and dashed peak 3606 representing the virtual coding peak generated from the corresponding electrodes. In the schematic, d is the distance between two adjacent electrodes, v1 is the average sliding speed from the beginning reference peak to the signal peak, v2 is the average sliding speed from the signal peak to the ending reference peak, T1 and T2 are the time duration. The dashed lines in the figure denote the range of the generated signal peak for correct recognition. For 100, T1 should be less than 3/8 of the entire time duration between the two reference peaks. After the calculation, the relationship of v1 and v2 can be achieved, i.e., $v2<9/5 \cdot v1$. For 010, T1 should locate in between 3/8 and 5/8 of the entire time duration, thus $3/5 \cdot v1 < v2 < 5/3 \cdot v1$. Similarly, for 001, T1 should be larger than 5/8 of the entire time duration, thus $v2 > 5/9 \cdot v1$. In summary, the variation of sliding speed should satisfy the condition of $3/5 \cdot v1 < v2 < 5/3 \cdot v1$.

In the case of 4 peaks, the ideal signal (110) with constant speed is shown in FIG. 36(b). For 110, to achieve correct recognition, first T3 should be larger than both T1 and T2, and then it should be also larger 3/8 of the entire time duration. Thus the following conditions can be achieved, i.e., $v3<2 \cdot v1$, $v3<2 \cdot v2$, and $v3<10/3 \cdot v1 \cdot v2/(v1+v2)$. Similarly, the conditions for 101 and 011 can also be achieved, $v2<2 \cdot v1$, $v2<2 \cdot v3$, $v2<10/3 \cdot v1 \cdot v3/(v1+v3)$, and $v1<2 \cdot v2$, $v1<2 \cdot v3$, $v1<10/3 \cdot v2 \cdot v3/(v2+v3)$. In other words, the average sliding speed across the virtual electrode should be less than a certain value in order to achieve correct recognition. If we consider v1=v2, then $v3<5/3 \cdot v1$. That is, the variation of sliding speed should be less than 166.7% of the original speed.

Therefore, by considering all the scenarios and conditions, the variation of sliding speed should within the range from 60% to 166.7%, in order to achieve correct recognition. That is, the 0/1-coding control interface has a variation tolerance in sliding speed of at least ±40%.

Many modifications will be apparent to those skilled in the art without departing from the scope of the present invention. For example, any of the sensors 200, 500, 1100, 1200, 1300, 1600 may be connected to the detection unit 32 of FIG. 3 in place of the 2D sensor 10 and/or the 1D sensor 12, in order to provide a triboelectric control system. In such variations, an on-board processor of detection unit 32 and/or computing device 34 may be programmed to analyse the output signal from the sensor(s) in suitable fashion, for example determining one or more signal parameters by counting the number of peaks in the signal, or determining their relative positions and/or amplitudes.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A triboelectric sensor comprising:
    a substrate;
    at least one grid structure disposed in or on the substrate; and
    at least one electrode for collecting triboelectric charges that are generated by sliding of an object over a surface of the substrate, the at least one electrode comprising at least one pair of electrodes, respective electrodes of the pair being located at opposite sides of the substrate; and wherein:
    wherein the at least one grid structure is configured such that motion of the object is detectable from a signal generated by crossing of the object over at least part of the grid structure, the at least one grid structure comprising a spacing structure, said spacing structure comprising a plurality of raised portions, the raised portions having a constant height, such that transport of the object along the surface of the substrate generates a separation of charges between the surface and the object when the object encounters one of said raised portions, and such that motion parameters of the object are derivable from a ratio of electric potentials of said pair of electrodes.

2. A triboelectric sensor according to claim 1, comprising two pairs of electrodes, wherein a first pair of electrodes is arranged opposite each other along a first direction, and a second pair of electrodes is arranged opposite each other along a second direction that is orthogonal to the first direction.

3. A triboelectric sensor according to claim 1, wherein the spacing structure is formed from a resin material.

4. A triboelectric sensor according to claim 1, wherein the at least one grid structure comprises a first electrode grid formed on the substrate and configured to function as an output electrode of a first triboelectric nanogenerator operating under sliding single electrode mode;
    wherein the first electrode grid comprises a plurality of different grating structures disposed along different respective directions relative to a surface of the substrate such that different characteristic triboelectric-based output signals are detectable via the first electrode grid for sliding of the object along the different respective directions.

5. A triboelectric sensor according to claim 4, wherein the at least one grid structure comprises a second electrode grid formed on an opposite side of the substrate compared to the first electrode grid and configured to function as an output electrode of a second triboelectric nanogenerator operating under sliding single electrode mode; wherein the second electrode grid comprises a plurality of different grating structures disposed along different respective directions relative to a surface of the substrate such that different characteristic triboelectric-based output signals are detectable via the second electrode grid for sliding of the object along the different respective directions.

6. A triboelectric sensor according to claim 4, wherein the at least one grid structure comprises a second electrode grid that comprises a plurality of different grating structures that are modulated differently than the grating structures of the first electrode grid; and wherein the first and second electrode grids are connected to form a single electrode such that different characteristic triboelectric-based output signals are detectable via the single electrode.

7. A triboelectric sensor according to claim 5, wherein the grating structures of the first electrode grid differ from each other in one or more of: the number of grating elements, the widths of the grating elements, and the sequence of the grating elements; and/or wherein the grating structures of the second electrode grid differ from each other in one or more of: the number of grating elements, the widths of the grating elements, and the sequence of the grating elements.

8. A triboelectric sensor according to claim 6, wherein the second electrode grid is on the same side of the substrate as the first electrode grid.

9. A triboelectric sensor according to claim 4 or claim 5, comprising a cover layer formed over the first and/or second electrode grids.

10. A triboelectric sensor according to claim 1, wherein the substrate is flexible.

11. A triboelectric sensor according to claim 1, wherein the electrodes are formed from a conductive polymer material.

12. A triboelectric sensor according to claim 11, wherein the conductive polymer material comprises a hydrogel PDMS elastomer.

13. A triboelectric control system comprising a motion control interface, said motion control interface comprising at least one triboelectric sensor according to claim 1.

14. A triboelectric control system according to claim 13, wherein the motion control interface comprises a further triboelectric sensor configured to detect motion in a single direction, such that motion detected by the triboelectric sensor and the further triboelectric sensor is translatable into a movement control signal in three dimensions.

15. A triboelectric control system according to claim 14, wherein the further triboelectric sensor comprises an elongate substrate having an electrode at each end.

16. A triboelectric control system according to claim 15, wherein the elongate substrate is formed from an elastic material.

17. A triboelectric control system according to claim 16, wherein the elastic material is silicone rubber.

18. A triboelectric control system according to claim 13, comprising:
    a signal acquisition module for acquiring detected motion data from the at least one triboelectric sensor; and
    a driver in communication with the signal acquisition module and being configured to transmit control signals to a machine in accordance with the detected motion data to move at least part of the machine in two or three dimensions.

19. A triboelectric sensor according to claim 5, wherein the grating structures of the first electrode grid differ from each other in one or more of: the number of grating elements, the widths of the grating elements, and the sequence of the grating elements; and/or wherein the grating structures of the second electrode grid differ from each other in one or more of: the number of grating elements, the widths of the grating elements, and the sequence of the grating elements.

\* \* \* \* \*